US009532681B2

(12) United States Patent
Savage et al.

(10) Patent No.: US 9,532,681 B2
(45) Date of Patent: *Jan. 3, 2017

(54) CONTINUOUSLY OPERATING FILTERING APPARATUS

(71) Applicant: Pitco Frialator, Inc., Concord, NH (US)

(72) Inventors: Steven J. Savage, Concord, NH (US); Charles E. Pierce, Boscawen, NH (US); John P. Gardner, Franklin, NH (US); Mark E. McCabe, Nashua, NH (US); Rory A. Longe, Epsom, NH (US); Kurt H. Jensen, Hudson, NH (US)

(73) Assignee: PITCO FRIALATOR, INC., Concord, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,160

(22) Filed: Sep. 8, 2014

(65) Prior Publication Data
US 2015/0060350 A1    Mar. 5, 2015

Related U.S. Application Data

(62) Division of application No. 12/119,679, filed on May 13, 2008, now Pat. No. 8,828,223.
(Continued)

(51) Int. Cl.
*A47J 37/12* (2006.01)
*B30B 9/06* (2006.01)

(52) U.S. Cl.
CPC ......... *A47J 37/1223* (2013.01); *A47J 37/1285* (2013.01); *B30B 9/067* (2013.01); *Y10S 210/08* (2013.01)

(58) Field of Classification Search
CPC    A47J 37/1223; A47J 37/1285; A47J 37/1233; B30B 15/308; B30B 15/32; B30B 9/02; B30B 9/04; B30B 9/06; B30B 9/067; B30B 9/26; B30B 9/262; B01D 29/665; B01D 29/6484; B01D 29/6423; B01D 29/0031; B01D 29/0077; B01D 29/009; B01D 29/23; B01D 29/35; B01D 2221/06
See application file for complete search history.

(56) References Cited

U.S. PATENT DOCUMENTS 1,199,350 A    9/1916   Collin
2,015,355 A    9/1935   Snow et al.
(Continued)

FOREIGN PATENT DOCUMENTS

DE    1 786 358        12/1971
EP    0 236 115 B1     2/1993
(Continued)

OTHER PUBLICATIONS

Eaton (Ronningen-Petter) Mechanically Cleaned Filter Systems Brochure, publication date unknown.
(Continued)

*Primary Examiner* — David C Mellon
(74) *Attorney, Agent, or Firm* — Brinks Gilson & Lione

(57) ABSTRACT

A deep fat fryer with continuous oil filtering and purging of sediments therefrom during uninterrupted fryer operation is provided. The filter includes a cylindrical hollow housing with a first end and a second end and a hollow cylindrical screen with a longitudinal axis and first and second ends. The screen is disposed coaxially within the hollow housing to define an annulus therebetween. A piston mounted within the screen and reciprocatingly movable along the longitudinal axis between the first and second ends of the screen. A pump, seal, and associate motor are provided to provide continuous oil flow through the filter and the remainder of
(Continued)

the fryer. A heat exchanger is provided downstream of the pump to transfer heat from the fryer to the oil flowing through the heat exchanger.

18 Claims, 49 Drawing Sheets

Related U.S. Application Data

(60) Provisional application No. 61/050,701, filed on May 6, 2008, provisional application No. 60/972,972, filed on Sep. 17, 2007, provisional application No. 60/938,117, filed on May 15, 2007.

(56) References Cited

U.S. PATENT DOCUMENTS

| | | | |
|---|---|---|---|
| 2,366,112 A | 12/1944 | Jokel | |
| 2,652,767 A | 9/1953 | Childs | |
| 3,055,290 A | 9/1962 | Arvanitakis | |
| 3,210,193 A | 10/1965 | Martin | |
| 3,422,958 A | 1/1969 | Newman | |
| 3,482,700 A | 12/1969 | Bebech | |
| 3,520,411 A * | 7/1970 | Busse | B30B 9/062 100/106 |
| 3,550,775 A | 12/1970 | Cooley | |
| 3,623,607 A | 11/1971 | Loos | |
| 3,638,558 A | 2/1972 | Bennett et al. | |
| 3,733,202 A | 5/1973 | Marmor | |
| 3,735,693 A | 5/1973 | Pelster | |
| 3,754,651 A | 8/1973 | Lannoch | |
| 3,785,281 A * | 1/1974 | Ligh | B30B 9/06 100/102 |
| 3,839,951 A | 10/1974 | Palmason | |
| 3,850,802 A | 11/1974 | Berger | |
| 3,900,403 A * | 8/1975 | Randle | B01D 29/15 100/211 |
| 3,968,741 A * | 7/1976 | Hunt | A47J 37/1223 210/186 |
| 4,042,504 A | 8/1977 | Drori | |
| 4,421,022 A | 12/1983 | Burgin | |
| 4,481,111 A | 11/1984 | Christophe et al. | |
| 4,487,691 A | 12/1984 | Panora | |
| 4,599,990 A | 7/1986 | Fritzsche et al. | |
| 4,623,544 A | 11/1986 | Highnote | |
| RE32,537 E | 11/1987 | Drori | |
| 4,717,809 A | 1/1988 | Schwizer | |
| 4,826,590 A | 5/1989 | Turman | |
| 4,872,404 A | 10/1989 | Quetsch et al. | |
| 4,882,984 A | 11/1989 | Eves, II | |
| 5,013,461 A | 5/1991 | Drori | |
| 5,106,500 A | 4/1992 | Hembree et al. | |
| 5,198,111 A | 3/1993 | Davis | |
| 5,223,137 A | 6/1993 | Hattori et al. | |
| 5,228,993 A | 7/1993 | Drori | |
| 5,263,411 A | 11/1993 | Gourdol | |
| 5,277,109 A | 1/1994 | Muench | |
| 5,297,474 A | 3/1994 | Tabuchi | |
| 5,364,539 A | 11/1994 | Castagno et al. | |
| 5,443,726 A | 8/1995 | Steiner et al. | |
| 5,558,761 A | 9/1996 | Elliot-Moore et al. | |
| 5,595,655 A | 1/1997 | Steiner et al. | |
| 5,680,811 A | 10/1997 | Highnote et al. | |
| 5,707,523 A | 1/1998 | Temple | |
| 5,709,889 A | 1/1998 | Speck | |
| 5,731,024 A | 3/1998 | Bivens | |
| 5,782,164 A | 7/1998 | Brintle | |
| 5,804,072 A | 9/1998 | Yang | |
| 6,095,037 A | 8/2000 | Savage et al. | |
| 6,187,177 B1 | 2/2001 | Ogburn | |
| 6,202,543 B1 | 3/2001 | Moya et al. | |
| 6,235,210 B1 | 5/2001 | Saksena | |
| 6,254,790 B1 | 7/2001 | King et al. | |
| 6,319,417 B1 | 11/2001 | Rodibaugh | |
| 6,443,312 B1 | 9/2002 | Racine | |
| 6,488,842 B2 | 12/2002 | Nagaoka | |
| 6,689,408 B2 | 2/2004 | Nockermann et al. | |
| 6,758,209 B2 | 7/2004 | Takeda et al. | |
| 6,820,540 B1 | 11/2004 | Bivens | |
| 6,890,428 B2 | 5/2005 | Mullaney, Jr. | |
| 6,955,118 B1 | 10/2005 | Bivens | |
| 7,055,699 B2 | 6/2006 | Takatsuka | |
| 7,100,497 B2 | 9/2006 | Shandross | |
| 2003/0213756 A1 * | 11/2003 | Duby | B01D 25/26 210/791 |
| 2004/0000509 A1 | 1/2004 | Murasawa et al. | |
| 2004/0104152 A1 | 6/2004 | Mukai | |
| 2005/0045537 A1 | 3/2005 | Imanse et al. | |
| 2005/0211608 A1 | 9/2005 | Lockwood | |
| 2006/0076281 A1 | 4/2006 | Aldeguer | |
| 2006/0091050 A1 | 5/2006 | Hwang | |
| 2006/0185522 A1 | 8/2006 | Shandross | |
| 2007/0137497 A1 | 6/2007 | Savage | |

FOREIGN PATENT DOCUMENTS

| | | |
|---|---|---|
| GB | 2 275 000 A | 8/1994 |
| WO | WO 00/07487 | 2/2000 |

OTHER PUBLICATIONS

Invitation to Pay Additional Fees and Where Applicable, Protest Fee, related PCT Patent Application No. PCT/US2008/063487, dated Oct. 29, 2008.

International Preliminary Report on Patentability, related PCT Patent Application No. PCT/US2008/063487, dated Nov. 26, 2009.

* cited by examiner

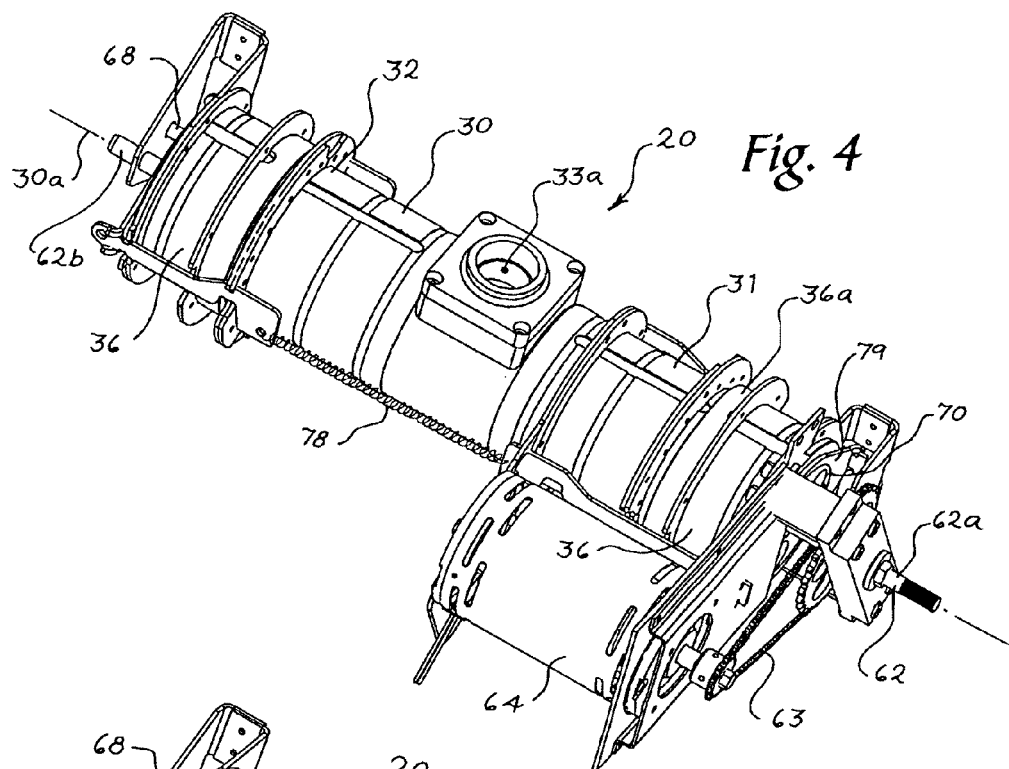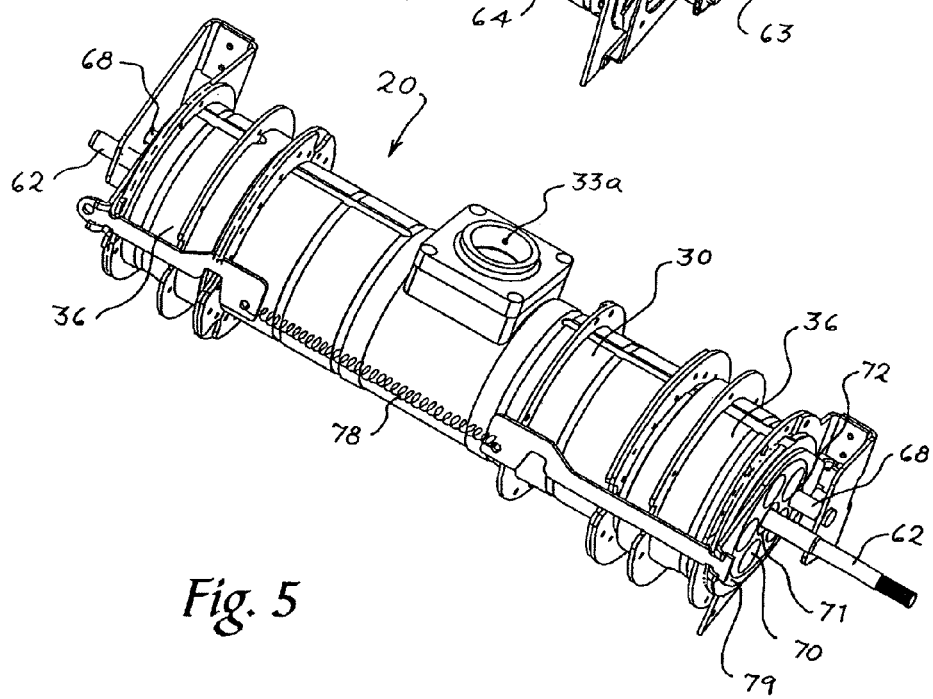

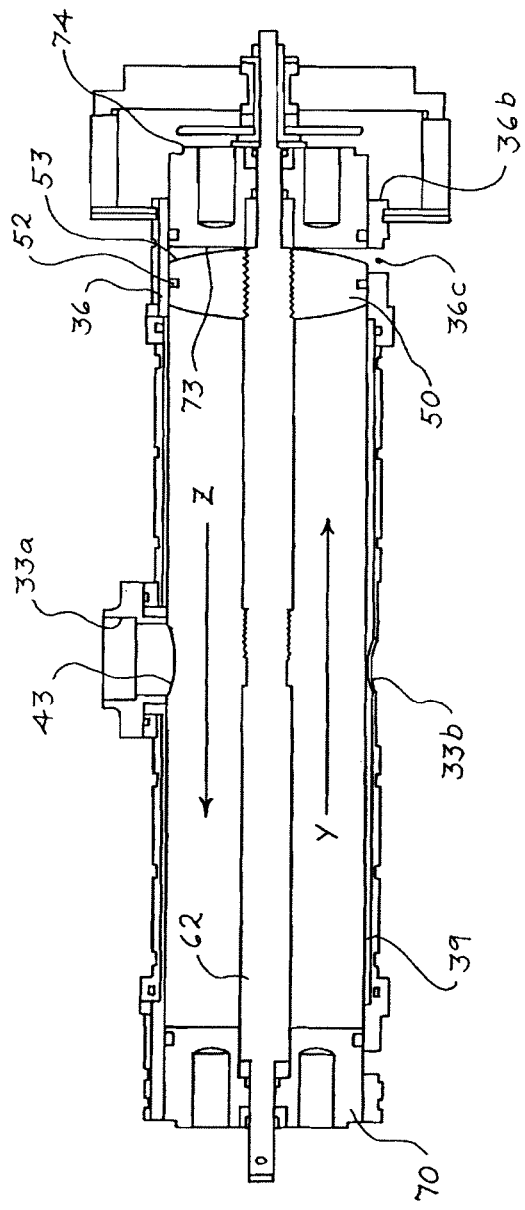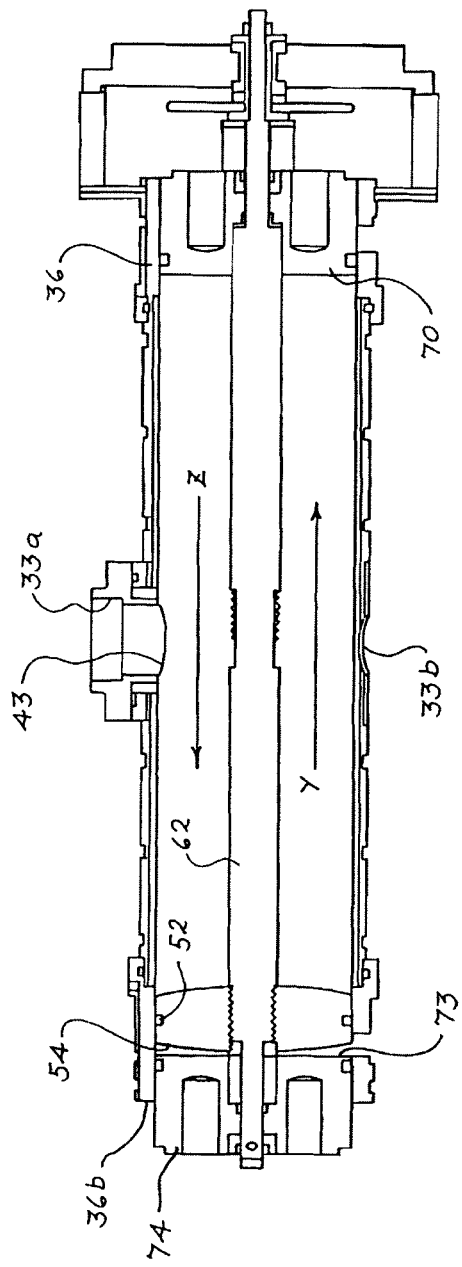

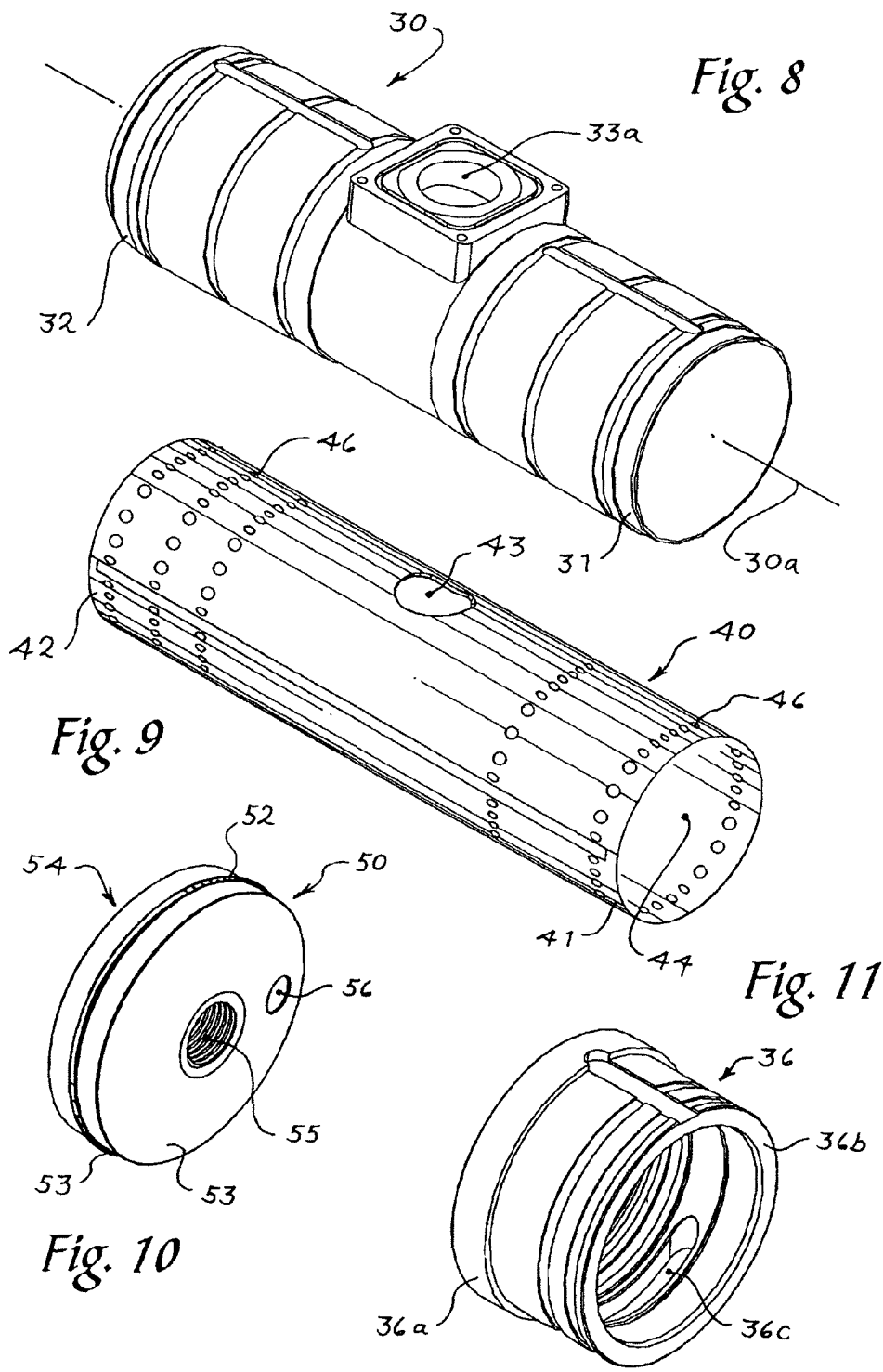

Fig. 14
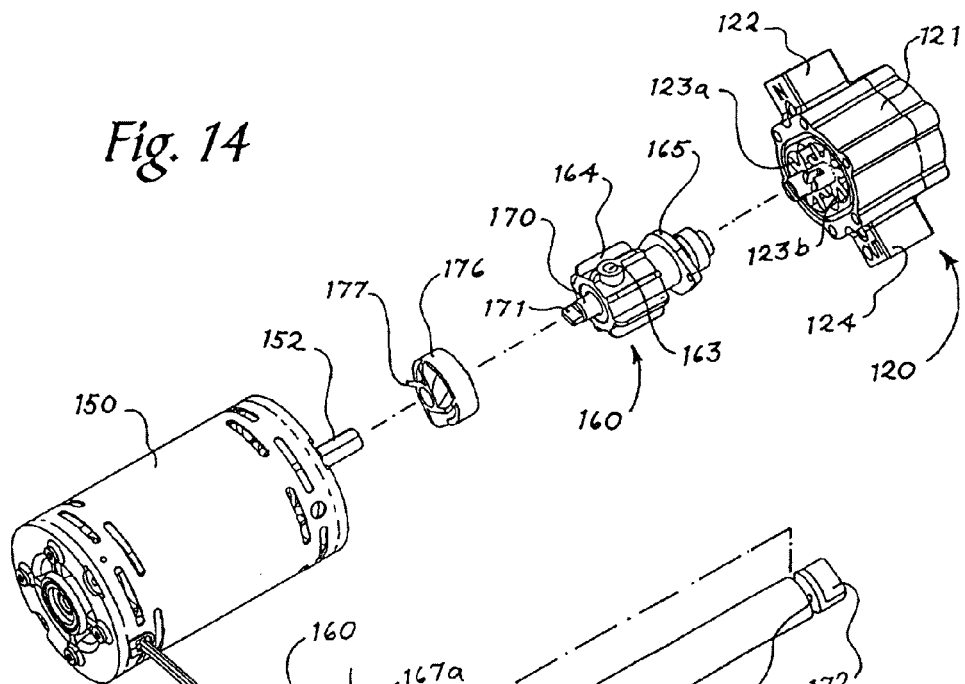
Fig. 15
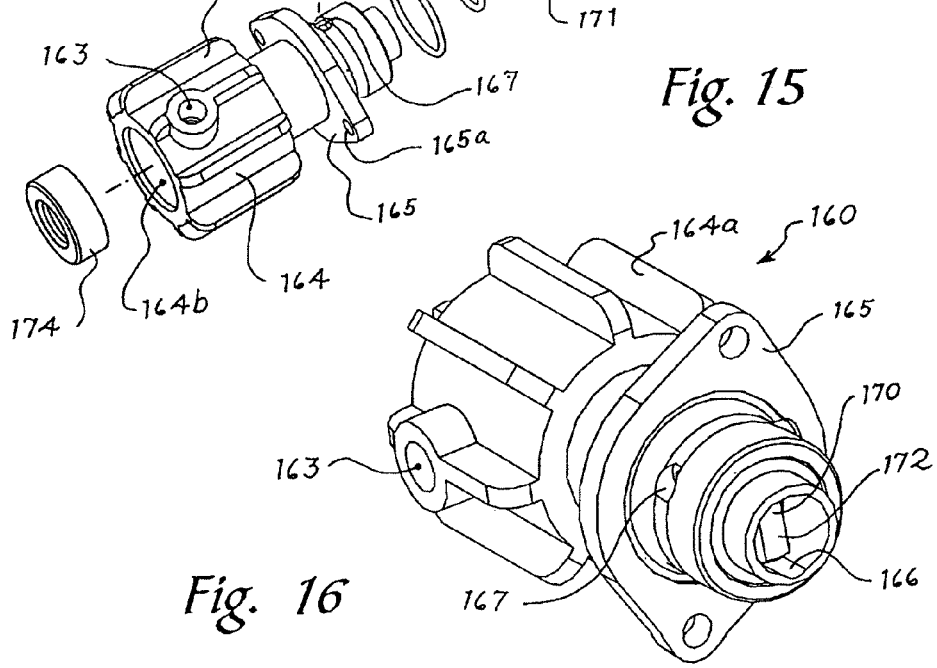
Fig. 16

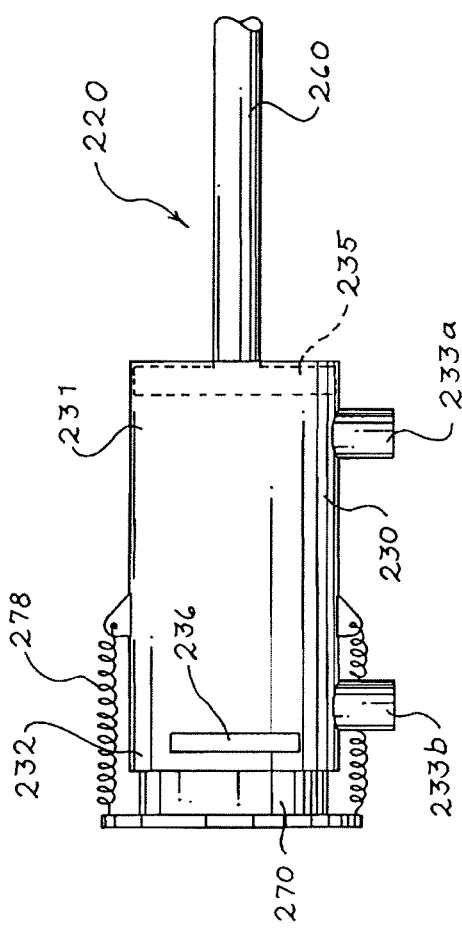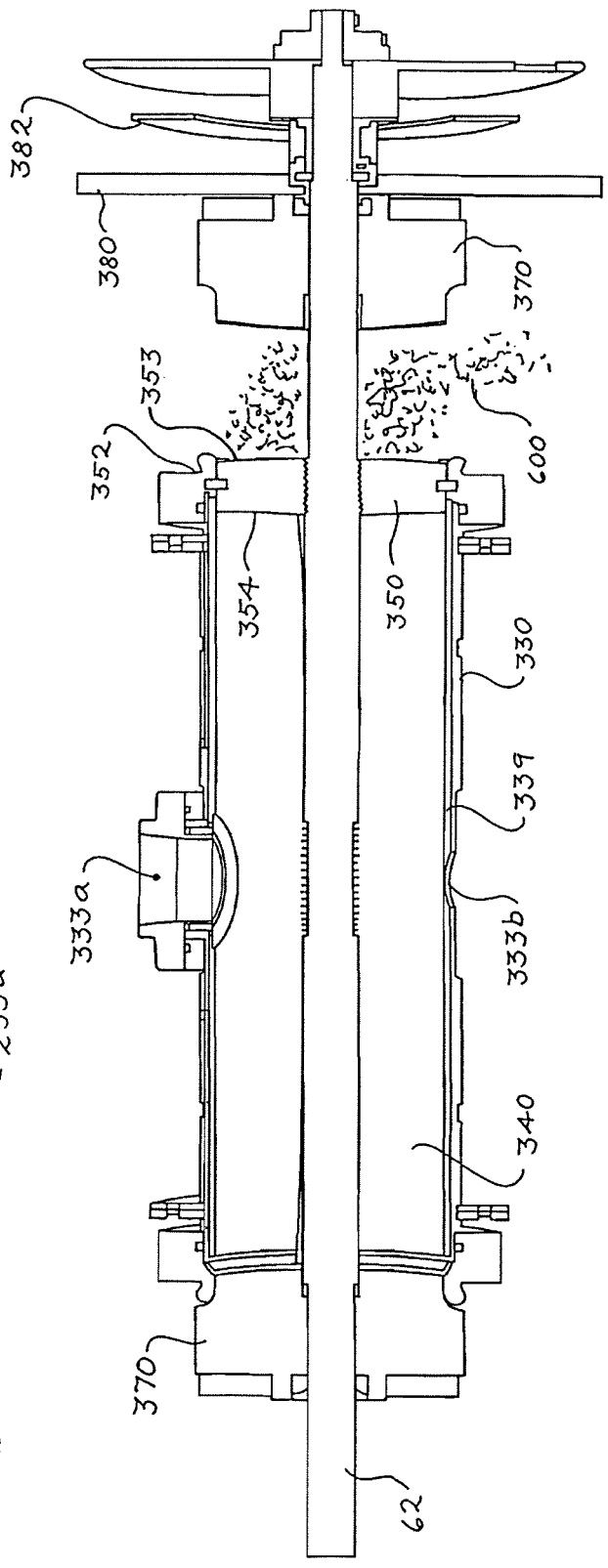

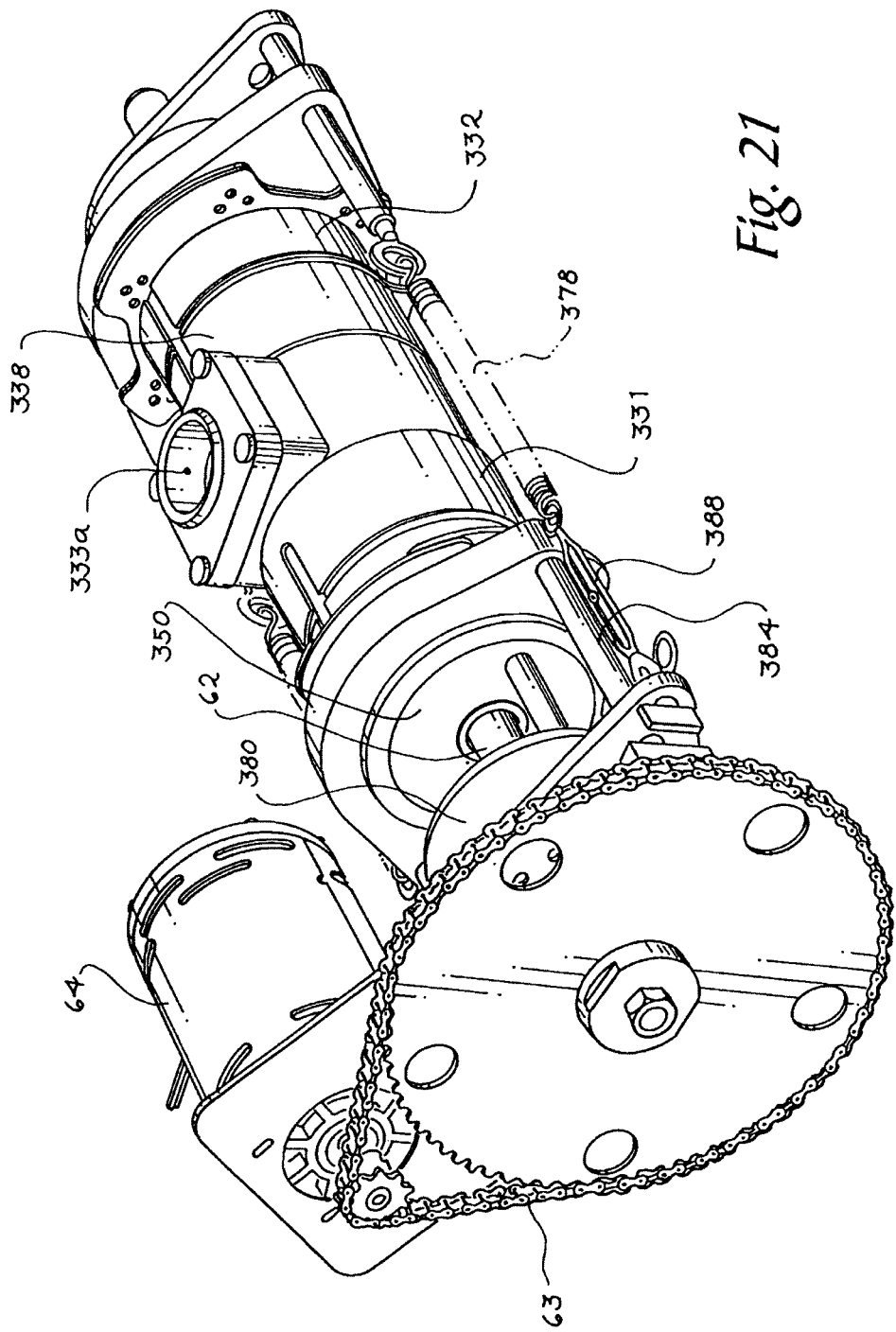

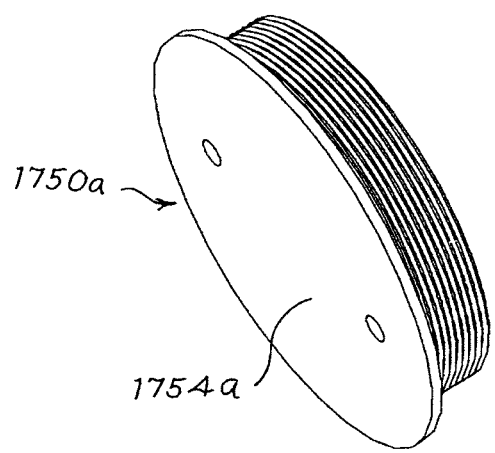
*Fig. 34a*
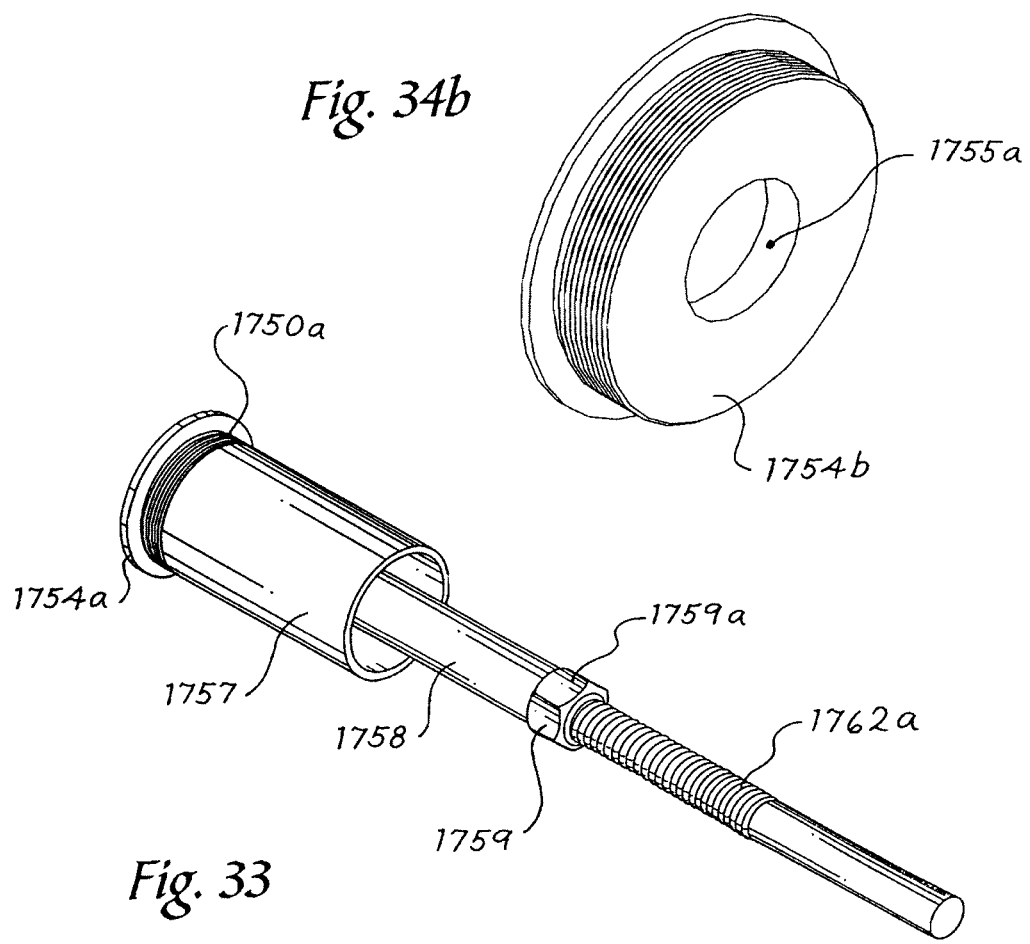
*Fig. 34b*
*Fig. 33*

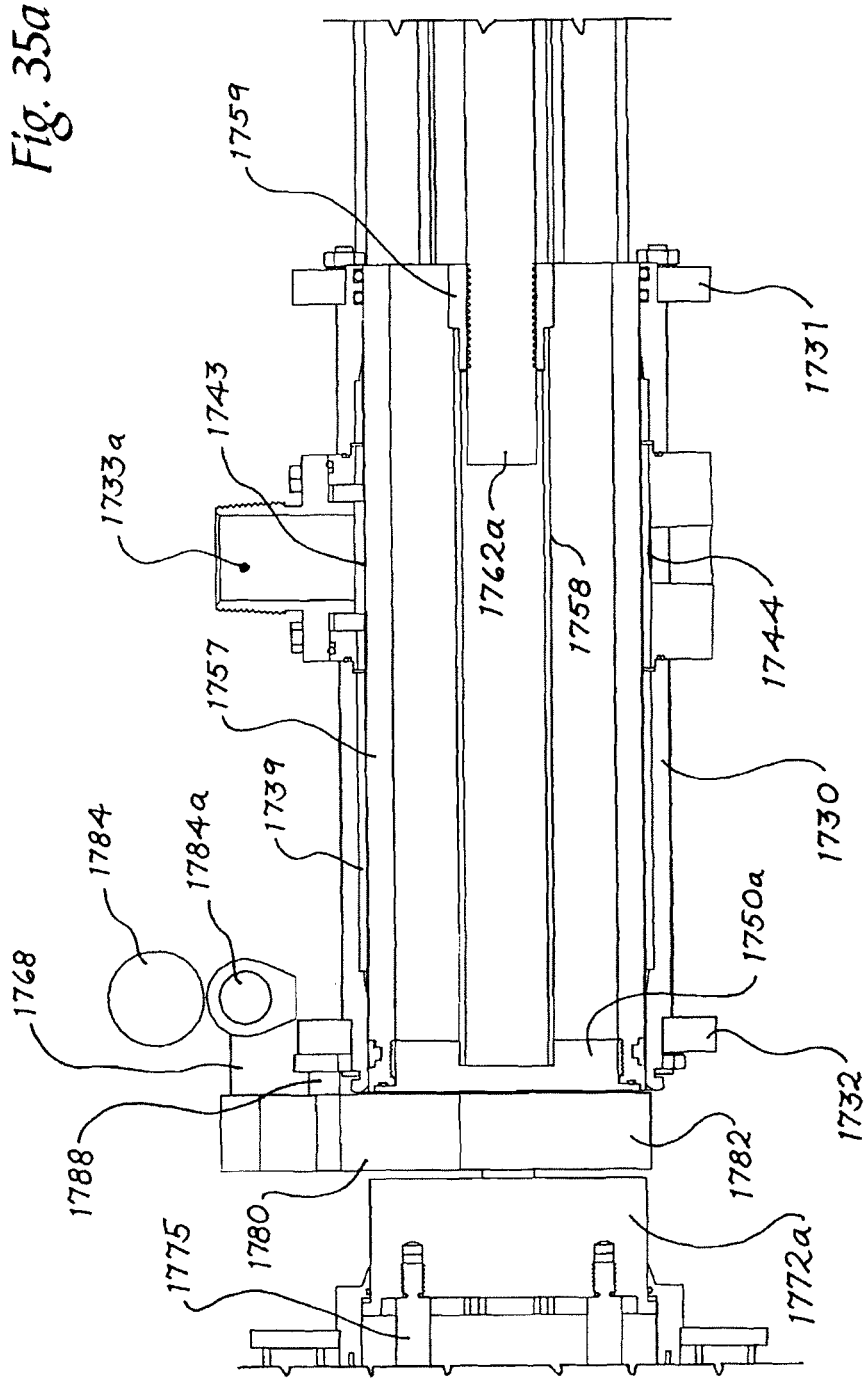

CONTINUOUSLY OPERATING FILTERING APPARATUS

CROSS REFERENCE TO RELATED APPLICATIONS

This application is a divisional application of U.S. application Ser. No. 12/119,679, filed on May 13, 2008 and issued as U.S. Pat. No. 8,828,223 on Sep. 9, 2014, which claimed priority under 35 U.S.C. §119(e) to U.S. Provisional Application No. 60/938,117, filed on May 15, 2007, to U.S. Provisional Application No. 60/972,972, filed on Sep. 17, 2007, and to U.S. Provisional Application No. 61/050,701, filed on May 6, 2008, the entirety of which are each fully incorporated by reference herein.

TECHNICAL FIELD

Deep fat fryers are known in the restaurant and food service industry as devices used to cook food products in a pool of heated oil. The heated oil is normally stored within a vat and the oil is heated from a heat source provided within the fryer. Fryers may include combustion heat sources that generate heat by burning natural gas or other types of fuel in the presence of a source of air, and direct the heated air to exchange heat with (either directly or indirectly) the oil within the vat. Fryers may also generate heat with electric heaters that generate significant amounts of heat and are in either direct or indirect contact with the vat of oil within the fryer. Deep fat fryers are frequently used to prepare many types of food products, such as potatoes, chicken, and fish. Deep fat fryers are frequently used for preparing these types of food due to the agreeable taste and the speed and efficiency of preparation of the food products.

The external surfaces of food products may be covered with breadcrumbs, flour, or similar substances prior to being placed within vat of oil to provide a pleasing exterior surface of the food after cooking within the oil. During the cooking process, some of the breadcrumbs, or similar substances, become separated from the food products and are eventually entrained within the oil. Other food products, such as potatoes, are not generally covered with breadcrumbs or the like, but often have some of the external surface of the potato fall from the item and into the oil during the frying process. The amount of foreign particulate matter within the oil increases as the fryer is used and hastens the degradation of the oil used in the frying process, degrades the taste and appearance of the food cooked within the fryer, and can reduce the cooking efficiency of the fryer. Accordingly, for longevity of the cooking oil, satisfactory tasting food, and efficient cooking, the oil within the vat of the fryer must be filtered or otherwise cleaned frequently.

In most conventional fryers, the oil must be at least partially or completely drained from the vat into a separate filtering assembly to filter the oil. The oil is generally filtered by passing the oil through filter media, typically a paper, cloth, metal, or nylon screen or mesh that mechanically removes the foreign particulate matter entrained within the oil that cannot fit through the mesh. All of the oil from the fat is passed through the mesh at least once, and the particulate matter is removed from the mesh and discarded. The resultant oil has a significantly lower particulate matter content and then can be pumped back to the fryer vat for further cooking.

This conventional filtering process is a relatively inefficient because the fryer cannot be operated while the oil is filtered because it must be drained from the vat and transferred to the filter apparatus. Further, while the oil is drained and filtered, no heat is being added to the oil and the oil temperature accordingly decreases, and must be then heated up to nominal operational temperature prior to use. This cooling and subsequent heat up of the oil requires more energy than would be required to maintain the oil of an idling fryer at the nominal use temperature. Such systems require significant labor to maintain the filter in an acceptable operating state, often requiring the steps of cleaning the filter apparatus and replace the filter media. Accordingly, because of the periodic filtering requirements many restaurants or food service establishments filter the oil from their fryers at least daily during a period of low use or often when the establishment is not open for business. This filtering schedule requires additional staff to be present at the establishment when not open for business, which increases the labor costs. Also, filtering is often a relatively complicated process (or one with problematic or catastrophic results if performed improperly) such that only trained employees can effectively and safely perform this task.

Over time there have been attempts at developing systems for filtering oil coincident with the cooking process. Previous designs that have included continuous oil filtering structures have been disclosed in the prior art, and all include drawbacks that have limited their commercial success. In a design disclosed in U.S. Pat. No. 4,623,544, a filter is provided in fluid communication with a pump and a heat exchanger to receive oil flow downstream of the pump and the heat exchanger. The filter receives only a portion of the oil flowing through the pump, which lengthens the time to filter the entire oil volume of the fryer. In addition, the unfiltered oil passing through the heat exchanger can result in clogging of the heat exchange passages preventing proper flow. The filter must be periodically manually cleaned by the operator to avoid reduction in flow though the filter due clogging by foreign material. Further, problems with the design of the disclosed pump associated with the filter were noted during continued operation due to the heat buildup within the pump after continuously operating to pump heated oil therethrough. It is known in the art that pump seals have a very short useful life if operating at a temperature close to the nominal fryer oil temperature, such as between 325 and 350 degrees Fahrenheit. Seals degrade with operation at these high temperatures, which allows oil leakage resulting in loss of cooking oil that may prevent continued use of the equipment. Over time, oil leakage can also cause structural deformity that accelerates the failure of other pump or motor components. Prior art designs often used centrifugal pumps that were prone to cavitation and interruption of flow created by steam captured within the cooking oil and a resulting decrease of net positive suction head at the pump suction.

U.S. Pat. No. 4,599,990 discloses a second fryer design that allows for continuous filtering of oil within a fryer. In this design a filter is disposed below the tank and receives a portion of oil that is pumped through a pump with the other portion of the oil pumped by the pump flowing through a heat exchanger within the fryer. The filter must be manually cleaned periodically to allow proper flow through the filter and therefore the entire fryer oil circulation system.

U.S. Pat. No. 4,487,691 provides a disclosure of a similar fryer as the '990 patent discussed above. The '691 patent discloses additional structural details of the filter system associated with the fryer. The filter receives only small fraction of the oil flowing through the pump (e.g. about 10 percent by volume with the remaining oil flowing through a heat exchanger in parallel) so the filter system must be operated for extended periods of time until all of the oil within the fryer becomes filtered, which prevents the oil from being maintained in a substantially clean condition and accelerates the end of life of the oil. Additionally, the filter must be manually removed to be cleaned with requires a relatively complicated and time consuming process. Further, the filter can only be cleaned with the fryer secured, which reduces the time that the fryer can be used to cook food product. It is desired to provide a fryer that can continuously filter oil, where the filter can operate continuously without operator action or cleaning and the filter cleans large volumes of oil within the fryer within a short time, to maintain the oil in a clean and substantially foreign substance free condition.

BRIEF SUMMARY

A first representative embodiment of the disclosure provides a continuous filter for a deep fat fryer. The filter includes a cylindrical hollow housing with a first end and a second end and a hollow cylindrical screen with a longitudinal axis and first and second ends disposed coaxially within the hollow housing to define an annulus therebetween. A piston is mounted within a passage defined by the screen and movable along the longitudinal axis between the first and second ends of the screen.

A second representative embodiment of the disclosure provides a filter for a deep fat fryer. The filter includes a hollow cylindrical housing with an inlet and an outlet and a cylindrical screen coaxially disposed within the housing, the screen comprising an inlet in communication with the housing outlet, and a plurality of holes defined in the screen. A piston is reciprocatingly translatable along a longitudinal axis of the screen.

A third representative embodiment of the disclosure provides an oil pump fluidly connected with a cooking appliance. The oil pump includes a motor with a motor shaft projecting therefrom and a pump within a pump housing. The pump receives torque from the motor shaft causing the oil pump to rotate through a transmission. A seal is disposed between the motor and the oil pump and adapted to substantially prevent oil leakage from the oil pump, wherein the seal is disposed linearly away from the pump housing.

A fourth representative embodiment of the disclosure provides a deep fat fryer. The fryer includes a vat to receive a quantity of cooking oil, a filter to receive oil from the vat and an extraction mechanism to automatically and cyclically remove debris contained within the filter. A pump continuously operates during operation of the fryer to receive substantially the entire volume of oil flowing through the filter. A length of piping is provided downstream of the pump and positioned to receive heat from a heat source and a plurality of apertures are disposed downstream of the piping to allow oil from the piping into the vat.

A fifth representative embodiment of the disclosure provides a method for continuously filtering oil in a cooking appliance. The method includes the steps of receiving a continuous source of cooking liquid from a liquid receptacle in the cooking appliance within a housing and filtering the cooking liquid through a hollow screen concentrically disposed within the housing to define an annular space therebetween. A piston positioned with a passage defined by the screen is cyclically translatably movable between the first and second ends of the screen to remove particulate matter retained on an inner portion of the screen. The method further includes the steps of automatically controlling the translation of the piston by a control system based on at least one operational parameter of the cooking appliance and continuously pumping filtered liquid from the annular space.

A sixth representative embodiment of the disclosure provides a method for urging oil flow through a deep fat fryer. The method includes the steps of providing a motor with a motor shaft projecting therefrom and providing an oil pump within a pump housing. The oil pump receives torque from the motor shaft, causing the oil pump to rotate. The method additionally includes the step of providing a seal disposed between the motor and the oil pump and adapted to substantially prevent oil leakage from the oil pump, wherein the seal is spaced away from the pump housing.

A seventh representative embodiment of the disclosure provides a method of constructing a deep fat fryer. The method includes the steps of providing a vat to receive a quantity of cooking oil and providing a filter to receive oil from the vat. The method further includes the steps of providing a pump arranged to continuously operate during operation of the fryer to receive oil from the filter, providing a length of piping downstream of the pump and positioned to receive heat from a heat source, and providing a plurality of apertures downstream of the piping to allow oil from the piping into the vat.

An eighth representative embodiment of the disclosure provides a cooking liquid circulation system for a cooking appliance. The system includes a housing that is configured to receive a volume of liquid for cooking a food product within a vat and a pump. A primary screen is configured to selectively receive liquid from the vat and allow liquid communication with the pump. A second filter assembly is provided that includes a housing forming a first liquid flow path therethrough to provide liquid communication between the vat and the primary filter. A second screen is disposed coaxially around the first liquid flow path, and an outlet is provided in selective fluid communication between the first liquid flow path and the pump through the second screen in a first direction.

A ninth representative embodiment of the disclosure provides a liquid circulation system for a cooking appliance. The system includes a housing configured to continuously receive a volume of liquid for cooking a food product within a vat, a pump, and a primary filter configured to selectively receive liquid from the vat and allow liquid communication with the pump while substantially preventing any particulate matter entrained with the volume of liquid from flowing to the pump with the liquid. A second filter assembly comprising a housing forms a first liquid flow path therethrough to provide liquid communication between the vat and the primary filter, a second screen is disposed coaxially around the first liquid flow path, and an outlet provided in selective fluid communication between the first liquid flow path and the pump through the second screen in a first direction.

A tenth representative embodiment of the disclosure provides a continuous filter system for a cooking appliance. The system includes a cylindrical primary housing and a cylindrical primary screen disposed concentrically therein. A flow path is configured for continuous flow of a liquid to be filtered from a cooking appliance, wherein the path extends into an internal volume defined by the primary screen. The primary screen is configured to allow liquid through the primary screen into an annulus defined between the housing and the primary screen, but substantially retain any particulate matter initially entrained in the liquid within the internal volume. A pump is provided that includes a suction fluidly connected to the annulus and a discharge fluidly connected to a return in the cooking appliance. The primary housing is fluidly connected to a debris extraction mechanism to continuously receive the particulate matter therefrom and automatically remove the particulate matter from the filter system.

An eleventh representative embodiment of the disclosure provides a method of removing particulate matter from a liquid in a cooking appliance. The method includes the steps of receiving liquid with particulate matter from a retention volume within the cooking appliance and filtering the liquid with a cylindrical screen disposed within a primary filter. The method further includes the steps of automatically scraping particulate matter from an inner surface of the primary screen and receiving scraped particulate matter within a debris extraction mechanism. The method further includes the steps of compressing the particulate matter within the debris extraction mechanism and automatically removing the particulate matter from the debris extraction mechanism.

BRIEF DESCRIPTION OF SEVERAL VIEWS OF THE DRAWINGS

FIG. 4 is a perspective view of the continuous filter of FIG. 1.

FIG. 5 is a perspective view of a portion of the filter of FIG. 4 with the motor and transmission removed.

FIG. 6b is the view of FIG. 6a with the piston and end cap in a first removal position.

FIG. 7b is the view of FIG. 6a with the piston in a second removal position.

FIG. 8 is a perspective view of the housing of the filter of FIG. 4.

FIG. 9 is a perspective view of the screen of the filter of FIG. 4.

FIG. 10 is a perspective view of the piston of the filter of FIG. 4.

FIG. 11 is a perspective view of the collar of the filter of FIG. 4.

FIG. 14 is an exploded view of the motor and oil pump of FIG. 12.

FIG. 15 is an exploded view of the seal assembly of the motor and oil pump of FIG. 12.

FIG. 16 is a perspective view of the seal assembly of FIG. 12.

FIG. 17 is a side view of an alternate filter of the fryer of FIG. 1.

FIG. 21 is a perspective view of an alternate filter of the fryer of FIG. 1.

FIG. 23 is another cross-sectional view of the filter of FIG. 21 with a portion of the components therein removed.

FIG. 33 is a perspective view of an alternate piston and linear transmission of the fryer of FIG. 27.

FIG. 34a is a front perspective view of the piston of FIG. 33.

FIG. 34b is a rear perspective view of the piston of FIG. 33.

FIG. 35a is a detail view of FIG. 35.

DETAILED DESCRIPTION

Figure 1:
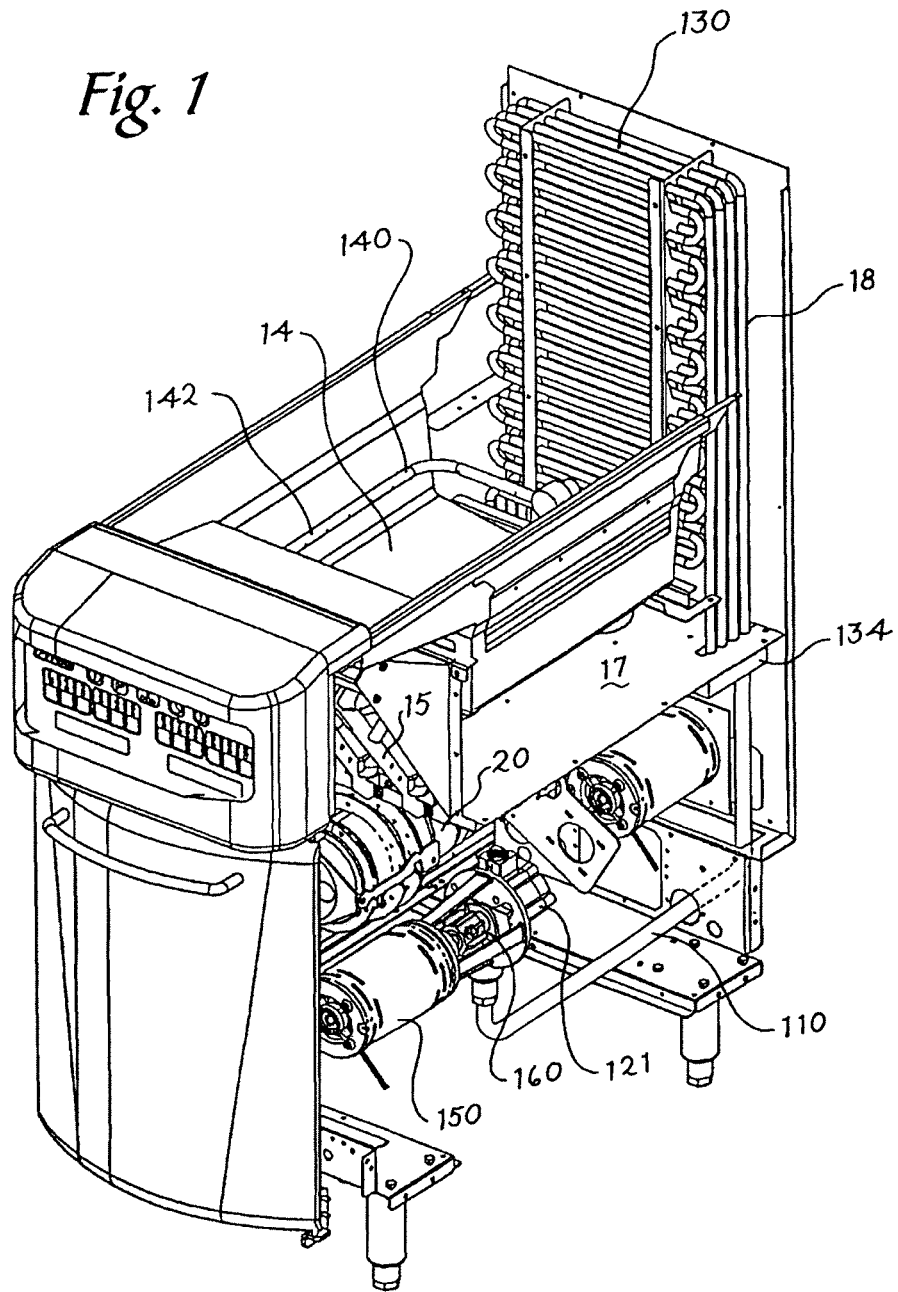
FIG. 1 is a perspective view of the continuously filtering fryer with a portion of the housing removed.
Figure 2:
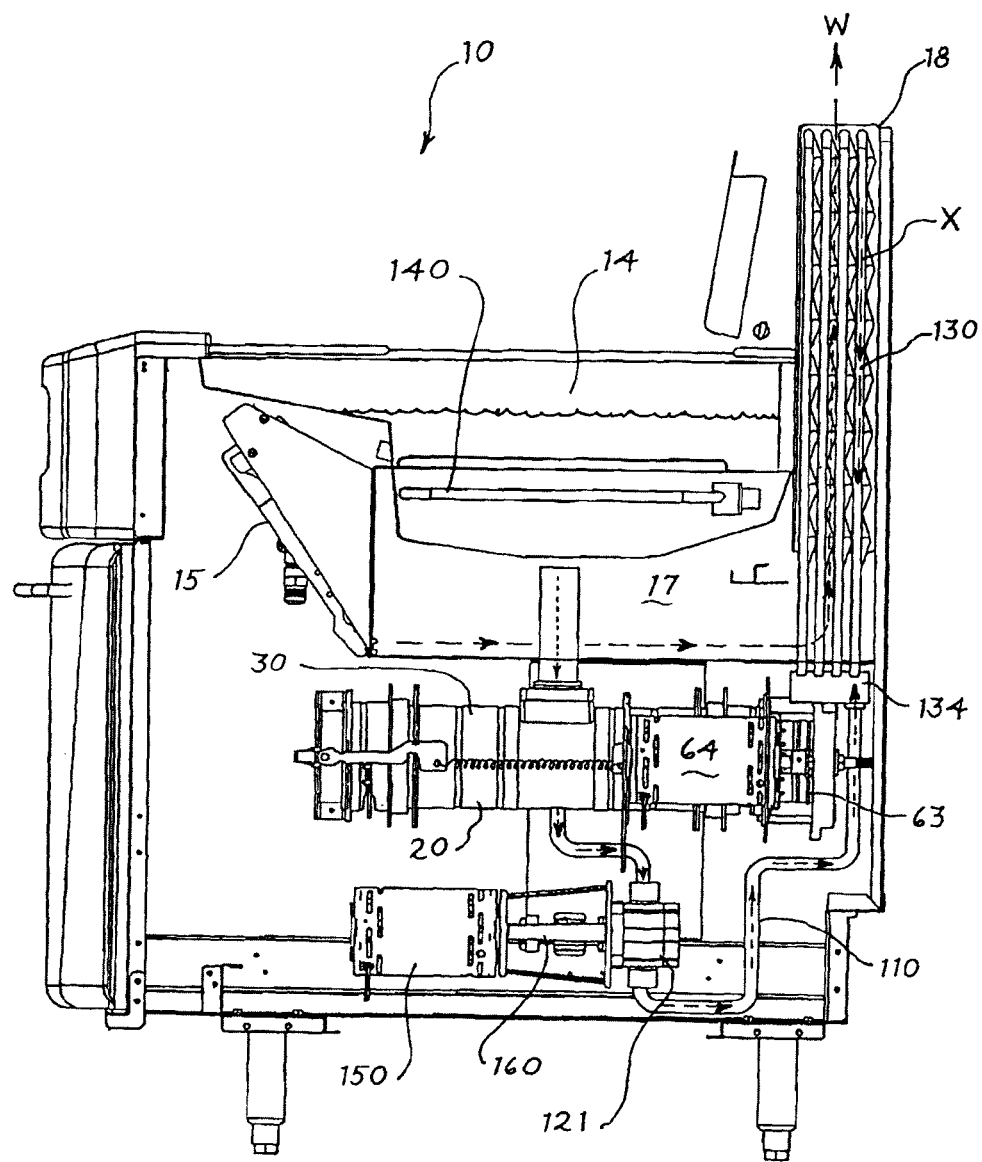
FIG. 2 is a side view of the fryer of FIG. 1, showing the air and oil flow paths through the fryer.

Turning now to FIGS. 1-2, a cooking appliance is provided. The cooking appliance may be a deep fat fryer 10, or another type of cooking appliance, such as a pasta cooker or rethermalizer, where a food product is cooked in a volume of heated liquid. One of ordinary skill in the art will recognize that the disclosure herein can be used successfully on other machines where there is a need to continuously remove particulate matter from a volume of liquid therein and/or provide heat to the liquid after removing particulate matter from the liquid.

The fryer 10 includes a housing 12 that mechanically supports all of the components of the fryer. The fryer 10 includes a vat 14 that provides a open volume for storing and heating a quantity of cooking oil for frying a food product placed therein. The fryer 10 further includes a heat source (not shown) that provides heat to the cooking oil stored within the open vat 14. The heat source may be a provided by burning natural gas or similar fuel in an open flame that heats air passing through the fryer 10, or alternatively, the heat source may be provided by a plurality of electrical heaters that are disposed in the proximity of the heat exchanger (discussed below) or another portion of the fryer 10 where heat from the heaters may be transferred to the oil of the fryer 10.

The fryer 10 includes a filter 20 and an oil circulation system 110 that allows oil to flow from the vat 14 through the filter 20, through a heat exchanger 130, and return to the vat 14. Oil flow through the oil circulation system 110 is urged with a pump 121 that may be disposed between the filter 20 and the heat exchanger 130. In this embodiment, the pump 120 draws a suction from the outlet of the filter 20, which urges oil flow through the screen 40 of the filter 20, as discussed below. Oil initially gravity drains from the vat 14 to the filter 20, which is disposed below the vat 14 and connected to the vat 14 with a length of piping. The oil discharges from the pump 120 at an increased pressure, causing flow through the heat exchanger 130 and then through a ring 140 connected downstream of the heat exchanger 130. Heated oil flows through a plurality of apertures 142 in the ring 140 to return to the vat 14.

All oil flowing through the pump 120 and the heat exchanger 130 additionally flows through the filter 20, which shortens the time to filter all oil within the fryer, increases the amount of oil filtering cycles that occur during a fixed operational time of the fryer, which allows the oil to be maintained in a cleaner state (i.e. less foreign matter entrained within the oil) and contributes to a longer useful life for the oil.

Turning now to FIGS. 4-11, the filter 20 includes a hollow cylindrical housing 30 that supports and encloses a screen 40. A piston 50 is translatably mounted within the screen 40. End cups 70 are disposed on each end of the housing 30 and are longitudinally movable when urged by the piston 50. The housing 30 includes an outlet slot 36c on the ends thereof that allows foreign particulate matter 600 that is prevented from flowing through the screen 40 to exit the filter 20 for disposal. The housing 30 may be disposed above a filter pan (not shown) or other suitable structure to provide for a temporary storage location for the foreign particulate matter 600 removed from the oil.

As best shown in FIG. 8, the housing 30 includes a first end 31 and a second end 32 and a longitudinal axis 30a therebetween. The housing 30 further includes an inlet aperture 33a and one or more outlet apertures 33b. One or more of the outlet apertures 33b may be on the opposite side of the housing 33 from the inlet aperture 33a to allow for gravity flow of oil from the housing 33, and one or more of the outlet apertures 33b further may be disposed on the top surface of the housing 33 (in the vicinity of the inlet aperture 33a) to allow any gas that may have been entrained in the oil to be vented from the housing 30 before entering the oil pump 120. The first and second ends 31, 32 of the housing 30 may be open and each may fixedly receive a respective first and second collar 36, discussed below.

As best shown in FIGS. 6a-7b and 9, a screen 40 is disposed within the hollow internal volume of the housing 30 and situated coaxially within the housing 30. The screen 40 is substantially cylindrical and includes a first end 41 that corresponds with the first end 31 of the housing 30 and a second end 42 that corresponds with the second end 32 of the housing 30. The screen 40 includes an outer diameter that is slightly smaller than the inner diameter of the housing 30 to form an annulus 39 between the two. In some embodiments, the annulus 39 may be about 0.125 inches wide around the circumference and the length of the screen 40, which provides adequate volume for oil that flows through the plurality of holes 46 (discussed below) of the screen to flow to the outlet 33b of the housing 30, while minimizing the size of the housing 30. In other embodiments, the annulus 39 (and other components of the filter 20) may be formed with geometries and sizes that are appropriate for the quantity of oil to be continuously filtered.

The screen 40 includes an inlet aperture 43 that is disposed in fluid communication with the inlet aperture 33a of the housing 30. The screen 40 is fixed to the housing 30 to prevent relative motion between the two members. The screen 40 is formed with a plurality of holes 46 defined through the thickness of the screen 40 and provided throughout the surface of the entire screen 40. In some embodiments, the plurality of holes 46 may be uniformly spaced throughout the surface area of the screen 40, while in other embodiments, the plurality of holes 46 may be disposed in predetermined arrangements. In some embodiments, the plurality of holes 46 may be disposed between about every 0.003 inches and about every 0.020 inches along the length of the screen. In some embodiments, the distance between the plurality of holes 46 is approximately the same as the outer diameter of the holes as discussed below. In other embodiments, the holes 46 may be a larger distance apart than the diameter of the plurality of holes 46. In a representative embodiment, the plurality of holes 46 may be approximately 0.015 inches apart.

The plurality of holes 46 are defined to allow oil to pass from the internal volume 44 of the screen 40 to the annulus 39 defined between the housing 30 and the screen 40, while substantially preventing foreign materials (such as dirt, crumbs, etc.) entrained with the oil to flow through the plurality of holes 46. In some embodiments, the minimum diameter of the plurality of holes 46 may be between about 0.003 inches to about 0.017 inches. In some embodiments, the minimum diameter of the plurality of holes 46 may be one of 0.003 inches, 0.005 inches, 0.007 inches, 0.009 inches, 0.011 inches, 0.013 inches, 0.015 inches, or another suitable diameter. This range of potential minimum diameters of the plurality of holes 46 is selected to prevent a significant amount of foreign material entrained within the oil from flowing through the plurality of holes 46 such that the oil entering the annulus 39 is substantially free of foreign materials. Additionally, substantially all foreign materials entrained within the oil entering the filter 20 is retained within the internal volume of the screen 40.

The cross-section of the plurality of holes 46 may be cylindrically shaped (i.e. with a constant diameter along the length of the hole 46) or in other embodiments, the plurality of holes 46 may be shaped as a truncated cone. In embodiments with conical holes 46, the minimum diameter of each of the plurality of holes 46 is at the inner surface of the screen 40, while the larger diameter of each hole 46 is at the outer surface of the screen 40, which promotes the ability of the piston 50 to clean the screen 40. The plurality of holes 46 may be defined in the screen 40 with a laser or chemical etching process, or with other manufacturing processes that are known in the art.

After the oil passes through the plurality of holes 46 and into the annulus 39, the foreign material previously entrained with the oil may adhere to the internal surface of the screen 40, or the foreign material may fall to the bottom internal surface of the screen 40 due to gravity. After extended operation of the filter 20, a significant quantity of foreign material will collect within the internal volume of the screen 40, with a minimum amount of oil entrained therein. With extended operation, the build-up of foreign material adhering to the screen 40 blocks an increasing number of holes 46, which increases pressure drop through the filter 20.

As best shown in FIGS. 6a-7b and 10, the filter 20 additionally includes a disc-like piston 50 longitudinally and reciprocatingly mounted within the inner volume 40a of the screen 40. The piston 50 may be circular to correspond to the circumference of the screen 40. In other embodiments (not shown) where the screen 40 is a different shape, the piston 50 is formed with a similar, but slightly smaller, shape. The piston 50 includes one or more rings 52 that are received within a slot in the outer circumference of the piston 50. The outer diameter of the ring 52 when compressed into the slot in the piston 50 is substantially the same as the inner diameter of the screen 40, such that the ring 52 scrapes against the inner surface of the screen 40 as the piston 50 translates within the screen 40.

In other embodiments, the piston 50 may include a plurality of side surfaces that are extendably mounted to the piston 50 and biased radially outward by an internal spring. The side surfaces are configured to scrape along the internal surface of the screen 40 to remove particulate matter 600 from the screen 40 as they are biased outward to contact the internal surface of the screen 40.

The piston 50 further includes a threaded central aperture 55 disposed coaxially with the center of the piston 50 and a second aperture 56 disposed on the piston 50 at a radial location from the central aperture 55. The central aperture 55 receives a threaded rod 62 therethrough that extends between the first and second ends 31, 32 of the housing 30. A first end 62a of the threaded rod 62 is rotatably connected to a transmission 63 that receives torque from a motor 64 to selectively rotate the threaded rod 62. The second end 62b of the threaded rod 62 extends through a central aperture 71 in the second end cup 70, which constrains the translation of the second end cup 70. The threaded rod 62 additionally extends through a central aperture 71 in the first cup 70, which is disposed on the first end 41 of the screen 40.

The piston 50 includes opposing side surfaces 53, 54 that may be planar or alternatively, the side surfaces may be formed with a concave profile or a convex profile, as shown in the figures. Further, the side surfaces 53, 54 may be formed as a truncated cone with a central planar portion and a conical outer portion. The side surfaces 53, 54 of the piston 50 may be formed with the same or differing profiles. The inner surface 73 of the end cup 70 that contacts the piston 50 when the piston 50 may be formed as a planar surface, or a complementary or opposing shape to the shape of the side surfaces 53, 54 of the piston 50.

In some embodiments, the motor 64 that ultimately causes the threaded rod 62 to rotate may be the same as the motor 150 that drives the pump 120. In other embodiments, the motor 64 driving the threaded rod may separate from the motor 150 that drives the pump 120. In embodiments where the same motor drives both the pump 120 and the threaded rod 62, a clutch (not shown), is provided between either the motor 64 and the transmission 63, or alternatively, between the transmission 63 and the threaded rod 62 to selectively allow rotation of the threaded rod 62 (with instruction from the control system 90, discussed below) because the motor is constantly operating to drive the pump 120 for continuous oil flow through the filter 20 and the heat exchanger 130. The threaded rod 62 is rotatable in both rotational directions to cause the piston 50 to translate in both longitudinal directions within the internal volume of the screen 40.

A second rod 68 is disposed within the internal volume of the screen 40 in parallel with the longitudinal axis 30a of the housing 30 and the threaded rod 62. The second rod 68 extends through the second aperture 56 of the piston 50 and respective second apertures 72 of the first and second end cups 70. The second rod 68 prevents the piston 50 from rotating with the rotation of the threaded rod 62, such that the piston 50 moves linearly along the screen 40 as the threaded rod 62 rotates.

As best shown in FIGS. 6a-7b, the first and second end cups 70 are disposed at respective first and second ends 31, 32 of the housing 30. Specifically, the first and second end cups 70 are translatably disposed within a portion of the respective end of the screen 40 and a portion of the respective first and second collars 36. Both of the first and second end cups 70 are constructed in the same manner and for the sake of brevity, a single one of the first and second end cups 70 will be discussed here. The end cup 70 is a generally cylindrical member with an inner surface 73 and an outer surface 74. The first end cup 70 is disposed within the housing 30 such that the inner surface 73 faces the piston 50 within the screen 40 and the outer surface 74 is visible from outside an end of the filter 20. The end cups 70 are normally disposed such that the outer surface 74 of the end cup 70 is substantially planar with an outer edge 36b of the collar 36.

The end cup 70 includes a central aperture 71 that receives the threaded rod 62 therethrough and a second aperture 72 that receives the second rod 68 therethrough (FIG. 5). A plurality of seals (not shown), such as o-rings and lip seals, may be provided with the central aperture 71 and the second aperture 72 to prevent oil leakage through the end cup 70 from the internal volume 44 of the screen 40.

Each of the first and second collars 36 are substantially hollow cylindrical members and are disposed on a respective first or second end 31, 32 of the housing 30. Because each of the first and second collars 36 operate and are constructed in the same manner, for the sake of brevity the first and second collars 36 are discussed together. The collar 36 may include a flanged portion 36a with an inner diameter slightly larger than the outer diameter of the housing 30, such that the flanged portion 36a is assembled around the outer surface of the respective first or second end 31, 32 of the housing 30. Each collar 36 includes a slot 36c that provides for fluid communication radially from the internal volume of the collar 36 (and the housing 30) to outside the filter 20. The collar 36 includes an outer edge 36b (FIG. 11) that provides a normal restraining surface for a retaining plate 79.

First and second end cups 70 are biased toward the opposite end cup 70 by a spring or similar biasing member 78. The end cup 70 is biased inward within the housing 30 (i.e. toward the opposing end cup 70 on the opposite end of the housing 30) until the end cup 70 is substantially proximate to the respective end of the screen 40. In some embodiments, a biasing member 78 is operatively engaged with both first and second end cups 70 to bias each end cup 70 toward the opposing end cup 70. In other embodiments, a dedicated biasing member 78 for each end cup 70 may be provided, with an end connected to the housing 30 or another suitable surface and the opposite end operatively connected with the end cup 70.

As shown in FIG. 5, a retaining plate 79 may be disposed on the outer edge 36b of each collar 36 that provides a fixation member for each of the opposite sides of the biasing member 78. Accordingly, in use (discussed below) when one of the end cups 70 is translated away from the opposing end cup 70 by the piston 50, the retaining plate 79 is pushed outward away from the outer edge 36b of the collar 36 and the biasing member 78 is stretched. As the pressing force against the end cup 70 is removed, the biasing member 78 urges the end cup 70 back to its normal position until a seal mechanism 75 (FIGS. 6a-7b) seals sealing the end cup 70 to the collar 36 to minimize the oil leakage from the ends of the housing 30. The seal may be an elastomeric or a metallic seal.

Figure 20:
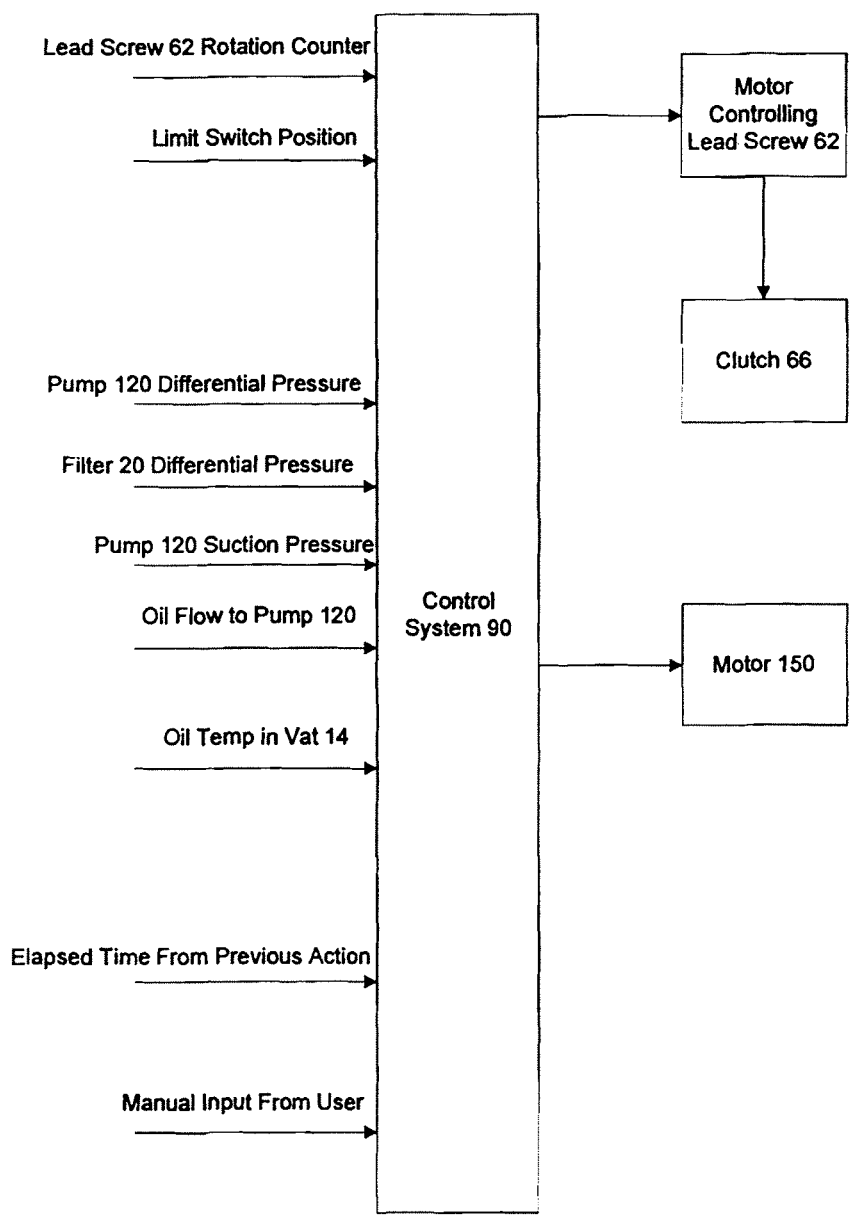
FIG. 20 is a schematic of the input signals to and the output signals from the control system of the fryer of FIG. 1.

As shown schematically in FIG. 20, a control system 90 is provided to control the motion of the piston 50 within the internal volume of the screen 40. The control system 90 receives inputs that relate the position of the piston 50 within the housing 30 and other inputs that relate to the operational performance of the screen 40. Specifically, in some embodiments, the control system 90 receives a signal that is proportional to the number of rotations of the threaded rod 62, which with the knowledge of the initial position of the piston 50 within the screen 40 and the dimensions of the threads of the threaded rod 62 and the length of the filter 20 components, allows the control system 90 to determine the actual location of the piston 50 within the screen 40.

Alternatively, a one or more limit switches (not shown) or other positioning detection structures may be provided within the housing. Specifically, limit switches may be mounted to be directly or indirectly contacted by the piston 50, or in other embodiments limit switches may be mounted to be directly contacted by the end cups 70. In one embodiment, two limit switches may be provided on each end 31, 32 of the housing 30 in proximity to the end cups 70. A first limit switch may be positioned to be contacted by the end cup 70 when the end cup 70 is in its normal position with the outer surface 72 planar with the outer edge 36b of the collar. A second limit switch that is operated when the end cup 70 is extended outward from the center of the housing 30 and the inner surface 71 of the end cup 70 is beyond or in-line with the slot 36c in the collar 36, to allow the particulate matter 600 collected between the piston 50 and the end cup 70 to be forced, or gravity drained through the slot 36c in the collar 36 and exit the filter 20.

In addition to the information relating to the position of the piston 50 within the screen 40, the control system 90 receives data relating to the operational status of the filter 20. In one embodiment, the control system 90 receives signals that are proportional or representative of the pressure at the inlet aperture 33a of the housing 30 and a second signal that is proportional or representative of the pressure at the outlet aperture 33b of the housing 30. The differential pressure across the housing 30 is an indication of the relative ease of oil flow through the screen 40, the higher the differential pressure, the more restriction or resistance to oil flow through the filter 20 due to the increased amount of foreign material and particulate matter 600 on the inner surface of the screen 40.

In another embodiment, the control system 90 may receive signals proportional or representative of the differential pressure across the pump 120, with a larger differential pressure (due to lower inlet pressure) providing another indication of the restriction or resistance to oil flow through the screen 40. In yet other embodiments, the control system 90 may receive an input signal proportional or representative of the pressure (or vacuum) at the suction 122 of the pump 120.

In some embodiments, for example, the control system 90 may cause the piston 50 to translate through the housing 30 when the pump suction 122 pressure or vacuum reaches a level between 0 and 15 inches of mercury. More specifically, the control system 90 may actuate when the pump suction 122 pressure or vacuum reaches between approximately 3 to 5 inches of mercury. In still other embodiments, the control system 90 may receive a signal proportional to the mass flow rate of the oil leaving the outlet aperture 33b of the housing 30 and entering the pump 120 suction 122 as measured by an internal flow meter.

The control system 90 is programmed to selectively cause rotation of the threaded rod 62 (by operation of the motor 64 and clutch 66 (when provided) to cause the piston 50 to translate through the screen 40 upon an indication that the restriction or resistance to oil flow through the filter 20 has increased above a certain threshold. The control system 90 includes software and/or hardware that is programmed with logic to control the operation of the threaded rod 62 based on the input position and oil pressure or flowsignals, discussed above.

The control system 90 causes the threaded rod 62 to rotate in one of the two rotational directions depending on the position of the piston 50 within the screen 40 and the direction that the piston most recently moved along the length of the screen 40. Specifically, the control system 90 may operate to ensure that piston 50 reciprocates in a first direction Z (FIGS. 6a-7b) along the length of the screen 40 to contact the first end cup 70 and then translate in the opposite second direction Y of the screen 40 to contact the second end cup 70. This ensures that particulate matter 600 on both sides of the piston ring 52 is eventually expelled from the filter 20 through the slots 36a in the collars 36, allowing for particulate removal in both directions of travel. In some embodiments, the control system 90 may include a set delay time to maintain the piston 50 at one of the two extended positions (FIGS. 6b, 7b) for a set period of time to allow adequate time for the particulate matter 600 between the piston 50 and the end cap 70 to be expelled from the filter 20. In some embodiments, the control system 90 may include a routine where the piston 50 causes and additional outward motion of the end cap 70 after returning to the housing 30 to further expel particulate matter 600 that may remain between the piston 50 and the end cap 70 after the first removal cycle.

An exemplary logic diagram for the operation of the control system 90 is provided in FIGS. 24a-24d. Initially, the control system checks to see whether the oil within the vat 14 is at nominal operational temperature using an internal RTD, thermocouple, or other type of temperature sensor (not show). If needed, the control system 90 selectively operates the oil pump 120 to circulate oil through the internal piping as shown in step 710 while adding heat to the oil from the heat exchanger 130 (or electric heaters 144). During this initial circulation, the oil pump 120 may initially operate at slower speeds to circulate less oil until the oil temperature increases and the oil becomes less viscous.

Figure 26:
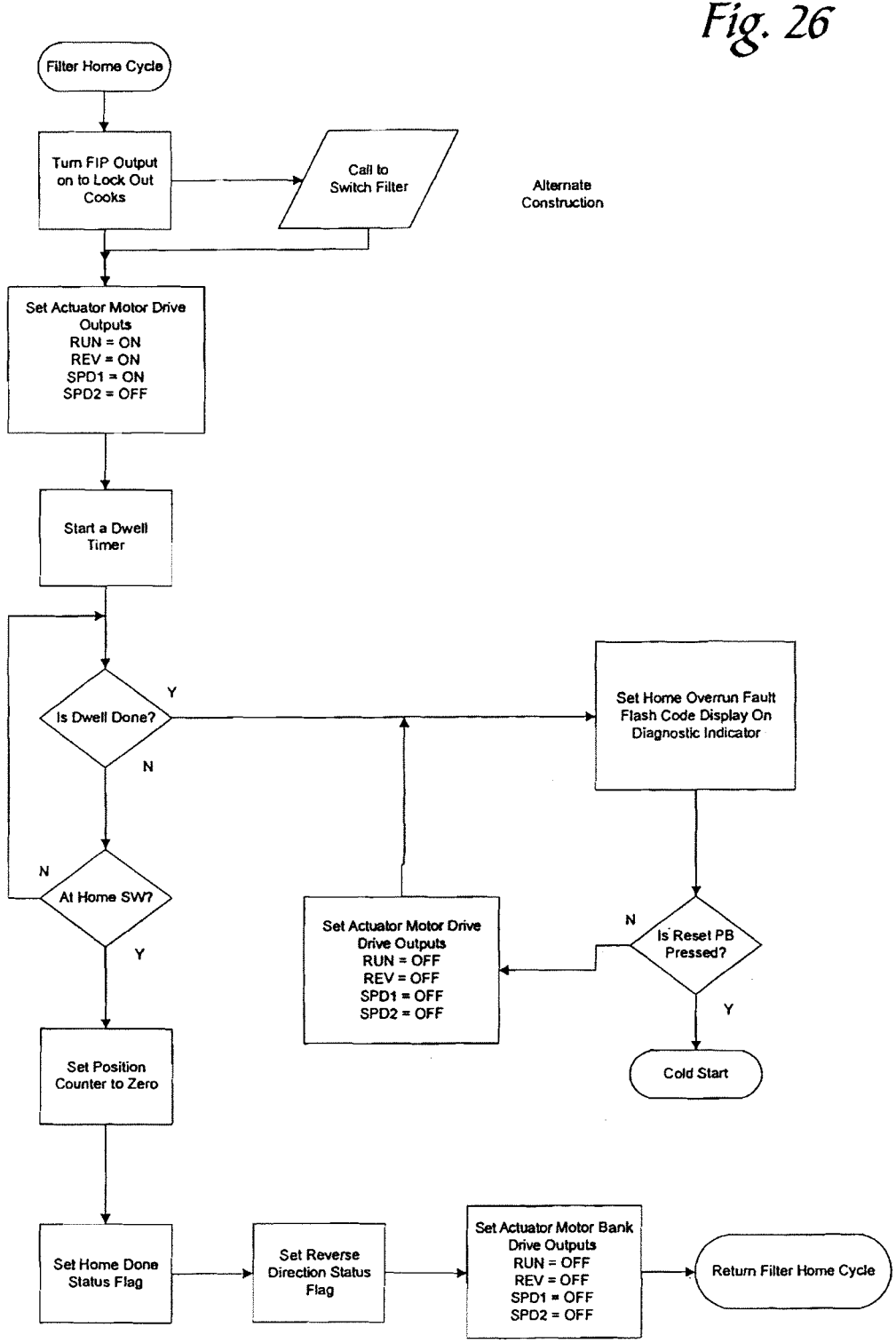
FIG. 26 is an exemplary logic diagram for the starting position circuit of the control system of FIGS. 24a-24d.

Upon initial startup, the control system 90 checks to see whether the piston 50 is at the normal starting position by checking the position of a limit switch at the starting position, as in step 720. If the piston 50 is not at this starting point, the control system 90 operates the motor 64 to rotate the threaded rod 62 to translate the piston 50 to the starting position in accordance with FIG. 26. Upon reaching the starting position, the control system monitors to see if an operation signal is obtained as in step 730. As discussed herein the operation signal may be from a pressure of vacuum sensor, a pressure sensor, a flow sensor, or the like and the operation signal is received whenever the monitored parameter reaches a point that is representative of increased resistance to oil flow due to significant screen 40 blockage.

Upon sensing the operation signal, the control system determines the direction that the piston 50 should move, based on the position of the forward flag in step 740. When the piston is at the starting position, the forward flag will be on, and when not at the starting position (i.e. in situations after the first piston cycle to the second end 332 of the housing 330) where the forward flag will be off.

Upon sensing the direction for piston 50 based on the position of the forward flag, the control system 90 energizes the motor 64 to rotate the threaded rod 62 to translate the piston 50 to the opposite side of the housing 30, as in step 750 or step 755 (depending on the position of the forward flag). While the piston 50 translates through the housing 30, the control system 90 monitors the movement of the piston 50 using the structure discussed above. When the piston 50 comes close to reaching the opposite end of the housing 30, the control system 90 may decrease the rotational velocity of the piston 50 as in step 760 (765). When the piston 50 approaches an end of the housing 30, the piston 50 directly or indirectly (with particulate matter 600 therebetween) contacts the respective end cap 70 and with additional piston 50 motion extends the end cap 70 away from the housing 30.

Eventually, the control system 90 senses that the piston 50 has reached its outer limit of piston 50 travel and the control system 90 stops the motor 64 and the threaded rod 62. The control system 90 may allow the piston 50 and end cap 70 to be maintained at this position to allow the particulate matter 600 to be expelled or drain from the housing 30.

Figure 25A:
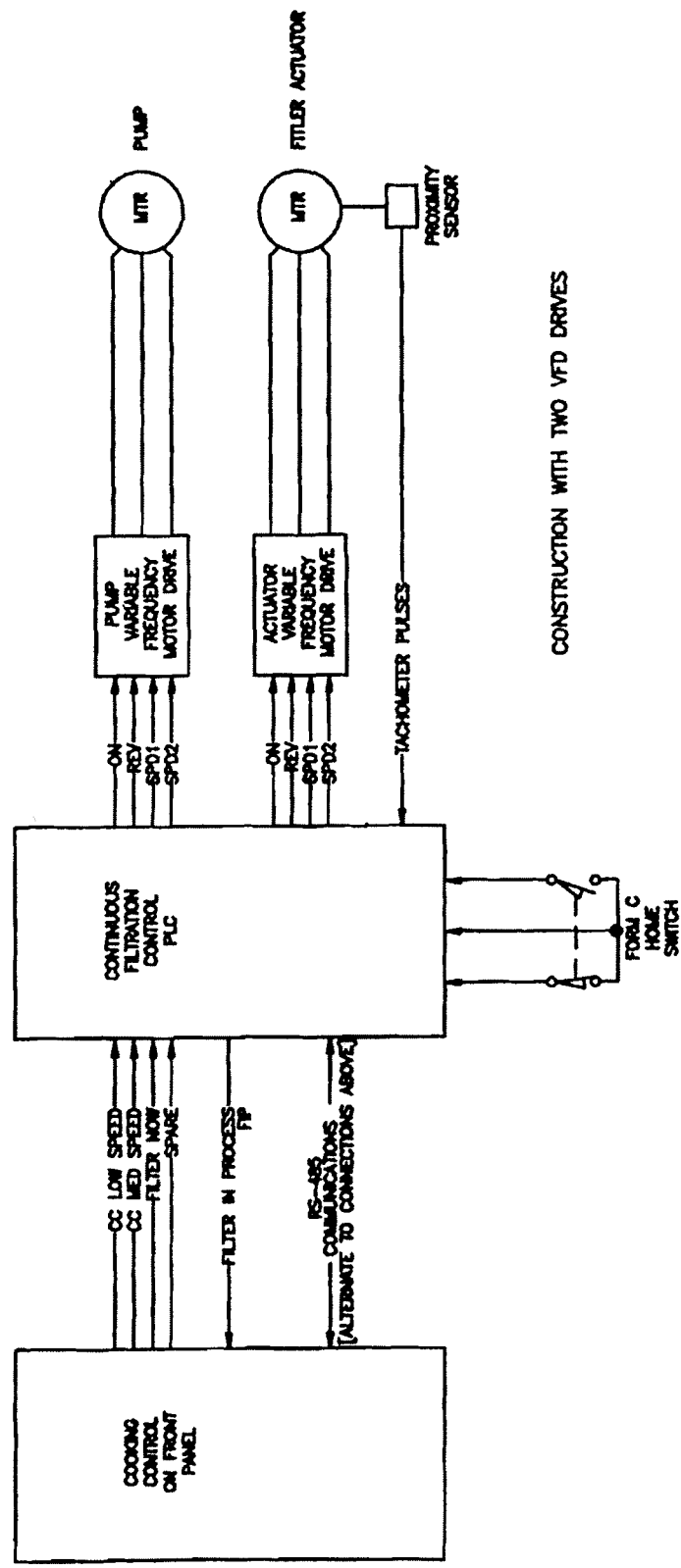
FIGS. 25a and 25b are exemplary logic diagrams for control the oil pump and threaded rod of the fryer of FIG. 1.
Figure 25B:
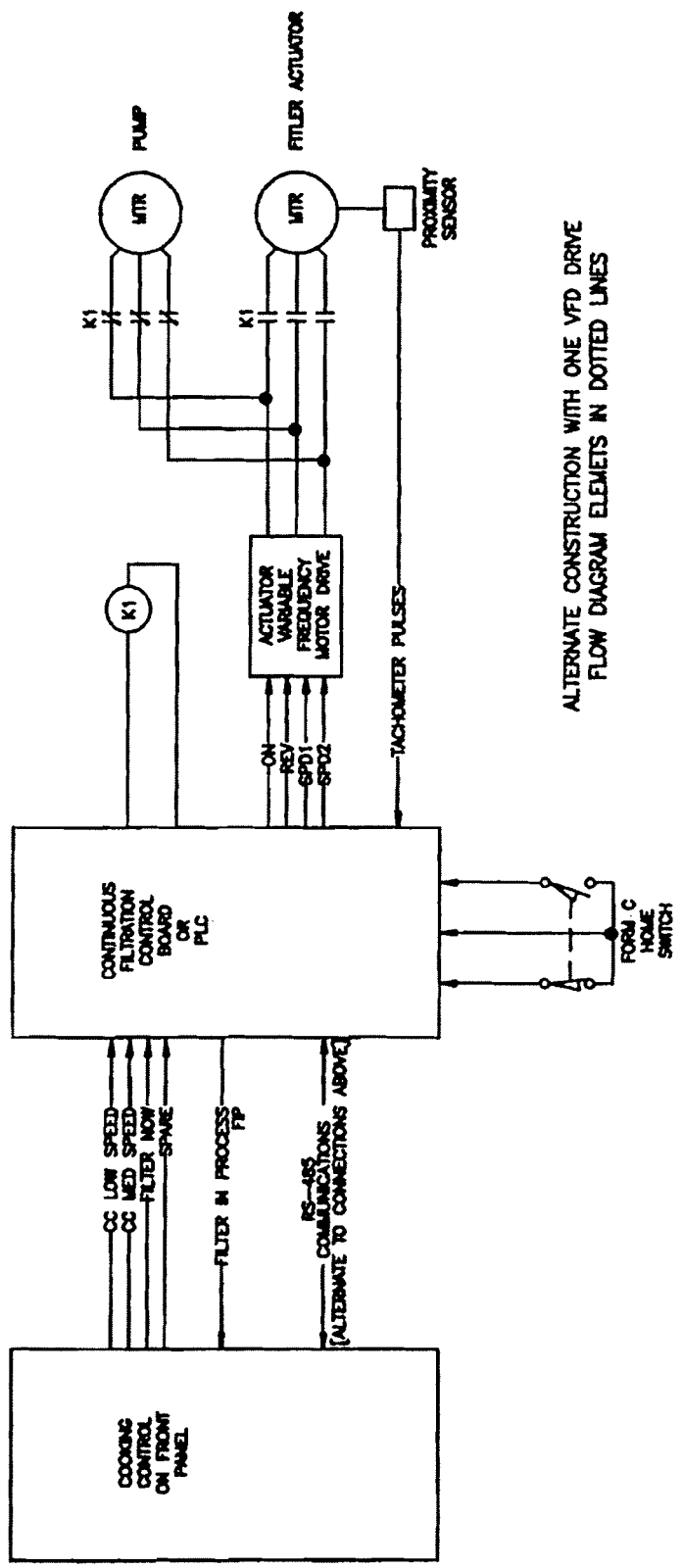

After a time delay, the control system 90 causes rotation of the threaded rod 62 in the opposite direction, translating the piston 50 in the opposite direction toward the opposite end cap 70, as shown in step 770 (775). This piston 50 translation allows the end cap 70 to return to its normal position due to the biasing force of the biasing member 78 to again provide an oil seal to the respective end of the housing. After sufficient inward movement of the piston 50 as sensed by the control system 90, the control system 90 stops piston movement and maintains the piston 50 at that position within the housing 30, and returns to step 730 where the control system 90 monitors for an operation signal in accordance with step 730. As discussed above, the fryer 10 may include dedicated drive motors for both the oil pump 120 and the threaded rod 62, which are operated by the control system in accordance with FIG. 25a and an alternate embodiment shown in FIG. 25b.

In some embodiments, the control system 90 may have manual inputs to allow the user to order the control system 90 to move the piston 50 within the screen 40, regardless of the position of the piston 50 or the operational parameters of the filter 20. In yet other embodiments, the control system 90 may include a time clock that controls the operation of the piston 50 at specified preprogrammed or user defined time intervals or cook cycles, in addition to or in place of the operational inputs of the filter 20 and the position inputs of the piston 50.

A pump 120 is fluidly connected to the output aperture 33b of the housing 30. Specifically, a suction, or inlet, 122 of the pump 122 is fluidly connected to the output aperture 33b of the housing 30, such that the operation of the pump 120 pulls or drags oil from within the internal volume 44 of the screen 40 through the plurality of holes 46, into the annulus 39 and eventually through the output aperture 33b to the inlet 122 of the pump 120. In one embodiment, at least one of the output apertures 33b of the housing 30 is located so as to allow steam that may have been entrained in the oil to be vented from the housing 30 by the oil pump 120. The oil discharges from the pump 120 at an elevated pressure that provides the motive force for oil to travel through the heat exchanger 130 and return at a higher temperature to the vat 14 for cooking food product.

In operation, the piston 50 is initially located at an initial position within the internal volume of the screen 40. With operation of the pump 120, oil that gravity drains into the internal volume 44 of the screen 40 is urged through the plurality of holes 46 defined in the surface area of the screen 40 due to the suction forces of the pump 120. With continued operation, a significant amount of foreign particulate matter 600 builds up on the inner surfaces of the screen 40 because the particulate matter 600 could not fit through the relatively small minimum diameter of the plurality of holes 46.

With operation and collection of particulate matter 600 on the internal surface of the screen 40, the restriction or resistance to oil flow through the screen increases due to blockage of the plurality of holes 46. The control system 90 detects this increased resistance, as discussed above. When the monitored system resistance reaches a predetermined level (either preprogrammed at the factory, or a user defined level) the control system 90 generates an operation signal in accordance with step 730 of FIG. 24a, and rotates the threaded rod 62 in one of the two rotational directions. The rotation of the threaded rod 62 causes the piston 50 to translate in the specific direction Y, Z along the inner volume of the screen 40. The piston ring 52 scrapes against the inner surface of the screen 40 removing particulate matter 600 and restoring the oil flow through the plurality of holes 46. With the blockage of the screen 40 removed, the restriction or resistance to oil flow through the filter 20 decreases.

With continued motion of the piston 50, the particulate matter 600 that was scraped from the screen 40 is pushed toward one of the two end cups 70. During its translation, the piston 50 travels along the length of the screen 40. The piston 50 does not completely block the flow of oil through the screen 40 during its travel. As the piston approaches the inner surface 71 of the end cup 70, the piston 50 directly or indirectly (through contact with the particulate matter 600 therebetween, (shown representatively and schematically in FIGS. 18b and 23 of the embodiments discussed below), forces oil out of the particulate matter 600 due to the compressive force felt by the particulate matter 600. The oil flows radially outward and through the plurality of holes 46 in the screen 40. Eventually, the piston 50 contacts the inner surface 71 of the end cup 70 or indirectly contacts the end cup 70 (with particulate matter 600 therebetween). With continued rotation of the threaded rod 62 in the same direction, the piston 50 urges the end cup 70 away from the opposing end cup 70 against the biasing force of the biasing member 78. During this motion the particulate matter 600 that was scraped from the screen 40 by the piston ring 52 is retained between the piston 50 and the end cup 70. With sufficient motion of the piston 50 to the removal position (FIGS. 6b, 7b), the contact point between the piston 50 and the end cup 70 is located over the slot 36c in the collar 36, which allows the particulate matter 600 between the two members to gravity drain from the filter 20 through the slot 36c. Further, as the piston 50 moves the end cup 70 away from the housing 30, the inward biasing force on the end cup 70 increases, which similarly increases the compressive forces felt by the particulate matter 600 between the piston 50 and end cup 70. Eventually, the compressive force on the particulate matter 600 may increase above the compressive strength of the particulate matter (when in a block or solid form), causing the particulate matter 600 to crumble and be expelled from the housing 30 through the slot 36c.

As discussed above, the control system 90 receives signals that are proportional to or representative of the position of the piston 50 within the screen 40 and with respect to each of the slots 36c defined on the collars 36. When the control system 90 senses that the face of the piston 50 is above the slot 36c, the control system 90 stops the rotation of the threaded rod 62. After a short delay time to allow all of the particulate matter 600 to gravity drain through the slot 36c, the control system 90 causes the threaded rod 62 to rotate in the opposite rotational direction. This rotation causes the piston 50 to translate in the opposite direction, toward the center of the screen 40, which allows the end cup 70 to similarly translate toward the opposing end cup 70 due to the inward biasing force of the biasing member 78 until the end cup 70 seals the respective end of the housing 30 with the assistance of the seal 75.

With sufficient linear motion toward the center of the screen 40, the piston 50 is entirely disposed within the screen 40 and the end cup 70 is restored to its operational position (FIGS. 6a, 7a), where the internal biasing force of the biasing member is minimized. When the piston 50 reaches this position, the control system 90 receives a signal (in embodiments including limit switches) or processes the position of the piston 50 (in embodiments where the control system 90 counts the rotations of the threaded rod 62), causing the control system 90 to secure the rotation of the threaded rod 62 and maintain the piston 50 at that position within the screen 40. The piston 50 remains at rest until the control system 90 senses another increase in flow restriction or resistance, wherein the control system 90 performs the same steps as discussed above to translate the piston 50 to the opposite end of the screen 40 and remove additional foreign matter from the internal volume of the screen 40 and push the particulate matter 600 out of the housing 30 as discussed above.

Figure 18A:
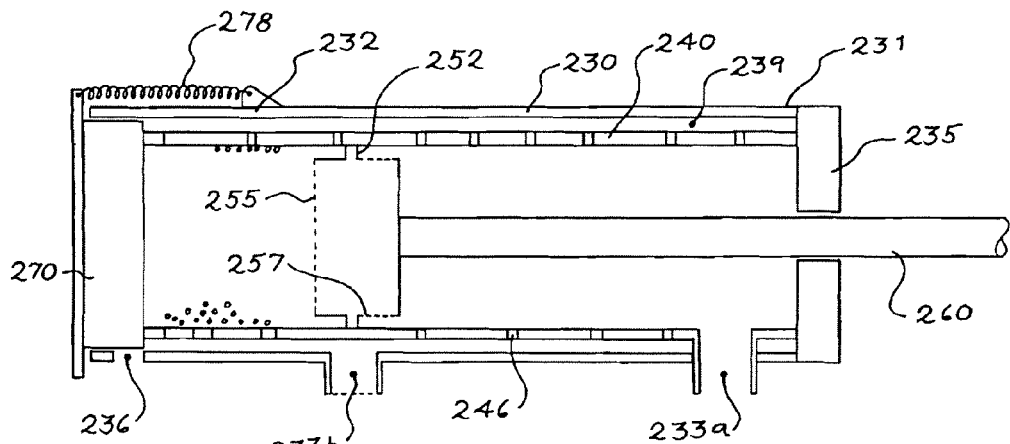
FIG. 18a is a cross-sectional view of the filter of FIG. 17 showing the piston in an operating position.
Figure 18B:
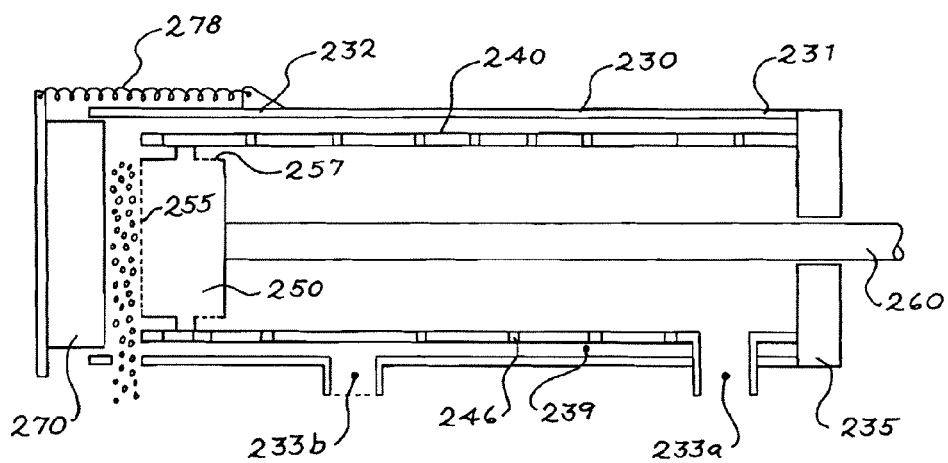
FIG. 18b is the view of FIG. 18a showing the piston in a removal position.
Figure 19:
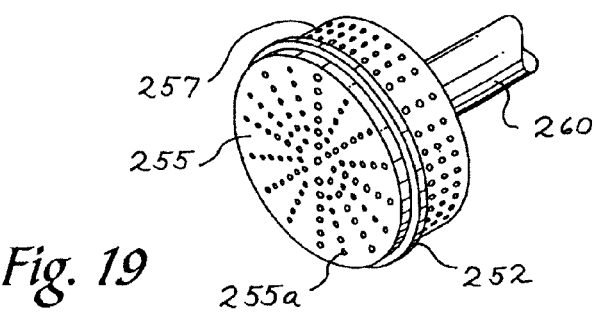
FIG. 19 is a perspective view of the piston of the filter of FIG. 17.

Turning now to FIGS. 17-19, and alternate filter 220 is provided. The filter 220 includes a housing 230, a screen 240 disposed within the housing 230, and a piston 250 that is translatably mountable within the housing 230. The filter 220 is disposed below the vat 14 to receive oil from the vat 14 through an inlet aperture 233a and into the internal volume of the screen 240 through an inlet aperture 243 of the screen 240. The screen 240 includes a plurality of holes 246 defined along the majority of the surface area of the screen 240 to allow oil to flow through the holes 240, but substantially prevent particulate matter 600 (shown schematically in FIG. 18b) entrained with the oil from flowing through the plurality of holes 240. The screen 240 may be substantially the same as the screen 40 discussed with respect to the previous embodiment.

The piston 250 is formed with a screen 255 that includes a plurality of apertures 255a defined on the leading face, or bottom surface, of the piston 250. The screen 255 is formed similarly to the screen 240, wherein oil is free to flow therethrough, but particulate matter 600 is substantially prevented from flowing through the second screen 255. Oil flowing through the screen 255 flows through the internal volume of the piston and out the open trailing end of the piston 250. The piston 250 includes at least one ring 252, which when compressed is substantially the same diameter as the internal diameter of the screen 240, which allows the piston ring 252 to scrape the screen 240 to remove particulate matter 600 adhered to the screen 240 with longitudinal relative motion between the two.

The first end 231 of the housing 230 is enclosed with a cap 235 to prevent oil from leaving the housing 230 from the first end 231. The cap 235 includes an aperture to allow the follower 260 (discussed below) to extend therethrough. The opposite second end 232 of the housing 230 includes a plug 270 that is movably connected to the housing 230 with a spring or other biasing member 278. The plug 270 is normally biased to a position where the plug 270 substantially blocks oil from leaving the housing 230 from the second end 232. The plug 270 is longitudinally movable along the housing against the biasing force of the spring 278 when contacted by the piston 250, which allows the particulate matter 600 between the plug 270 and the second screen 255 on the bottom surface of the piston 250 to be compressed, fracture (if in solid block-like form) and be expelled or gravity drain) the housing 230 from a slot 236 that becomes exposed when the plug 270 is sufficiently deflected (as shown in FIG. 18b).

The piston 250 is urged longitudinally through the screen 240 and the housing 230 with a follower 260 that pushes the piston 250. The follower 260 may be mechanically connected to a motor (not shown) with a rack and pinion gear train (not shown), which translates rotation of the motor shaft (not shown) to linear motion of the follower 260. In other embodiments, different structures and mechanisms that are known in the art may be provided to cause selective reciprocating linear motion of the piston 250 through the screen 240.

Similar to the embodiment discussed above, the filter 220 may be operatively controlled by a control system 90 (similar to the control system 90 discussed with respect to the embodiment above and shown in FIG. 20), which causes the piston 250 to translate through the screen 240 when the control system 90 senses increase in flow resistance through the filter 220 due to mechanical blockage of the filter 240. When the control system 90 senses a sufficient increase in flow resistance (using at least some of the measured parameters discussed above), the control system 90 activates the motor, which causes the piston 250 to slide across the screen 240. The piston 250 scrapes the foreign particulate matter 600 from the screen 240, which becomes deposited between the piston 250 and the plug 270.

Additionally, relatively pure oil flows through the screen 255 in the piston 250, which deposits additional particulate matter 600 removed from the oil and prevented from flowing through the second screen 255 between the piston 250 and the plug 270. With sufficient motion of the piston 250, the piston 250 contacts the plug 270 and begins to translate the plug 270 against the biasing force of the spring 278. The screen 240 may not extend around the area of the housing 230 that supports the dual motion of the piston and plug 250, 270, so oil between the piston and plug 250, 270 must flow through the screen 255 in the piston 250, which reduces the oil content entrained between the two members.

With sufficient motion of the plug 270, a slot 236 in the housing 230 is exposed, which allows the particulate matter 600 to be forced or gravity drain from the housing 230 into a pan (not shown) or another suitable structure. The control system 90 then withdraws the piston 250 back to the first end 231 of the housing 230 and awaits another operational cycle. As the piston 250 is pulled away from the second end 232 of the housing 230 by the follower 260, the plug 270 seals against the end of the housing 230 (with the assistance of a seal (not shown) disposed on one or both of the housing 230 and the plug 270, and is restored to its initial position by the spring 278.

Figure 22:
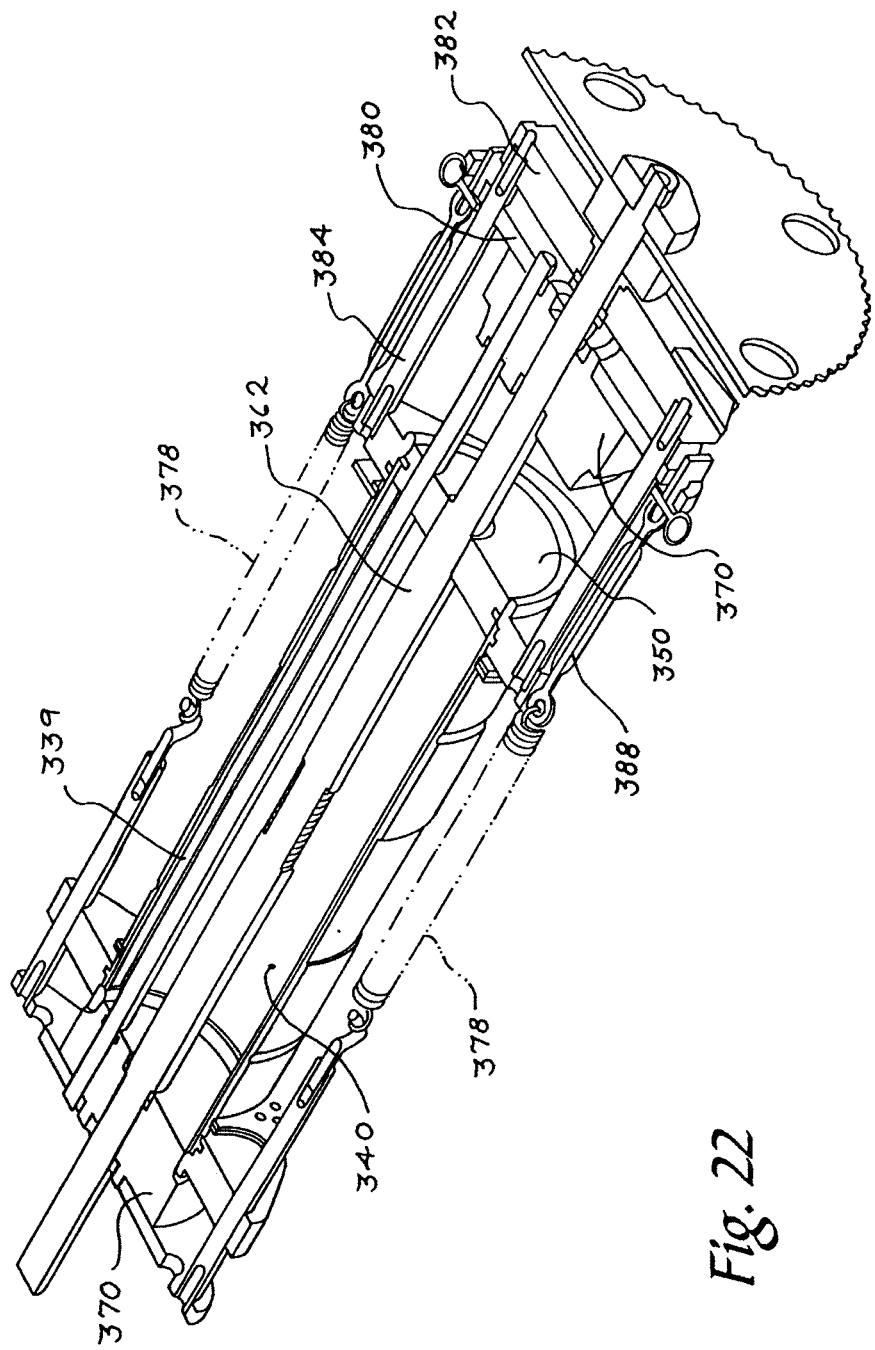
FIG. 22 is a cross-sectional view of the filter of FIG. 21.
Figure 24A:
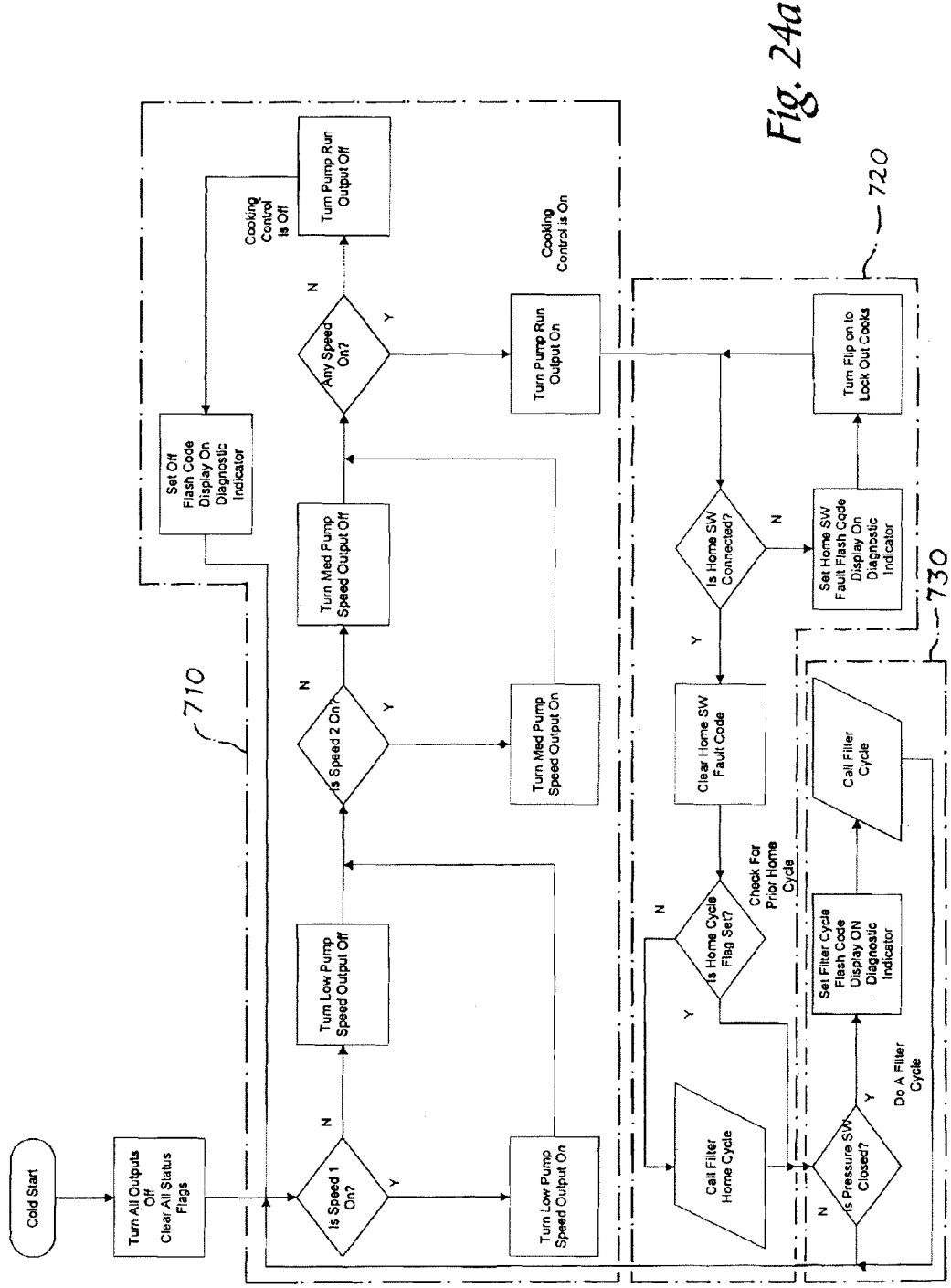
FIGS. 24a-24d are portions of an exemplary logic diagram for the operation of the control system of the filter for the fryer of FIG. 1.
Figure 24B:
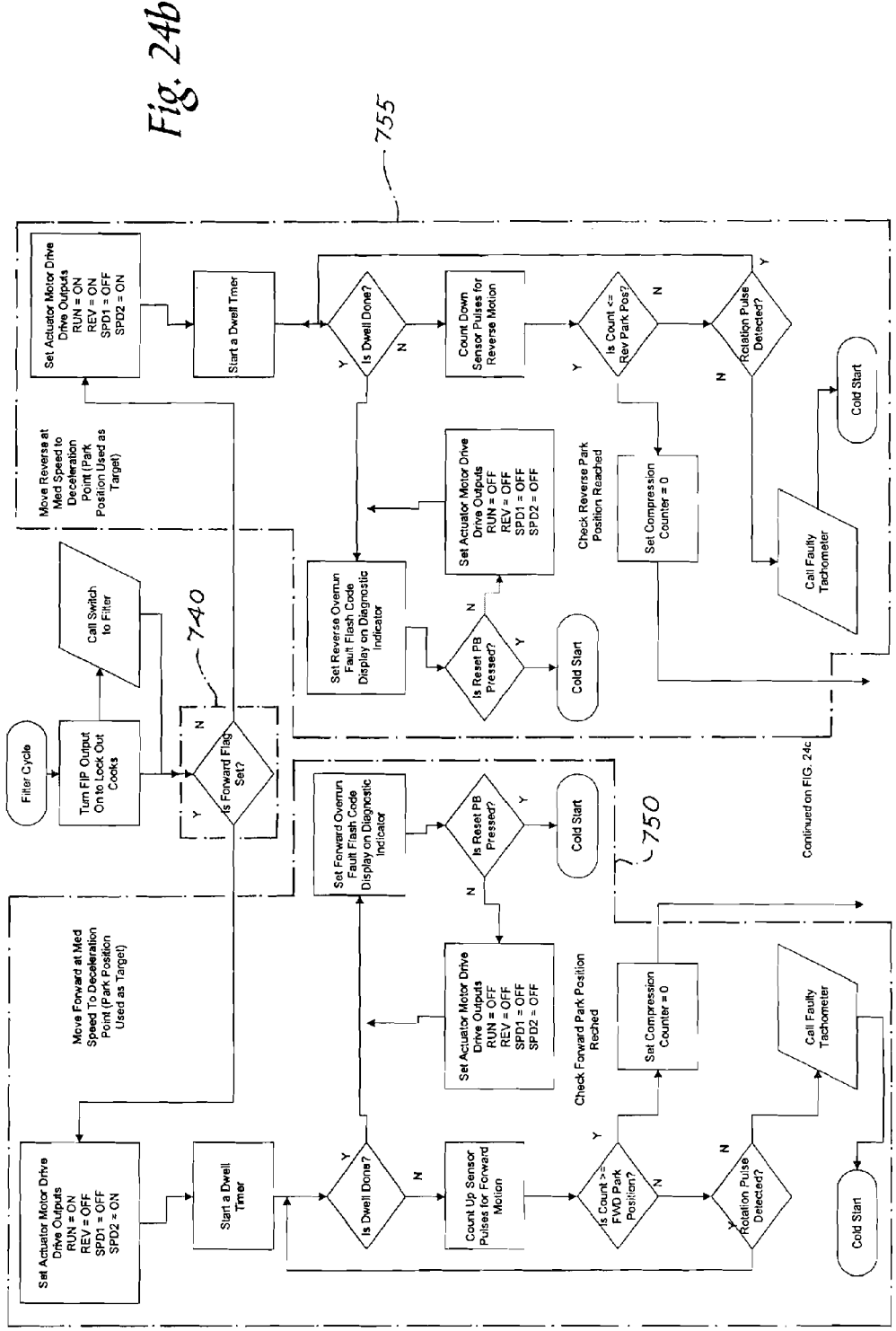
Figure 24C:
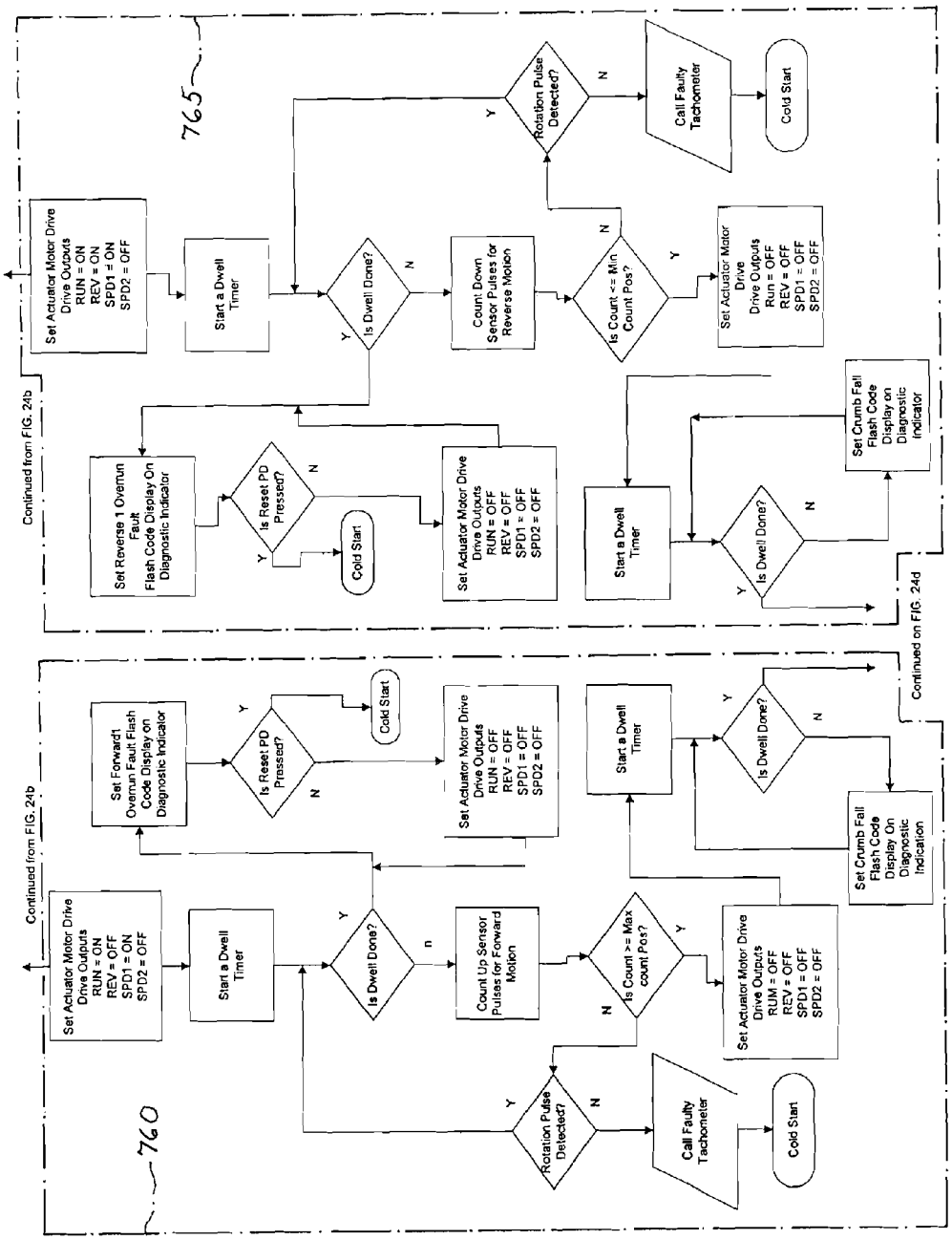
Figure 24D:
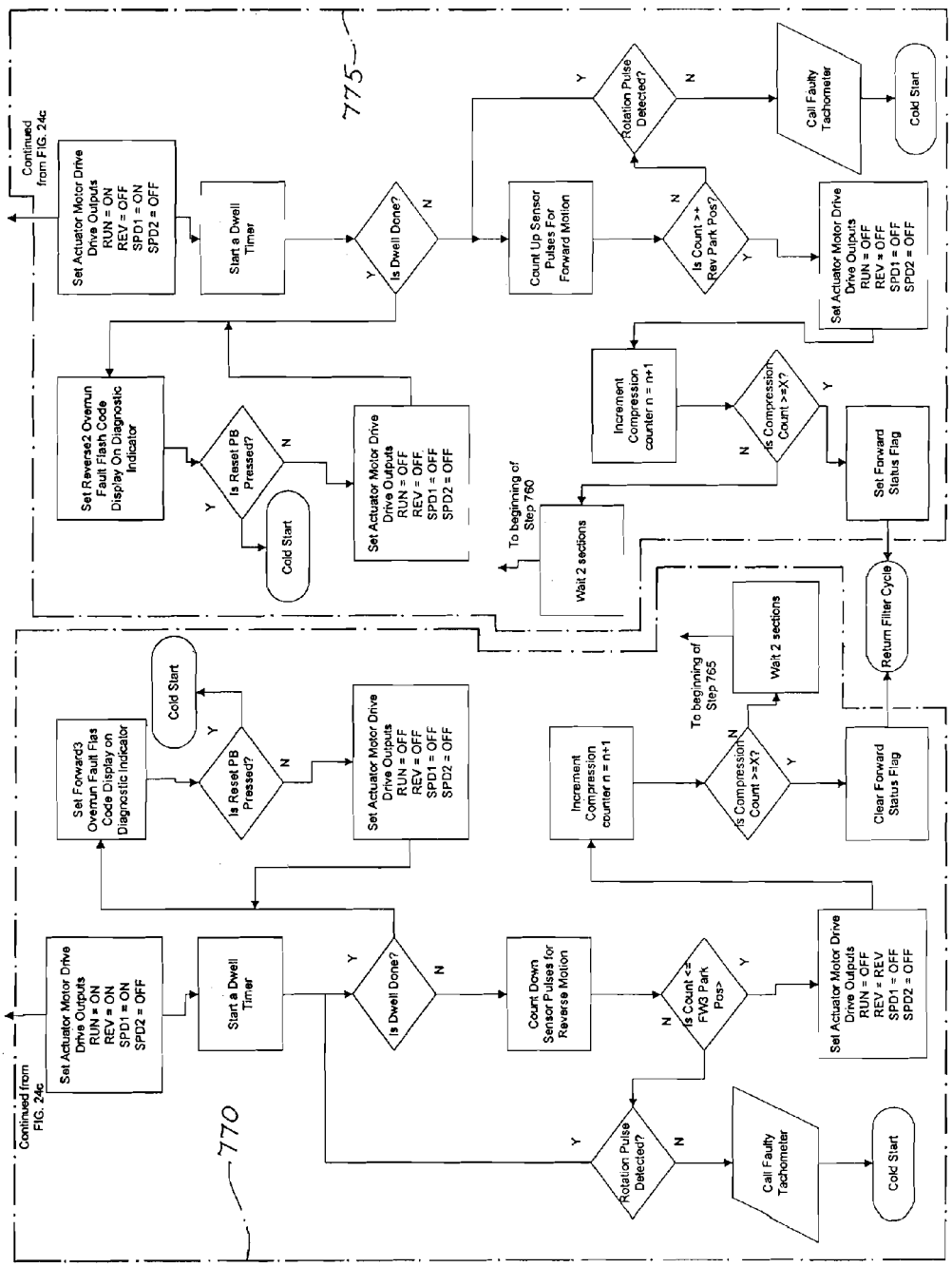

Turning now to FIGS. 21-23, an alternate filter 320 is provided. The filter 320 includes a housing 330, hollow cylindrical screen 340 that is coaxially disposed within the housing 330. A piston 350 is slidingly disposed within the internal volume of the screen 340 such that the outer circumferential surface of the piston 350, or piston ring 352, contacts the inner surface of the screen 340 as the piston 350 translates within the screen 340. The piston 350 is formed and operated similarly to piston 50 discussed above. As with the first embodiment discussed above, the piston 350 translates within the screen 340 due to the rotation of a threaded rod 362 that extends through the center of the piston 350, as controlled by the control system 90 discussed above and shown in FIG. 20.

End caps 370 are longitudinally movably mounted to each of the opposing first and second ends 331, 332 of the housing 330. The end caps 370 are inwardly biased by a spring 378 or other biasing member, which may be constrained to the opposing end cap 370 or alternatively, dedicated springs 378 for each end cap 370 may be provided and secured to the housing 330 or another rigid portion of the filter 320. As best understood with reference to FIGS. 22 and 23, one of the two end caps 370 is always disposed such that the end cap 370 provides a seal to an end of the housing 330 to substantially prevent oil leakage from the respective end of the housing 330 and the screen 340. When performing the extraction process the opposite end cap 370 may be translated longitudinally outward away from the opposing end cap 370 until the end cap 370 no longer contacts the housing 330.

The outward longitudinal motion of the end cap 370 is constrained by a shoe 380 that is fixed to the outer end of the end cap 370 (i.e. the end facing away from the opposing end cap 370). The shoe 380 is biasingly engaged with the spring 378, which urges the shoe 380, and therefore the end cap 370) toward the opposing end cap 370. In some embodiments, a turnbuckle 388 may be disposed between an end of the shoe 380 and the spring 378, which allows the spring 378 to be adjusted by rotating the turnbuckle 388. Each end of the shoe 380 includes an aperture (not shown) that receives a guide rod 384 that is extendable between an end of the housing 330 and a cross-bar 382 to guide the longitudinal movement of the end cap 370.

The end cap 370 is longitudinally movable away from the respective end 331, 332 of the housing 330 due to the longitudinal movement of the piston 350. An end of the piston 350 may directly contact the inner surface of the end cap 370 to urge the end cap 370 outwardly, or in some operational situations the piston 350 may indirectly contact the end cap 370 to urge outward motion with a chunk or volume of particulate matter 600 (shown schematically as 600 in FIG. 23) disposed between the two members to transfer force from the piston 350 to the end cap 370. The particulate matter 600 may be in the form of a substantially solid block or the particulate matter 600 may be granular.

As the end cap 370 is urged further and further from the end of the housing 330 the particulate matter 600 becomes no longer enclosed within the housing 330 and becomes suspended between the piston 350 and the end cap 370 outside of the housing 330 due to the compressive force felt by the particulate matter 600. Any particulate matter 600 that is in the granular form may fall from between the piston 350 and the end cap 370 to a pan or other retention member. With further compression (due to the increasing inward biasing force on the end cap 370) the compressive forces felt by any remaining chunks of particulate matter 600 similarly increases until the block yields to the force and crumbles to a substantially granular form, or a plurality of smaller blocks.

After the particulate matter 600 crumbles or yields, a substantial portion is free to fall from between the piston 350 and the end cap 370 due to gravity. As the particulate matter 600 is removed from the filter system 320, the end cap 370 moves toward the piston 350 due to the outward biasing force on the end cap 370.

After substantially all particulate matter 600 is removed from between the piston 350 and the end cap 370, the control system 90 rotates the threaded rod 362 in the opposite direction to translate the piston away from the end cap 370 and toward the center of the screen 340 for a sufficient amount of inward piston 350 travel to allow the end cap 370 to return to the end of the housing 330 due to the biasing force of the spring 378 and provide a seal on the end of the housing 330 to substantially prevent oil from leaking from that end of the housing 330. In some embodiments, the control system 90 may include a routine where the piston 350 causes and additional outward motion of the end cap 370 after returning to the housing 330 to further expel particulate matter 600 that may remain between the piston 350 and the end cap 370 after the first removal cycle.

As discussed above, the control system 90 monitors the operational parameters of the filter 320 and eventually causes the piston 350 to translate to the opposite end of the housing 330 to remove particulate matter 600 from the inner surface of the screen 340 and ejection between the piston 350 and the opposite end cap 370.

Turning now to FIGS. 27-32, an alternate cooking appliance is provided. The cooking appliance may be a deep fat fryer 1700, or another type of cooking appliance, such as a pasta cooker or rethermalizer, where a food product is cooked in a volume of heated liquid. One of ordinary skill in the art will recognize that the disclosure herein can be used successfully on other machines where there is a need to continuously remove particulate matter from a volume of liquid therein and/or provide heat to the liquid after removing particulate matter from the liquid.

Figure 20A:
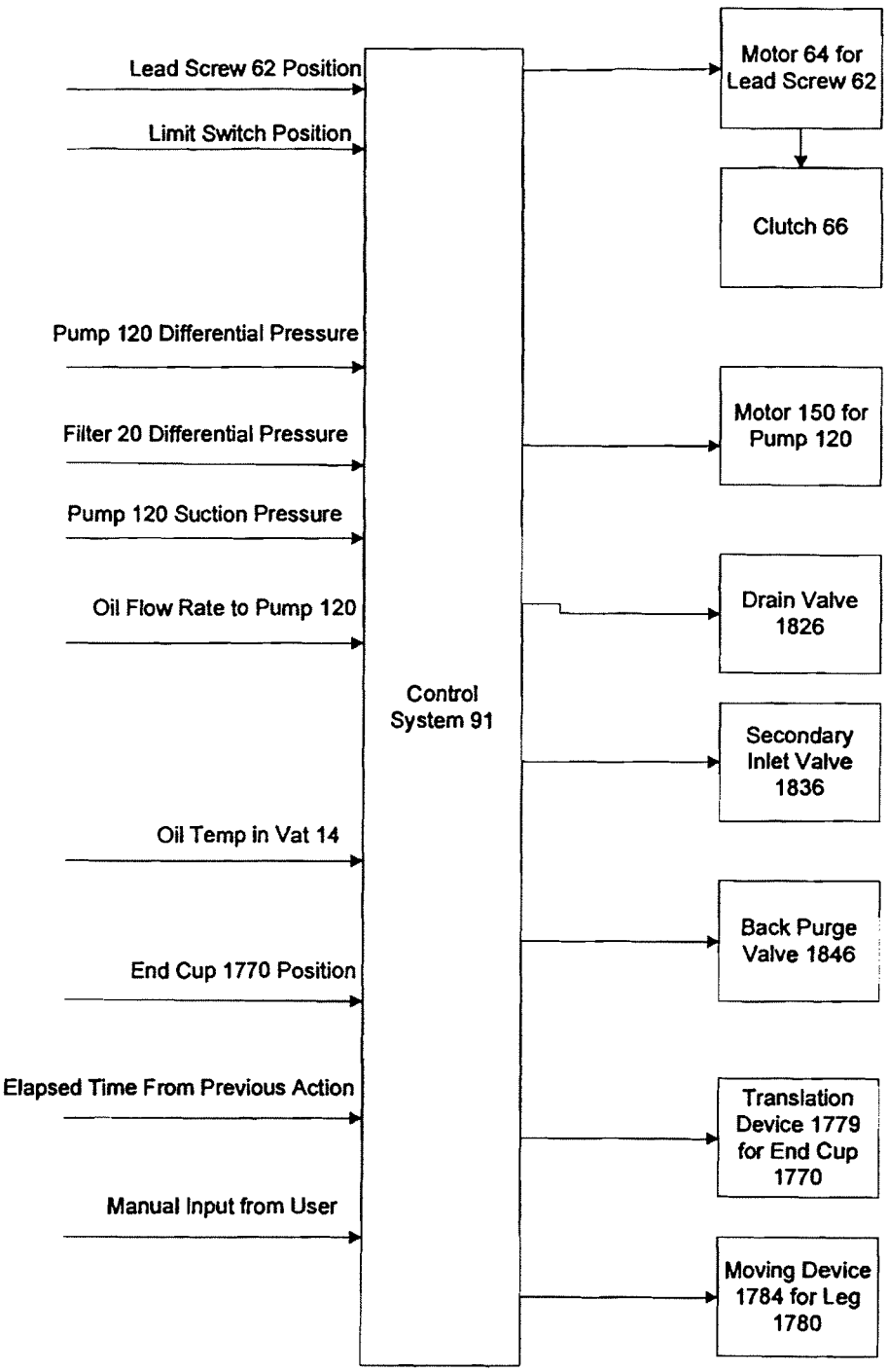
FIG. 20a is a schematic view of another control system.

The fryer 1700 is constructed similarly to the fryer 10 discussed above and components with like element numbers are similar to those similar components discussed above. The fryer 1700 includes a housing 12 that mechanically supports all of the components of the fryer 1700 and a vat 14 that provides an open volume for storing and heating a quantity of cooking oil for frying a food product placed therein. In other types of cooking appliances the vat 14 is configured to store other liquids that are heated to cook a food product. The fryer 1700 further includes a heat source 15 that provides heat to the cooking oil stored within the open vat 14. The heat source may be a provided by burning natural gas or similar fuel in an open flame that heats air passing through the fryer 1700, or alternatively, the heat source may be provided by a plurality of electrical heaters (not shown) that are disposed in the proximity of the vat 14 or another portion of the fryer 1700 where heat from the heaters may be transferred to the oil of the fryer 1700. The components of the fryer 1700 and the continuous filter system discussed herein are operated by the control system 91 (FIG. 20*a*). The detailed logic drawings of the control system 90 discussed above and shown in FIGS. 24*a*-24*d* are illustrative of the logic methodology used to operate the control system 91.

The fryer 1700 includes a primary filter 1720, a secondary filter 1790 assembly, and an oil circulation system 1810 that allows oil to selectively flow from the vat 14 through one or both of the secondary filter assembly 1790 and the primary filter 1720, a pump 120 and heat exchanger 130, and return to the vat 14. Oil flow through the oil circulation system 1810 is urged with a pump 120 that may be disposed between the primary filter 1720 and secondary filter assembly 1790 and the heat exchanger 130.

Figure 28:
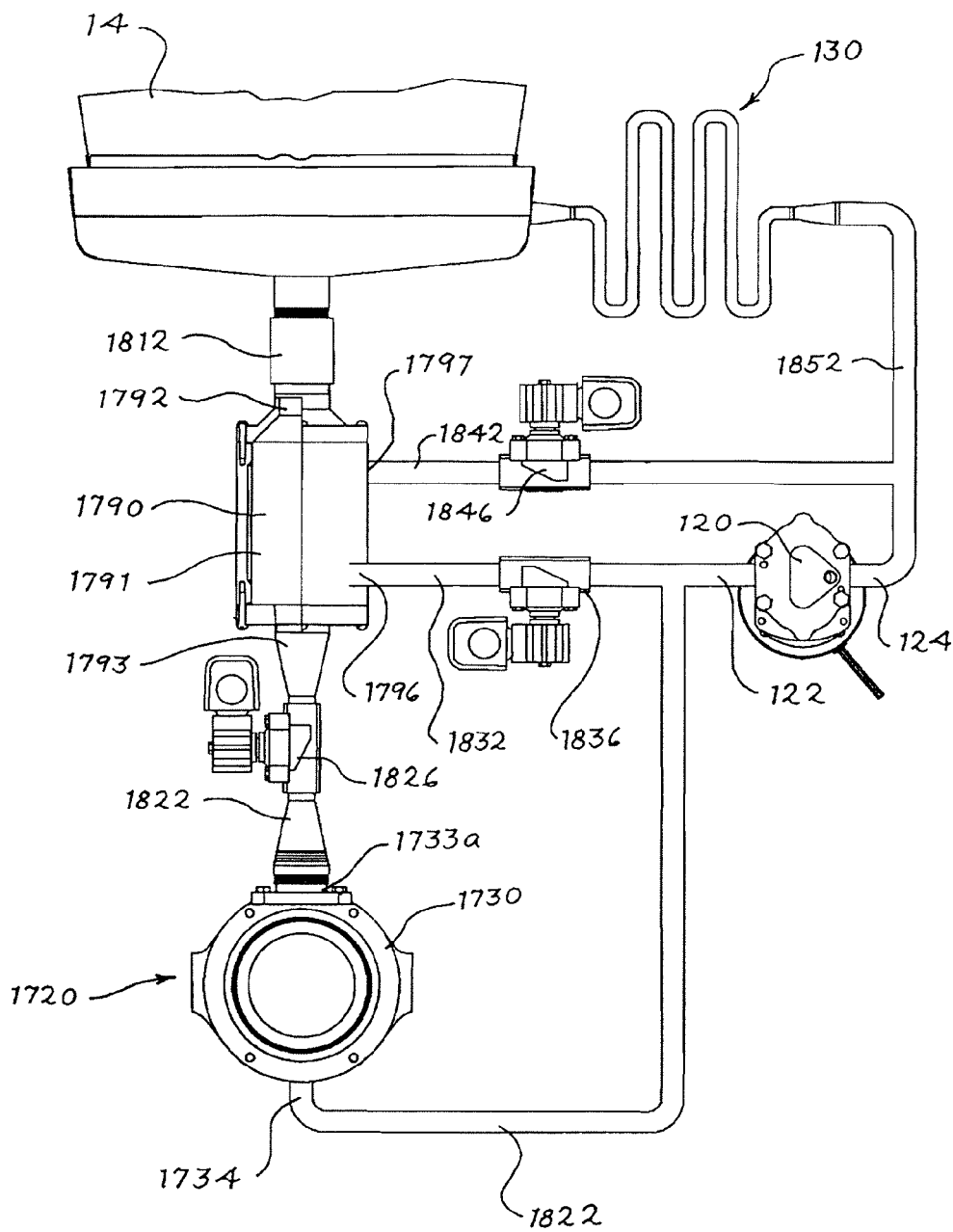
FIG. 28 is a schematic view of the oil flowpath through the fryer of FIG. 27.

As best shown in FIG. 28, the pump 120 draws a suction from one of the two potential oil flow paths, either a primary branch 1822 drawing suction from the primary filter 1720, or urging oil through a secondary branch 1832, which draws suction upon a secondary screen 1794 in the secondary filter assembly 1790. The pump 120 is discussed in further detail below.

As discussed in greater detail below, the oil circulation system 1810 includes five branches configured for oil flow therethrough. An inlet branch 1812 allows oil to gravity drain from the vat 14 to the inlet 1792 of the secondary filter assembly 1790. A discharge path 1852 is configured to allow oil to flow from the discharge 124 of the pump 120 to the heat exchanger 130 and ultimately return to the vat 14. In other embodiments, the inlet branch 1812 may include a pump (not shown) to urge oil from the vat 14 to the secondary filter assembly 1790.

A primary oil flow branch 1822 extends from a normal oil outlet 1793 of the secondary filter assembly 1790 through the primary filter 1720 and to the pump suction 122. A drain valve 1826 may be provided between a normal outlet 1793 of the secondary filter assembly 1790 and the oil inlet 1733*a* of the primary filter 1720 and is operable to selectively prevent oil flow between the secondary filter assembly 1790 and the primary filter 1720. The drain valve 1826 is normally open, but can be shut to secure the oil flow through the primary filter 1720 depending on the position of the piston 1750 within the housing 1730, as discussed below.

In other embodiments shown in FIGS. 33-35*a*, the piston 1750 or an alternate piston 1750*a* (discussed in greater detail below) may include a skirt 1757 that extends rearwardly from the front face 1754 of the piston 1750 (or front face 1754*a* of the piston 1750*a*). The skirt 1757 is a cylindrical, hollow tube with an inner diameter slightly less that the inner diameter of the screen 1740. The skirt 1757 is configured to block the inlet aperture 1733*a* of the housing 1730 and the inlet aperture 1743 of the screen 1740 when the front face 1754 of the piston 1750 is disposed between the inlet aperture 1733*a* and the operational end 1732 of the housing 1730. The skirt 1757 accordingly prevents oil from entering the internal volume of the housing 1730 behind the piston 1750, wherein any particulate matter filtered from the oil through the screen 1740 and disposed between the piston 1750 and the end plug 1761 cannot be removed during normal operation of the primary filter 1720. The skirt 1757 may include one or more rings (not shown but similar to rings 52 discussed above) that are configured to scrape against the inner surface of the filter 1740 to remove particulate matter therefrom.

A secondary oil flow branch 1832 is disposed between a secondary outlet 1796 of the secondary filter assembly 1790 and the pump suction 122, which allows oil flow to the pump 120 when the drain valve 1826 is shut (i.e. oil is prevented from flowing through the primary filter 1720) or the skirt 1757 of the piston 1750 blocks the oil inlet aperture 1733*a*. A secondary inlet valve 1836 is provided between the secondary outlet 1796 of the secondary filter assembly 1790 and the pump 121. The secondary inlet valve 1836 is normally shut, but can be open to allow flow from the secondary filter assembly 1790, through the secondary screen 1794 and to the pump suction 122 when the drain valve 1826 is shut. Operating with the secondary inlet valve 1836 open and the drain valve 1826 shut maintains oil flow through the heat exchanger 130, and additionally filters the oil within the oil circulation path 1810 by the secondary screen 1794, discussed below.

A back purge branch 1842 is disposed between the pump discharge 124 and a secondary oil inlet 1797 within the secondary filter assembly 1790. A back purge valve 1846 is provided within the back purge branch 1842 and is normally shut. The back purge valve 1846 is opened for a limited time after the secondary inlet valve 1836 has cycled open and then shut. When the back purge valve 1846 is opened, oil flows through the secondary oil inlet 1797 of the secondary filter assembly 1790, and specifically oil flows through the secondary screen 1794 in the direction R opposite from the direction P of oil flow through the secondary screen 1794 when the secondary inlet valve 1836 is opened. As discussed in greater detail below, the reverse oil flow through the secondary screen 1794 dislodges any particulate matter or debris adhered to an inner surface of the secondary screen 1794 (i.e. debris or particulate matter removed from oil flowing in direction P through the secondary screen 1794), and causes the removed debris or particulate matter to flow to the primary filter 1720 to ultimately be removed from the fryer 1700.

Each of the drain valve 1826, the secondary inlet 1836, and the back purge valve 1846 may be automatically operated upon receipt of operational signals from the control system 91, without requiring any manual operator action. Each of the valves 1826, 1836, 1846 may be ball valves, gate valves, butterfly valves, or other types of valves that provide for selective isolation of the corresponding flow path, but provide little head loss or resistance to flow with the corresponding flow path when opened. In some embodiments, the valves may be solenoid operated, motor operated, or operable with other mechanical or electrical devices known to selectively and reliably operate a valve.

Figure 29A:
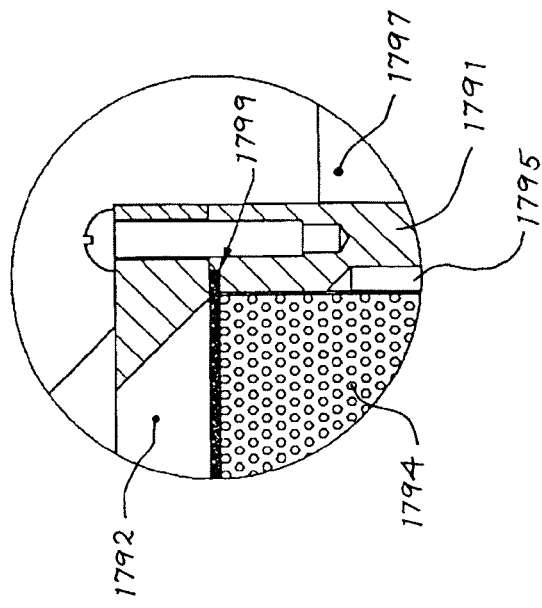
FIG. 29a is a detail view of FIG. 29.
Figure 29:
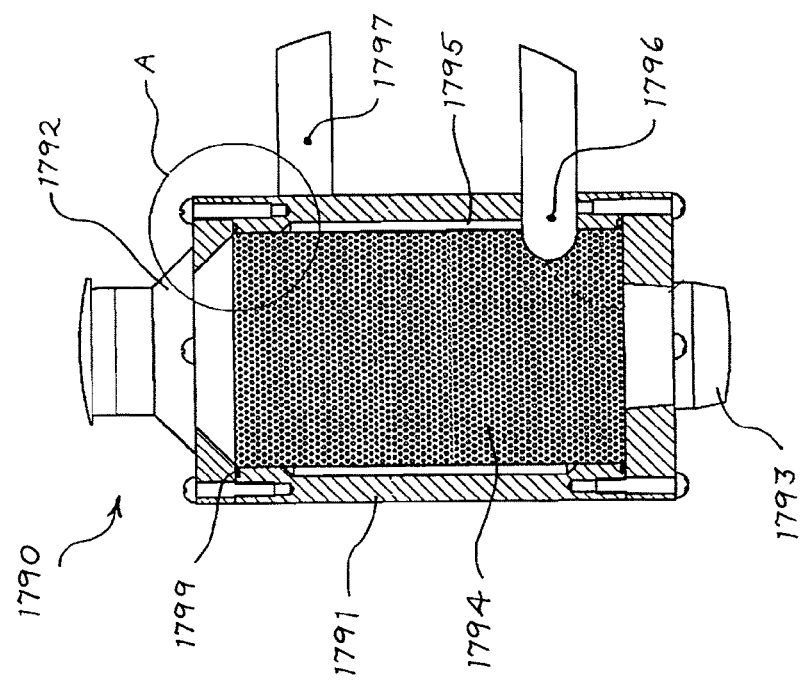
FIG. 29 is a cross-sectional view of a secondary filter assembly of the fryer of FIG. 27.

Turning now to FIGS. 29-29*a*, the secondary filter assembly 1790 includes an inlet 1792, a normal oil outlet 1793, and a screen 1794 disposed therein. The screen 1794 is constructed similarly to the screen 40 discussed in the embodiments above, with some differences noted below. The screen 1794 includes a plurality of apertures 1794*a* to allow oil to flow therethrough but prevent debris and particulate matter from flowing therethrough. The apertures 1794*a* may be sized, shaped, and configured upon the screen 1794 similarly to the apertures 46 discussed herein with respect to screen 40. Alternatively, the apertures may be larger or smaller and the total area available for oil flow through the screen may vary depending on the desired filtering with the secondary screen.

Figure 27:
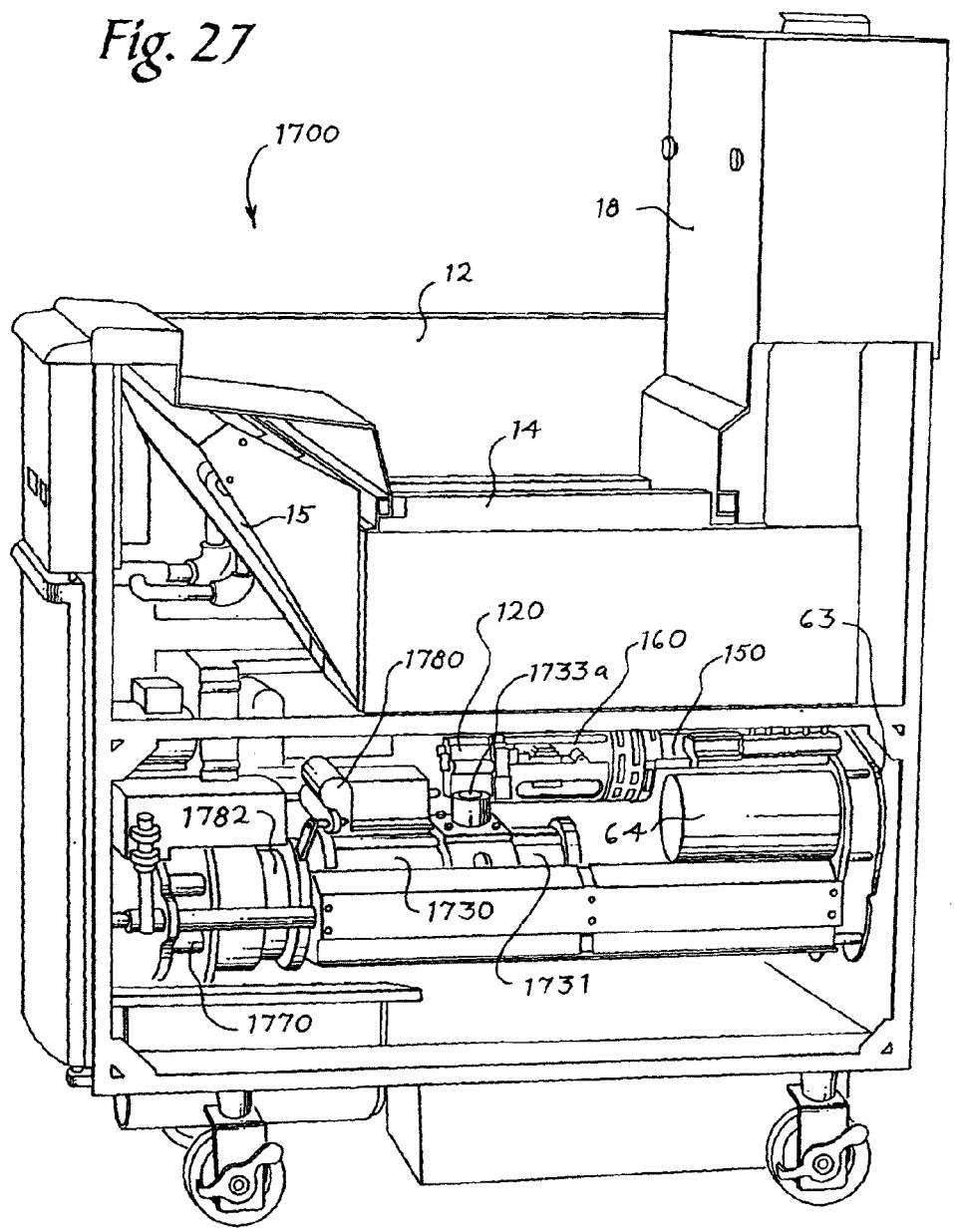
FIG. 27 is a side view of an alternate fryer with a continuous filter system.

As shown in FIG. 27, the secondary screen 1794 is hollow and cylindrical and extends between the inlet 1792 and the normal oil outlet 1793 of the housing 1791 to constrain flow therebetween. In contrast to the screen 40 discussed above, the secondary screen 1794 does not include an inlet aperture 43. The inner volume of the screen 1794 is in fluid communication with the inlet 1792 of the secondary filter assembly 1790, such that all oil entering the inlet 1792 flows through the lumen defined by the inner volume of the screen 1794.

The secondary filter assembly 1790 additionally includes a channel 1795 disposed between an outer surface of the secondary screen 1794 and the housing 1791. A secondary outlet 1796 and a secondary inlet 1797 are each disposed within the housing 1791 in fluid communication with the channel 1795. During normal operation of the fryer 1700, the drain valve 1826 is open (and/or the skirt 1757 of the piston 1750 does not block the oil inlet aperture 1733*a* of the housing 1730) and the secondary inlet and back purge 1836, 1846 valves are shut. In this configuration, the screen 1794 is not directly fluidly connected with the pump 120 and the oil entering the secondary filter assembly 1790 from the vat 14 flows through the normal outlet 1793 to the primary filter 1720, because there is no differential pressure across the secondary screen 1794 to force oil through the plurality of apertures 1794*a*.

When one of the secondary inlet or back purge valves 1736, 1746 are open, the respective suction 122 or discharge 124 of the pump 121 is fluidly connected with the channel 1795 of the housing 1791, and oil through the screen either in direction P or R as schematically shown in FIGS. 29 and 29*a*. As discussed above, oil flow in the schematic direction P removes particulate matter from the oil, which may become deposited on the inner surface of the secondary screen 1794 and gradually degrade the flow rate through the secondary screen 1794. Opening the back purge valve 1846 causes flow in the reverse direction R through the secondary screen 1794, which substantially dislodges debris and particulate matter form the inner surface of the secondary screen 1794.

As best shown in FIG. 29*a*, the inlet 1792 and the normal outlet 1793 of the secondary filter assembly 1790 are defined by apertures in opposite ends of the housing 791. Seals 1799 may be provided within the housing 1791 at each end thereof to prevent oil leakage from the housing 1791 through the ends. Seals 1799 may be o-rings, gaskets, or other structures known to substantially prevent fluid leakage.

Figure 30:
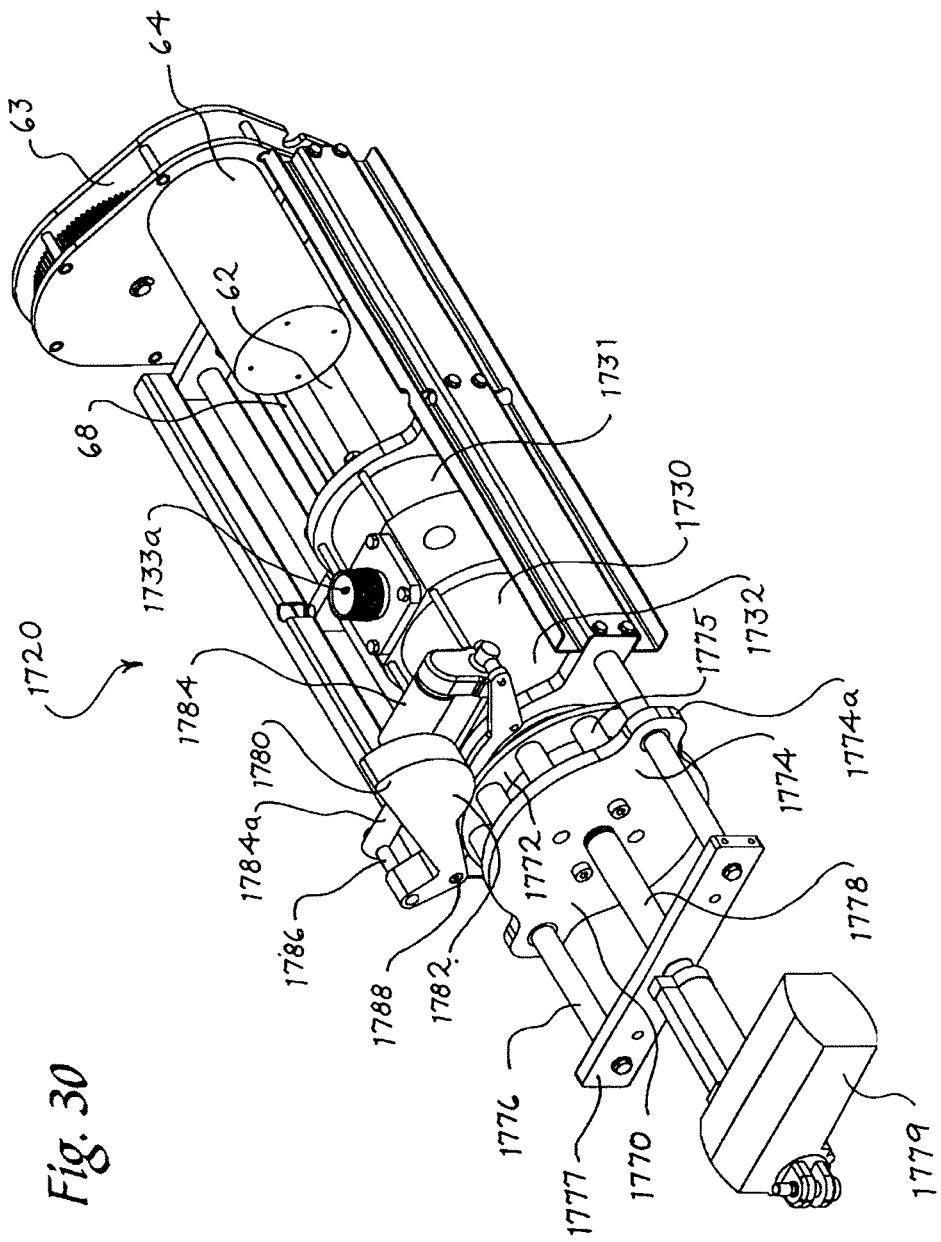
FIG. 30 is a perspective view of a primary filter of the fryer of FIG. 27 with the piston in a home position.
Figure 31:
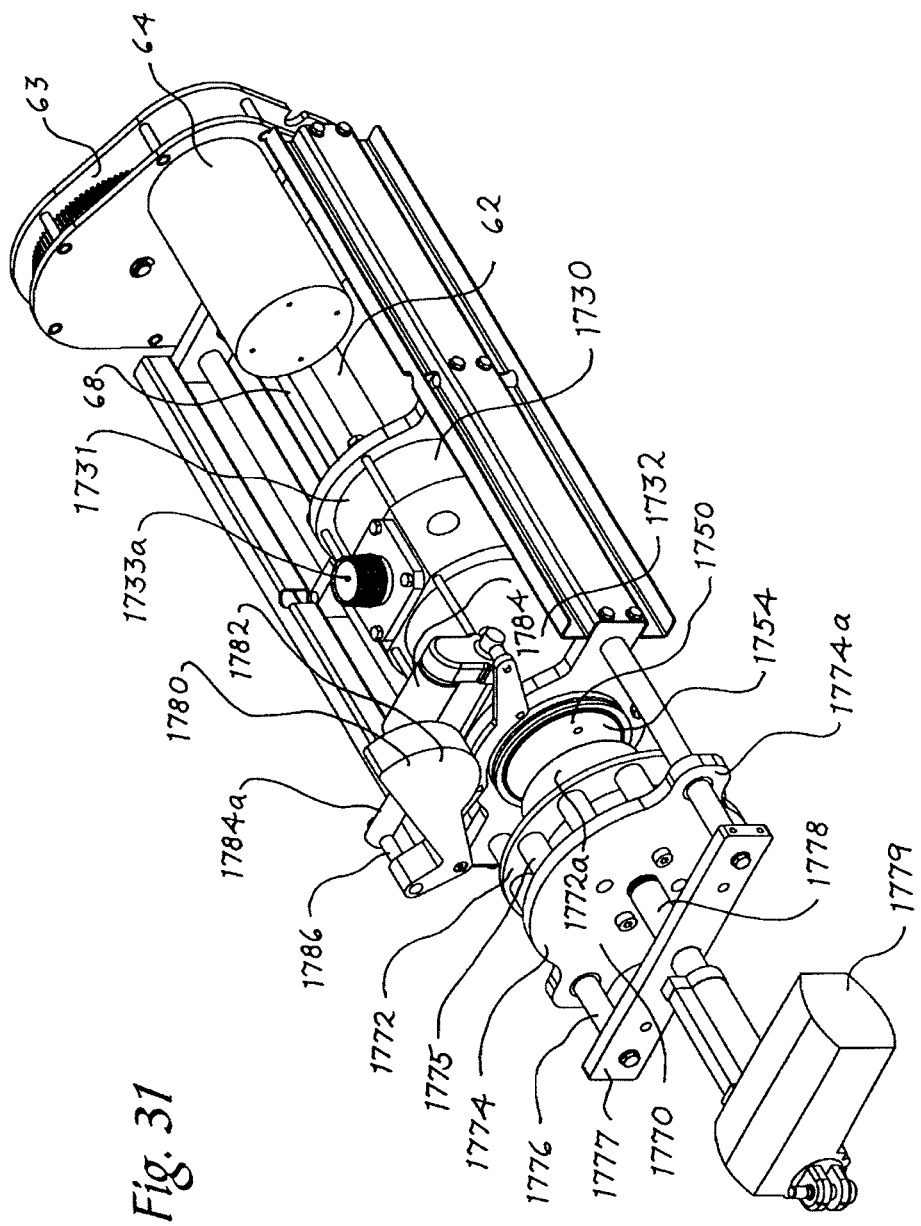
FIG. 31 is the view of 30 with the piston at the operational end of the housing.
Figure 32:
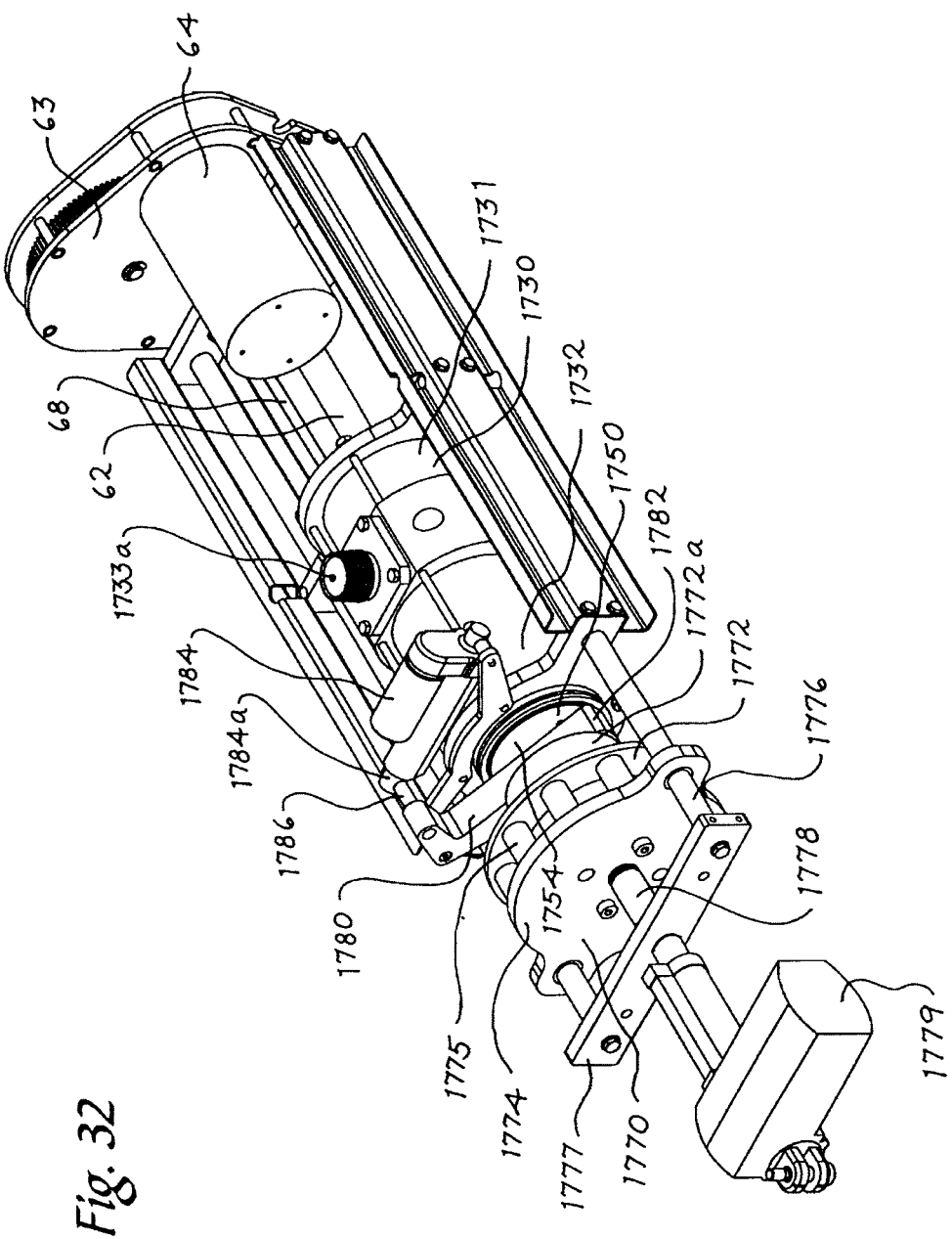
FIG. 32 is the view of FIG. 30 with the end cap withdrawn and the leg rotated to contact the piston.
Figure 35:
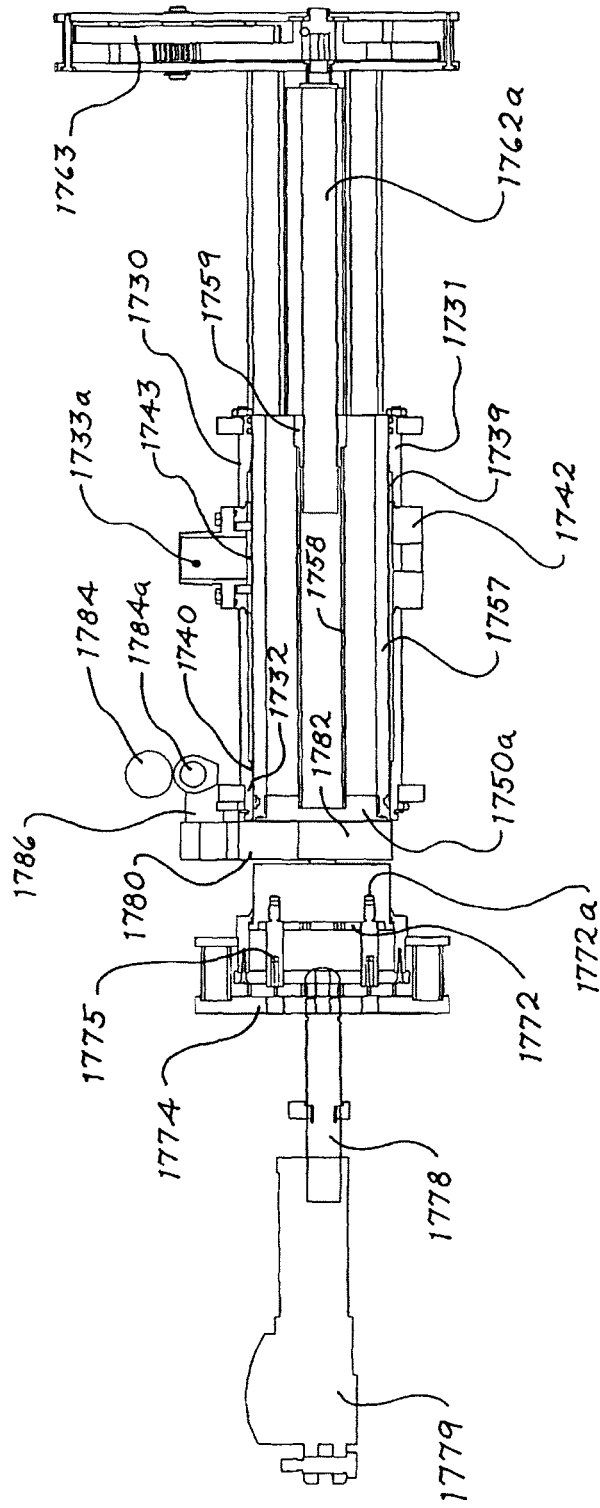
FIG. 35 is a cross-sectional view of the primary filter oriented as shown in FIG. 32.
Figure 36:
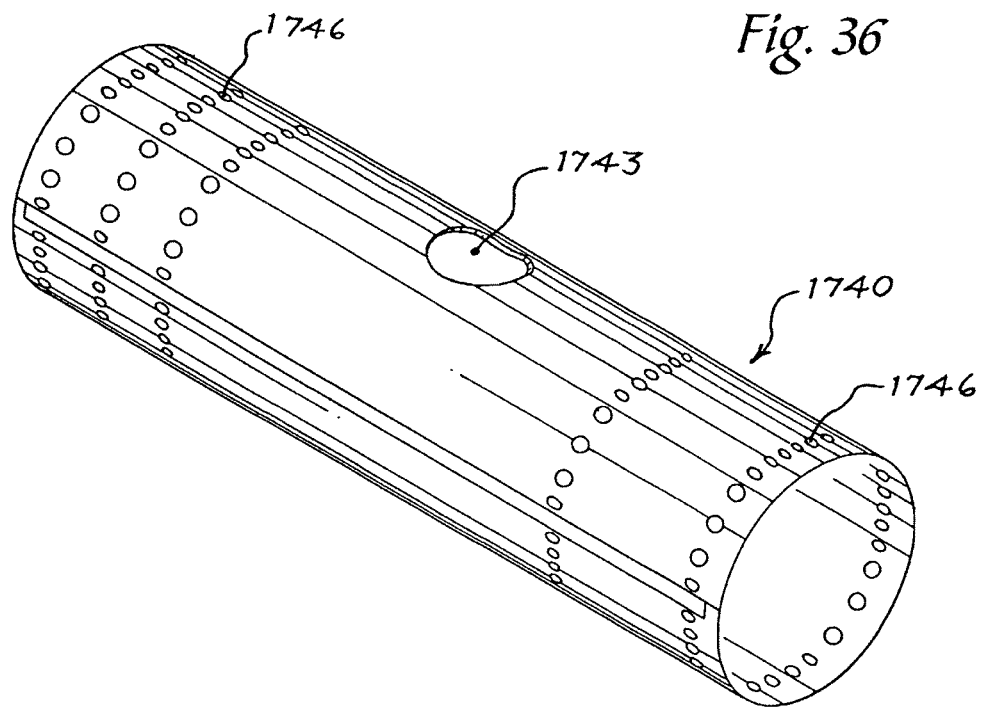
FIG. 36 is a perspective view of a primary screen of the primary filter of FIG. 30.
Figure 37:
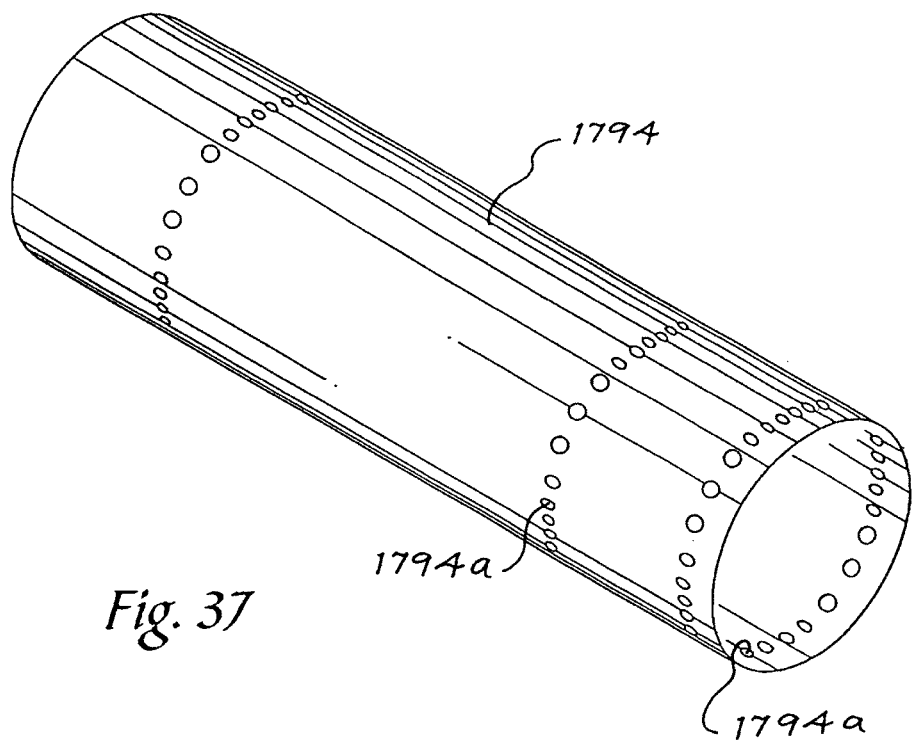
FIG. 37 is a perspective view of a secondary screen of the fryer of FIG. 27.

A primary filter 1720 assembly is provided and is best shown in FIGS. 30-32. The primary filter 1720 includes a housing 1730, a primary screen 1740, a piston 1750 that selectively translates within the housing 1730, a fixed end plug 1761, a movable end cap 1770, and a reciprocating leg 1780. The primary screen is similar in operation and design of the screen 40 discussed herein and shown in FIGS. 6*a*-7*b* and 9 and for the sake of brevity, the screen will not be discussed again in detail.

The housing 1730 is cylindrical, hollow and extends between a home end 1731 and an operational end 1732. The housing 1730 is similar in design and construction to the housing 30 discussed above. The primary screen 1740 is fixed within the housing 1720, similar to the screen 40 within the housing 30, discussed above. The housing 1730 additionally includes an annulus 1739 (FIGS. 35-35*a*) that is disposed between an outer surface of the primary screen 1740 and the housing 1730. The annulus 1739 is similar to annulus 39 discussed in the embodiments herein and originates the portion of the primary oil flow branch 1822 between the primary filter 1720 and the pump suction 122.

The housing 1730 includes an end plug 1761 fixed to the home end 1731 and a movable end cap 1770 retained at the opposite operational end 1732 of the housing 1730. The end plug 1761 provides a substantially leak tight boundary of the housing 1730 and includes holes therein for the lead screw 1762 (similar to the lead screw 62 discussed above) and the second rod 1768 (similar to the second rod 68 discussed above) to extend therethrough. The piston 1750 rests proximate the end cap 1761 when the piston 1750 is in the home position.

Oil normally enters the primary filter 1720 through an inlet aperture 1733*a* in the housing 1730 and flows into the center of the screen through an inlet aperture in the screen, similar to the filter 20 discussed herein. The primary filter 1720 normally is fluidly connected with the pump suction 122 (i.e. when the drain valve 1826 is open or the skirt 1757 does not block the oil inlet aperture 1733*a* on the housing 1730) which provides a significant differential pressure across the primary screen 1740. The differential pressure causes oil to flow through the plurality of apertures 1746 in the primary screen 1740, into the annulus 1739, and ultimately to the pump suction 122 through the primary oil flow branch 1822.

As discussed above with respect to the screen 40, the plurality of apertures 1746 within the primary screen 1740 may be sized to prevent debris and particulate matter larger than the apertures entrained with the oil (due to the frying within the vat 14 or other cooking process for other types of cooking appliances) from flowing through the primary screen 1740 with the oil. The debris and particulate matter retained within the primary screen 1740 may stick to the inner surface of the primary screen 1740 (thereby gradually lowering the oil flow through the primary filter 1720 due to the reduction in available flow area through the primary screen 1740). The debris and particulate matter is periodically removed from the screen by the piston 1750.

The piston 1750 is translatably received within the housing 1730. The piston 1750 may include one or more rings (not shown, but similar to rings 52 discussed herein) that are configured to scrape across the inner surface of the screen to remove debris and particulate matter stuck to the inner surface of the primary screen 1740. The piston 1750 is cylindrical and includes a front face 1754 (FIG. 31) and a rear face. The front face 1754 of the piston 1750 is oriented within the housing 1730 to contact the cup 1772*a* of the end cap 1770 when the piston 1750 is at the operational end 1732 of the housing 1730 and the rear face is oriented to face and remain proximate the end plug 1761 when the piston 1750 is in the home position. The front face 1754 of piston 1750 may be configured similarly to the faces of the piston 50.

As discussed below and understood with reference to FIGS. 28 and 30-32, the piston 1750 is configured to remove a significant amount of particulate matter from the inner surface of the primary screen 1740 when linearly translating from the home end 1731 toward the operational end 1732 of the housing 1730. The piston 1750 cyclically translates from the home position (i.e. proximate the home end 1731 of the housing 1730) to the operational end 1732 to contact and translate the inner flange 1772 of the end cap 1770 away from the housing 1730 for disposal of particulate matter 600 therebetween from the primary filter 1720. The piston 1750 then returns to the home position and awaits another translational cycle as signaled by the control system 91.

Because the primary filter 1720 only includes structure for removal of debris one the operational end 1732 of the housing 1730, the fryer 1700 is configured to substantially prevent oil (and particulate matter entrained therewith) from entering the primary filter 1720 when the first face 1754 of the piston 1750 is between the operational end 1732 and the inlet opening 733a. In some embodiments, the drain valve 1826 is configured to shut (as controlled by the control system 91) when the front face 1754 of the piston 1750 translates past the inlet aperture 1733a of the housing and the inlet of the screen toward the operational end 1732 of the housing 1730. Because no oil flows into the housing 1730 from the secondary filter assembly 1790, particulate matter is not deposited between the piston and the fixed end plug 761 of the housing 1730. When the drain valve 1826 shuts, the secondary inlet valve 1836 opens providing flow to the pump suction 122 through the secondary filter 1794.

In other embodiments shown in FIG. 33-35a, the piston 1750 or an alternate piston 1750a (discussed in greater detail below) may include a skirt 1757 that extends rearwardly from the front face 1754 of the piston 1750 (or front face 1754a of the piston 1750a). The skirt 1757 is a cylindrical, hollow tube with an inner diameter slightly less that the inner diameter of the screen 1740. The skirt 1757 is configured to block the inlet aperture 1733a of the housing 1730 and the inlet aperture 1743 of the screen 1740 when the front face 1754 of the piston 1750 is disposed between the inlet aperture 1733a and the operational end 1732 of the housing 1730. The skirt 1757 accordingly prevents oil from entering the internal volume of the housing 1730 behind the piston 1750, wherein any particulate matter filtered from the oil through the screen 1740 and disposed between the piston 1750 and the end plug 1761 cannot be removed during normal operation of the primary filter 1720. The skirt 1757 may include one or more rings (not shown but similar to rings 52 discussed above) that are configured to scrape against the inner surface of the filter 1740 to remove particulate matter therefrom.

The piston 1750 may translate linearly through the internal volume of the housing 1730 due to the rotation of the lead screw 62, which is similar to the lead screw 62, discussed above. The lead screw 62 is rotatably connected with a transmission 63, which receives torque from a motor 64. As discussed above, the motor 64 may be a dedicated motor for the lead screw 62, or alternatively, the motor 64 may the same motor that rotates the pump 120. In embodiments where the same motor rotates both the pump 120 and the lead screw 62, a clutch is provided between the motor and the lead screw 62 to causes selective transmission of torque from the motor to the lead screw 62, depending on the operational performance of the primary filter 620, as discussed below. The clutch is configured to causes the motor to rotate the lead screw 62 in either rotational direction.

The piston 1750 includes a threaded aperture that receives the lead screw 1762. The piston 1750 further receives a second rod 1768 therethrough, which prevents the piston 1750 from rotating with rotation of the lead screw 1762. Because the piston 1750 is prevented from rotating, the piston 1750 translates linearly within the internal volume of the housing 1730 based on the direction of the rotation of the lead screw 1762.

In other embodiments shown in FIGS. 33-35b, an alternate piston 1750a may be disposed within the housing 1730 and operates similarly to the piston 1750 discussed above. The piston 1750a includes a flat front face 1754a that is disposed to cyclically contact the inner flange 1772, and specifically the cup 1772a similarly to the piston 1750 discussed herein. A skirt 1757 may be received upon the piston 1750 to selectively block the inlet aperture 1733a of the housing 1730 when the front face 1754a of the piston 1750a is between the inlet aperture 1733a and the operational end 1732 of the housing 1730.

The piston 1750a includes a central aperture 1755a (or blind hole that does not extend through the entire width of the piston 1750a) that is configured to receive a shaft 1758 that extends toward the end cap 1761 of the housing 1730. The shaft 1758 is connected with a nut 1759 that threadably receives a lead screw 1762a. The lead screw 1762a is connected to the transmission 1763 and the motor 1764 to selectively rotate the lead screw 1762a to cause the piston 1750a to translate linearly within the housing 1730 to scrape debris from the inner surface of the screen 1740. The nut 1759 includes a plurality of flats 1759a or other structures that engage the housing 1730 to prevent the nut 1759 from rotating. As the lead screw 1862a rotates, the nut 1759 translates linearly within the housing, which causes similar motion of the piston 1750a.

Similar to the embodiments discussed above, in some embodiments the rotation of the motor 64 (and therefore translation of the piston 1750) is controlled by the control system 91, which receives operational signals from the fryer 1700 related to the mass flow rate through the pump 120 and proportional to the flow area available through the primary screen in the primary filter 1720. When the control system 91 senses lower flow through the pump 121, the piston 1750 is translated toward the operational end 1732 of the housing 1730 to mechanically remove the particulate matter from the screen increase flow though the oil circulation system 1810. The various parameters potentially monitored by the control system 91 for selective cyclic operation of the piston 1750 are discussed elsewhere herein and are not repeated here for the sake of brevity.

The end cup 1770 includes two parallel plates, an inner flange 1772 and an outer flange 1774 that are separated by a plurality of springs 1775 or other biasing members. The outer flange 1774 is movably fixed at a set distance from the operational end 1732 of the housing 1730 and may be translated further away from its fixed position with respect to the housing 1730 with a first translation device 1779.

The inner flange 1772 is biased toward the housing 1730 with plurality of biasing members 1775. The inner flange 1772 includes a cup 772a that normally extends within the hollow internal volume of the housing 1730 and an end portion of the screen. The cup 772a and the inner flange 1772 normally provide a leakage barrier for the operational end 732 of the housing 1730. The cup 1772a and the inner flange 1772 may includes a gasket, o-ring, or other mechanical structure to substantially completely seal the operational end of the housing 1732, when the inner flange 1772 is in the normal position shown in FIG. 30.

In some embodiments, the end cup 1770 is selectively linearly translated (toward or away from the operational end 1732 of the housing 1730) with a translation device 1779. The translation device 1779 may be motor with a threaded shaft that causes linear translation of the outer flange 1774 based on the rotation of the motor, a linear actuator (FIGS. 30-32) with a shaft 1778 fixedly mounted to the outer flange 1774 that provides for selective linear motion of the end cup 1770, one or more solenoids or other forms of electromagnets, or other mechanical and electromechanical structures that cause selective linear motion of the end cup 1770 toward and away from the housing 1730. The end cup 1770 translation may be guided by a plurality of shafts 1776 and a bracket 1777 that are connected therewith.

A leg 1780 is reciprocatingly mounted with respect to the operational end 1732 of the housing 1730 to cyclically move proximate the operational end 1732 of the housing 1730. The leg 1780 may include an operational end 1782 that extends radially from a pinned connection 1786 with the housing 1730. The operational end 1782 is configured to reciprocate downward between the piston 1750 and the cup 1772a to remove any particulate matter disposed between the piston 1750 and the cup 1772a. The operational end 1782 may include two parallel outer surfaces, and may additionally include one or more brushes, or elastic strips or other members on the outer surfaces thereof to scrape or otherwise remove particulate matter affixed to the front face 1754 of the piston 1750 or the outer surface of the cup 1772a.

The leg 1780 may be reciprocatingly movable with respect to the housing 1730 with a linear actuator, motor, solenoid or other electromagnet, or other structure to automatically cause the leg 1780 to reciprocate. As shown in FIG. 32, a linear actuator 1784 may be provided with an output arm 1784a constrained with the leg 1780, such that inward motion of the output arm 1784a (i.e. toward the linear actuator 1784 housing) causes the operational end 1782 of the leg 1780 to rotate about a pinned connection with the housing 1730 between the piston 1750 and the cup 1772a and mechanically remove any particulate matter therebetween. The output arm 1784a of the linear actuator 1784 is then translated outward, causing the operational end 1782 to withdraw from between the piston 1750 and the cup 1772a. In some embodiments, the control system 91 is operationally connected with the linear actuator 1784 to cause the leg 1780 to reciprocate one or more times with respect to the piston 1750 when the end cup 1770 is fully withdrawn from the housing 1730 to the position shown in FIG. 32.

In some embodiments, the translation device 1779 and the linear actuator 1784 may be distinct dedicated components that provide a motive force to translate or rotate the outer flange 1774 and the leg 1780, respectively. In other embodiments, each of the outer flange 1774 and the leg 1780 may be selectively operated by the same mechanical device, such as for example a motor, linear actuator, electromagnet or other device to selectively operate the outer flange 1774 or leg 1780. With a common device for each of the outer flange 1774 and the leg 1780, a clutch (not shown) or other selective transmission device is disposed between the common device and each of the outer flange 1774 and the leg 1780 to allow selective operation. In still other embodiments, the outer flange 1774, leg 1780, lead screw 1762, and/or the pump 120 may be operated by the same motor or other mechanical and/or electrical device, with clutches (or other selective transmission device) disposed between the device and the movable component.

In operation, after sufficient fryer operation, the flow through the pump 120 may degrade such that the control system 91 initiates a cycle of the piston 1750. The piston 1750 translates through the housing 1730 and scrapes any particulate matter or debris from the inner surface of the screen. As the piston 1750 approaches the operational end 1732 of the housing 1730, a volume of particulate matter 600 may be disposed proximate the front face 1754 of the piston 1750. With further translation of the piston 1750, the piston 1750 contacts the cup 1772a on the inner flange 1772 of the end cap 1770 (either directly or with particulate matter therebetween).

With further rotation of the lead screw 1762, the piston 1750 presses the inner flange 1772 toward the outer flange 1774. Initially, the force on the inner flange 1772 is less than the biasing force of the springs 1775 and further piston 1750 translation causes further compression of the inner flange 1772 and any particulate matter disposed therebetween. The additional compression tends to squeeze any oil that remains with the particulate matter (because of the relative incompressibility of the oil), which flows through apertures of the screen into the annulus and ultimately to the pump 120. With sufficient compression, the relatively dry particulate matter 600 tends to crumble and fall from the housing when exposed from the operational end 1732.

With additional motion of the piston 1750 toward the operational end 732 of the housing 1730, the inner flange 1772 eventually feels a sufficient compressive force to compress the springs 1775 and translate toward the fixed outer flange 1774. As the springs 1775 compress, the cup 1772a withdraws from the housing 1730 (FIG. 31) and additional particulate matter 600 may drop from between the piston 1750 and the inner flange 1772 due to gravity. The removed particulate matter 600 is retained by a tray or similar structure (not shown) therebelow in the fryer housing 12 for periodic removal. With the cup 1772a withdrawn from the housing 1730, the piston 1750 becomes the leakage boundary for the operational end 1732 of the housing 1730 (although oil does not enter the housing 1730 in this orientation due to the closure of the drain valve 1826).

In some embodiments, the housing 1730 may include a limit switch (not shown) or similar sensor in communication with the control system 91 that senses when the cup 1772a is withdrawn from the housing 1730. After the cup 1772 is pushed from the housing 1730 by the piston 1750, the end cup 1770 is translated away from the housing 1730 by the translation device 1779 to leave a space between the front face 1754 of the piston 1750 and the cup 1772a of the inner flange 1772. In other embodiments, the control system 91 may count the number of rotations of the lead screw 1762, and determine the position of the piston 1750 within the housing 1730 and therefore the relative positions of the cup 1772a and the inner flange 1772 with respect to the housing 1730.

As the end cap 1770 is translated away from the housing 1730, a space is provided between the front face 1754 of the piston 1750 and the cup 1772 of the inner flange 1772. The control system 91 then causes the operational end 1782 of the leg 1780 to cyclically move between the piston 1750 and the cap 1772a, which pushes any remaining particulate matter 600 away from between the two components and additionally may clean the ends of the components. After one or more cycles of the leg 1780, the operational end 1782 of the leg 1780 is withdrawn and the translation device 1779 moves the end cap 1770 toward the housing 1730 until the cap 1772a contacts the piston 1750. The control system 91 then causes rotation of the lead screw 62 to translate the piston 1750 toward the home position.

When the front face 1754 of the piston 1750 moves past the inlet aperture 1733a of the housing 1730 and the screen, the drain valve 1826 opens allowing oil flow from the secondary filter assembly 1790 to enter the primary filter 1720. At the same time, the secondary inlet valve 1836 shuts, securing flow through the secondary screen 1794 (in the direction P) to the pump suction 122. The back purge valve 1846 then temporarily opens, allowing flow from the pump discharge 124 (in the direction R), which removes any particulate matter fixed to the secondary screen 1794, which flows to the primary filter 1720 for removal.

Turning now to FIGS. 38-49, an alternate cooking appliance 800 is provided. The cooking appliance 800 may be a deep fat fryer, a rethermalizer, a pasta cooker, bagel or donut fryer or another similar appliance that uses a heated cooking fluid to cook a food product, with the cooking fluid requiring periodic cleaning, purifying, or filtering for proper operation. While one of skill in the art will understand after review of this specification, appended figures and claims that the cooking appliance may be one of a plurality of types of cooking appliances, for the sake of brevity this embodiment is described here with reference to a deep fat fryer that cooks a food product disposed within a pool of heated oil disposed within a vat. Unless otherwise specified, the components of the fryer are similar to the components of the fryer 10 discussed above and shown in FIG. 1.

The fryer includes a housing 12 that mechanically supports all of the components of the fryer. The fryer includes a vat 14 that provides an open volume for storing and heating a quantity of cooking oil for cooking a food product placed therein. The fryer further includes a heat source 15 that provides heat to the cooking oil to maintain the cooking oil within the open vat 14 at a desirable temperature for cooking. The heat source 15 may be provided by burning natural gas or similar fuel in an open flame that heats air passing through the fryer, or alternatively, the heat source may be provided by a plurality of electrical heaters that are disposed in the proximity of the vat 14 or another portion of the fryer where heat may be transferred to the cooking oil. The fryer may additionally or alternatively include a heat exchanger 130 (FIGS. 1, 2, and 3) which continuously receives oil from the vat 14 by way of the filter mechanism 810 discussed below and the pump 120 (FIGS. 12-16 discussed herein) where air heated by the heat source 15 flows past the heat exchanger 130 to transfer heat to the oil flowing therethrough. In other embodiments shown in FIG. 2a, the fryer may include an electric heater assembly 144 that receives oil from the pump 120 and provides heat to the oil flowing therethrough with one of a plurality of electric heaters 144a.

It is advantageous to provide a sole heat input to the oil with the heat exchanger 130 (or electric heater assembly 144) because the heating elements need not be placed directly within the vat 14. This allows the capacity of the vat 14 to be reduced and therefore increases the efficiency of the fryer by eliminating the cold zone in the bottom portion of the typical fryer vat 14. The placement of the heating device (whether through combustion gas or electric heaters) outside of the vat 14 (which may be provided in the flue section of a typical fryer) allows the vat and other portions of the housing 12 of the fryer to be of uniform geometry and dimensions regardless of the type of heating device used. As understood by those of skill in the art, this reduces the number of different components necessary to manufacture both gas and electric appliances and therefore increases manufacturing efficiency.

The filter mechanism 810 includes a primary filter assembly 811 that continuously operates during fryer operation to remove debris and particulate impurities from the oil received within the filter mechanism 810. The fryer additionally includes a debris extraction mechanism 830 that receives the debris and particulate impurities removed from the oil in the primary filter assembly 811 and ejects the particulate matter from the filter mechanism 810. The primary filter assembly 811 and debris extraction mechanism 830 may be mounted within the fryer housing 12 and normally are each disposed below the vat 14.

The primary filter assembly 811 receives a continuous flow of oil from the vat 14 through an inlet port 814. The inlet portion 814 is defined within a cover 813 that encloses an upper end of an main housing 812. The main housing 812 is substantially cylindrical with a longitudinal axis 812a that is disposed substantially vertically within the housing 12. The main housing 812 includes an open lower end that is fluidly connected with a lower housing 831 of the debris extraction mechanism 830, discussed below. A cylindrical main screen 816 is disposed within the main housing 812 and aligned coaxially therewith. The main screen 816 includes a slightly smaller diameter than the inner diameter of the main housing 812 to define an annulus 818 between the inner housing 812 and the main screen 816. The main screen 816 is constructed similarly to the screen 40 (discussed above and shown in FIG. 9) and includes a plurality of holes 816a that are constructed similarly to the holes 46 in the screen 40. Because the main housing 812 and main screen 816 are each aligned to receive oil flowing in a path parallel to the centerline longitudinal axis 812 of the main housing 812, the screen 816 does not normally include an inlet aperture similar to the inlet aperture 43 of the embodiment discussed above. One of ordinary skill in the art will appreciate after reviewing this specification and appended drawings that other geometries of the main housing 812 and main screen 816 are possible, which may necessitate changes in the geometry and orientation of these and other associated components for proper orientation.

A suction port 122 of an oil pump 120 is fluidly connected with the annulus 818 by way of an outlet pipe 819 to urge oil from within the cavity 817 (i.e. within the inner diameter of the main screen 816) through the main screen 816, the annulus 818, and to the pump 120. The oil pump 120 is similar to the oil pump 120 shown in FIGS. 12-16 discussed herein. As oil flows through the main screen 816 into the annulus 818, any debris or particulate matter entrained with the oil that has a diameter larger than the diameter of the plurality of holes 816a is prevented from flowing into the annulus 818 and therefore retained within the cavity 817. A portion of the particulate matter may be retained upon the inner surface of the main screen 816 as oil flows therethrough.

Figure 20B:
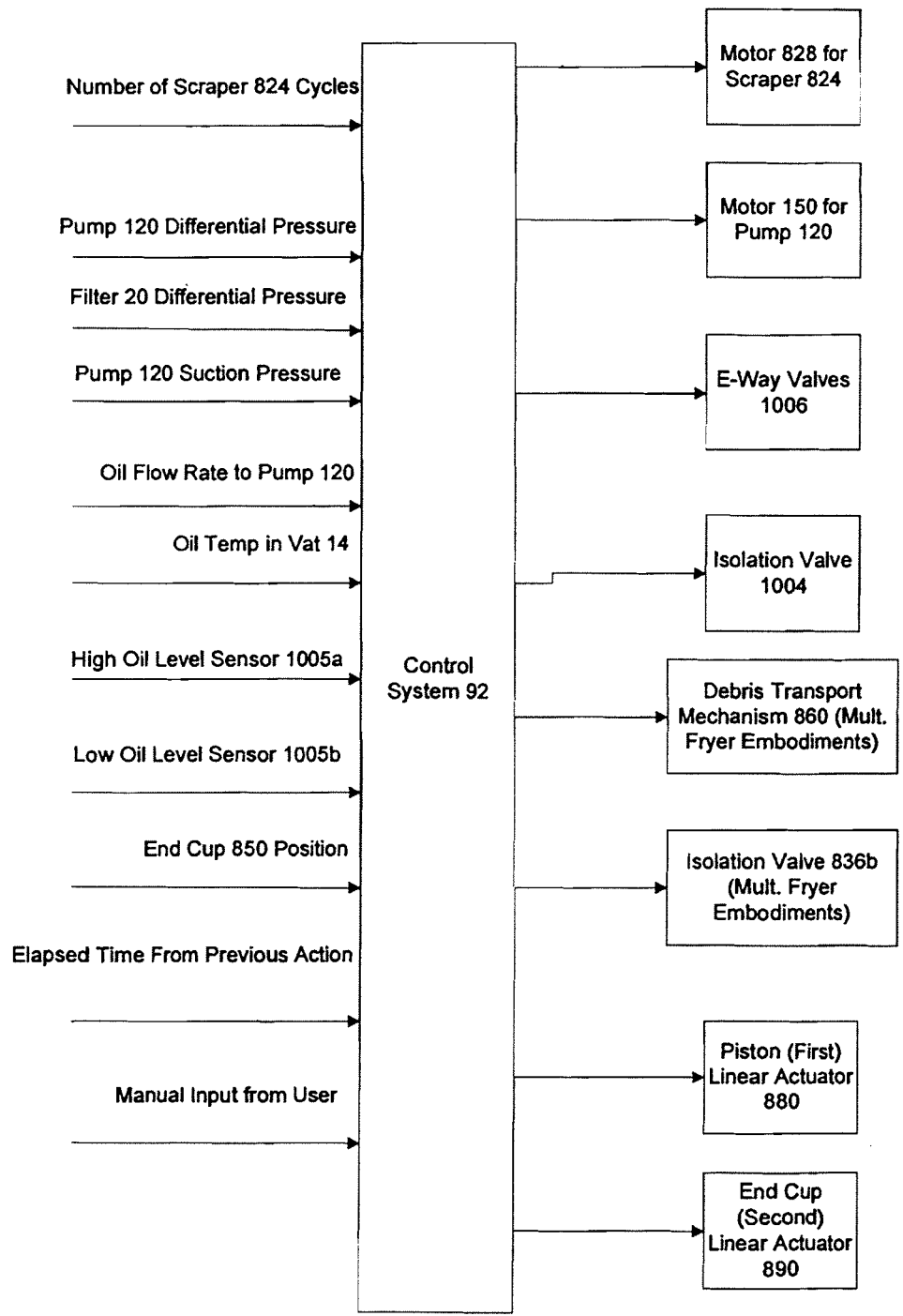
FIG. 20b is a schematic view of another control system.

As discussed above, the particulate matter that is retained upon the inner surface of the main screen 816 decreases the volume of oil that can flow through the main screen 816 because more and more holes 816a in the main screen 816 become partially or totally blocked by particulate matter retained upon the inner surface of the main screen 816 with continued operation, which leaves a smaller total surface area available for oil to flow through the main screen 816. As discussed above, with continued fryer operation, the pressure at the inlet of the pump suction 122 decreases with the decline in flow through the main screen 816, and the oil flow rate through the pump 120 simultaneously decreases. As with alternative embodiments discussed herein, a control system 92 (shown schematically in FIG. 20b is provided with the fryer and directs the operation of the components of the filter mechanism 810. The detailed logic steps performed by the control system 92 discussed above is illustrative of the logic used by the control system 92 discussed herein. The control system 92 may receive signals proportional to the oil flow rate through the pump 120, the pump suction 122 pressure, the passage of time, one or more oil vat temperatures, or other monitored parameters, and directs the operation of a scrapper assembly 820 disposed within the primary filter assembly 811 as well as other components of the filter mechanism 810 and the fryer, such as the piston 840 (and chopping mechanism 900, where provided).

Figure 38:
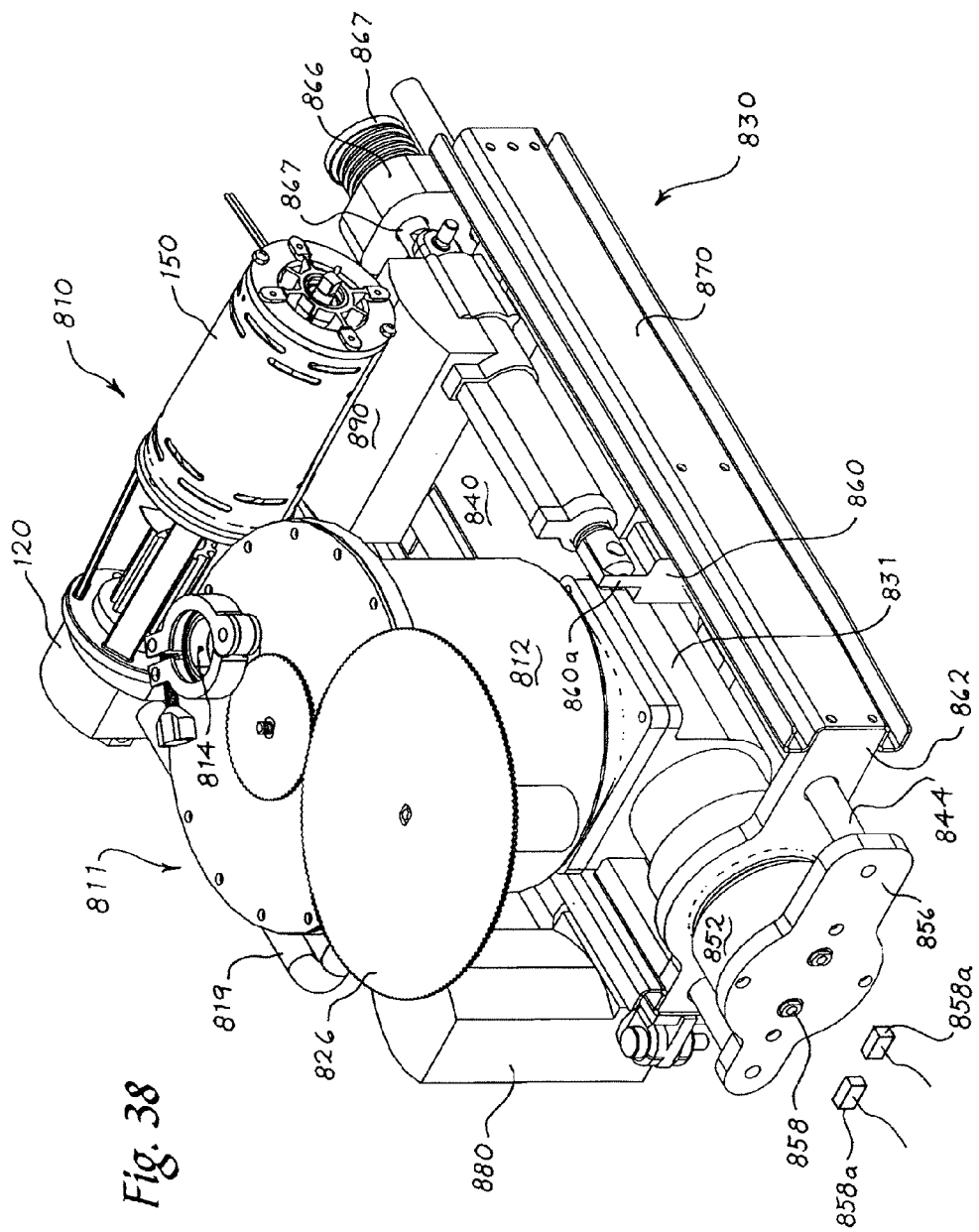
FIG. 38 is a perspective view of another filter mechanism.
Figure 39:
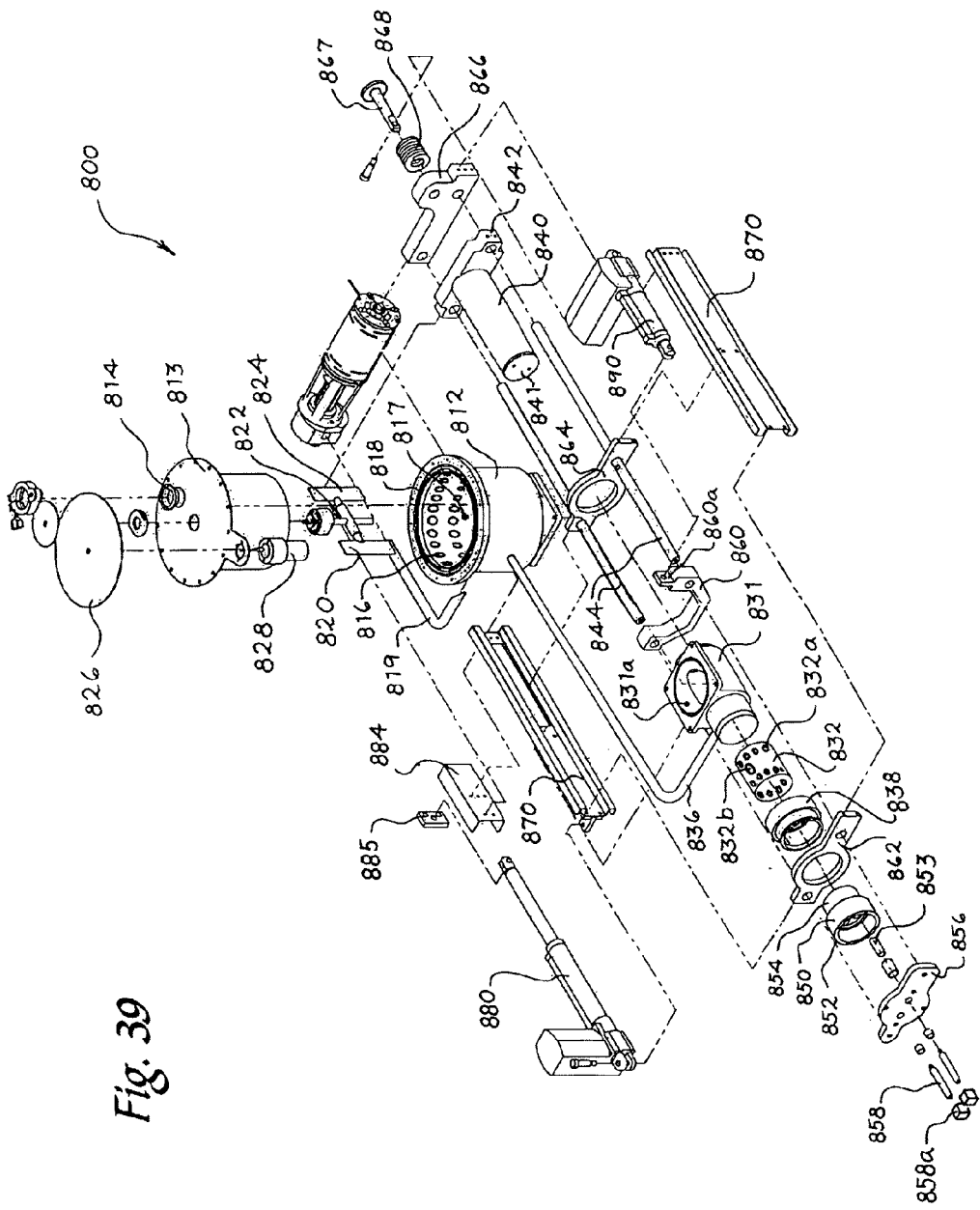
FIG. 39 is an exploded view of the filter mechanism of FIG. 38.
Figure 48:
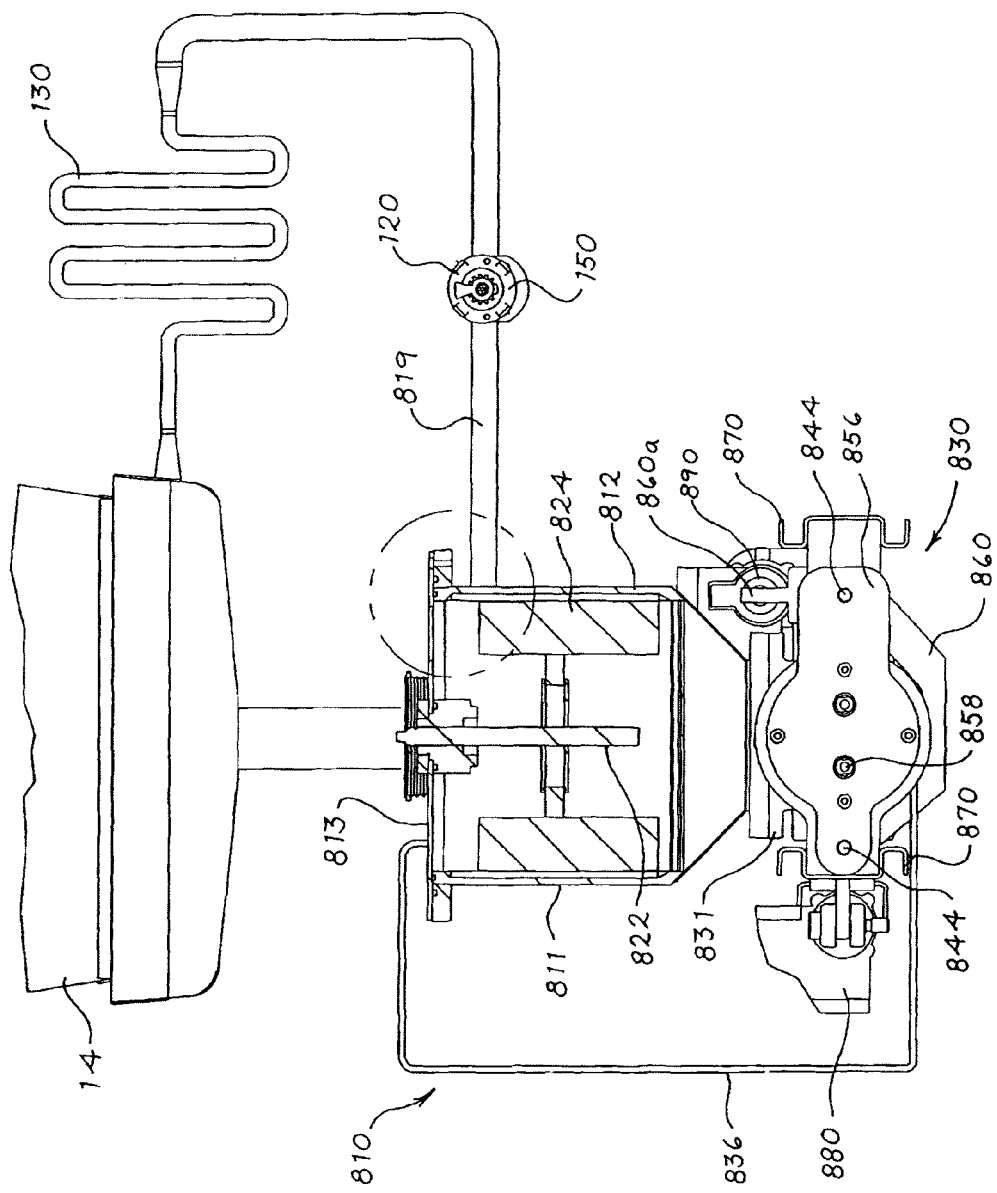
FIG. 48 is a side schematic view of the filter mechanism of FIG. 38.

As best shown in FIGS. 38-39 and 48, the scraper assembly 820 is partially mounted within the cavity 817 and includes at least one elongate scraper 824 that includes an edge 824a that contacts and moves along the inner surface of the main screen 816 to mechanically agitate and remove any particulate matter stuck thereto. The scraper 824 may be connected to a rotatable shaft 822, which when rotated causes the scraper 824 to move along the inner surface of the main screen 816. In some embodiments, the scrapper assembly 820 may include one or more scrapers 824 that are each connected to the shaft 822 to simultaneously move along the main screen 816. In some embodiments, the two or more scrapers 824 may each be connected to the shaft 822 with a spring or other biasing member, which urges the scraper 824 radially outward from the shaft 822 to promote contact between the scraper 824 and the main screen 816. The shaft 822 is connected to a motor 828, and may include a transmission 826 therebetween. As shown in FIG. 38, the motor 828 and transmission 826 are normally disposed outside of the main housing 812 with the shaft 822 extending through a hole in the cover 813 of the main housing 812.

The motor 828 may be selectively energized by the control system 92, which allows or provides electrical current flow to the motor 828 (through contacts, relays, switches, or the like) when the control system 92 senses a condition of reduced oil flow to the pump suction 122, a reduced pressure at the pump suction 122, a monitored number of cycles of the fryer, a monitored elapsed time since the last operation of the scrapper assembly 820, or another useful monitored parameter. In some embodiments, the control system 92 is configured to cause scraper assembly 820 operation when about 5 inches of vacuum is sensed at the inlet of the pump 120. In other embodiments, the control system 92 may be configured to cause operation of the scrapper assembly 820 at other suitable inlet pressures within the range of about 10 inches of vacuum to about 2 pounds of positive pressure, or within other ranges, depending on the desired frequency of scraper assembly 820 operation. Similarly, the control system 92 may additionally or alternatively be configured to cause scraper assembly 820 operation based on a manual command from the user. The motor 828 is energized by the control system 92 to cause the shaft 822 to rotate a full revolution within the main housing 812, multiple full revolutions, or only a partial revolution when two or more scrapers 824 are provided with the scraper assembly 820.

As the scraper assembly 820 removes debris and particulate matter from the inner surface of the main screen 816, the removed material tends to fall out of the main housing 812 and travel to the lower housing 831, which is a part of the debris extraction mechanism 830. The removed material often forms clumps and falls downward through the main housing 812 due to its relatively large mass in comparison to the mass of the oil received from the vat 14 into the main housing 812.

The debris extraction mechanism 830 includes the lower housing 831 and a secondary screen 832 disposed coaxially within the lower housing 831. The lower housing 831 and the secondary screen 832 are dimensioned to form an annulus therebetween (similar to annulus 818 discussed above). The lower housing 831, the secondary screen 832, and an end cap cover 838 disposed upon the open end of the lower housing 831 may be aligned together by front and rear cross bars 862, 864, which are disposed on opposite sides of the lower housing 831 and bolted or otherwise fixed together.

The secondary screen 832 includes a plurality of holes 832a disposed about the surface area thereof to allow oil to flow therethrough, but substantially prevent particulate matter from flowing therethrough. The secondary screen 832 is constructed similarly to the main screen 816 discussed above. The secondary screen 832 may additionally include an inlet aperture 832b that is disposed proximate to an inlet aperture 831a of the lower housing 831 to allow oil and particulate matter to flow from the cavity 817 to within the inner diameter of the secondary screen 832.

An oil pipe 836 is provided between the annulus disposed between the lower housing 831 and the outer surface of the secondary screen 832 and the cavity 817 to allow any oil flowing through the secondary screen 832 to return to the cavity 817, and ultimately flow through the oil pump 120. As appreciated by those of ordinary skill, there normally is little to no oil flow through the secondary screen 832 and the oil pipe 836 during normal operation because the pressure within the cavity 817 is normally substantially the same as the pressure within the lower housing 831.

An elongate cylindrical piston 840 is reciprocatingly mounted with respect to the lower housing 831 to allow piston 840 movement between a normal position with a front face 841 of the piston 840 disposed within the lower housing 831 and proximate to a closed end thereof to form a leakage barrier from the lower housing 831 at the closed end 831c thereof (FIGS. 38 and 40-42), and an extraction position (FIGS. 43-44) where the front face 841 extends out of the opposite end of the lower housing 831 and presses the compressing face 854 of the end cup, or end cap, 850 (FIG. 39-40, discussed below) away from the lower housing 831. The inner surface of the closed end 831c of the lower housing 831 may include one or more o-rings or similar structures disposed in series that are at least partially compressed by the piston 840 to substantially prevent oil from leaking out of the lower housing 831 therebetween. The piston 840 has an outer diameter only slightly smaller than the inner diameter of the secondary screen 832, which causes the front face 841 of the piston 840 to scrape the secondary screen 832 as the piston 840 translates within the lower housing 831. As the piston 840 translates from the normal position to the extraction position, any particulate matter disposed within the lower housing 831 is pushed through the lower housing 831 and toward the compressing face 854 of the end cup 850 by the front face 841 of the piston 840.

The translation of the piston 840 from the normal position to the extraction position causes the inlet apertures 831a, 832b of the lower housing 831 and secondary screen 832, respectively, to be blocked by the cylindrical body, or skirt, of the piston 840 such that oil and particulate matter disposed within the cavity 817 is prevented from traveling into the lower housing and debris extraction mechanism 830. The blockage of the inlet apertures 831a of the lower housing 831 encloses the debris extraction mechanism 830 and allows for compression of debris and particulate matter between the piston 840 and the end cup 850 for ultimate removal from the extraction mechanism 830, as discussed below. As can be understood, as the piston 840 translates toward the end cup 850 (and the inlet aperture 831a of the lower housing 831 becomes blocked) the oil pressure within the lower housing increases due to the decreasing volume within the lower housing 831 between the piston 840 and the end cup 850. The as the oil pressure increases, oil flow through the secondary screen 832 and the oil pipe 836 similarly increases due to the differential pressure between the inner housing 831 and the cavity 817.

The piston face 841 ultimately contacts a compressing face 854 of the movable end cup 850 as the piston 840 nears the extraction position. As discussed below, the compressing face 854 is biased toward the piston face 841 with one or more springs 853, which initially prevents the compressing face 854 from translating upon contact with the piston 840. With continued motion of the piston 840 toward the extraction position, any particulate matter disposed between the compressing face 854 and the piston 840 is compressed, causing any oil remaining with the particulate matter to flow out from between the piston face 841 and compressing face 854 (due to the compression and high pressure therebetween) and any solid particulate matter therebetween to break up and crumble under the compressive forces. With further translation of the piston 840 toward the extraction position, the outward force imparted upon the compression face 854 ultimately overcomes the inward biasing force of the one or more springs 853 causing the compressing face 854 to translate along with the piston 840.

The translation of the piston 840 through the lower housing 831 is controlled by the control system 92, which selectively translates the piston 840 from the normal position to the extraction position, and later returning the piston 840 to the normal position after a predetermined dwell time. The control system 92 may cause the piston 840 to cycle based on at least one of a number of different operational parameters, such as, a predetermined number of scraper assembly 820 cycles, a predetermined number of cooking cycles of the fryer, and elapsed time from the previous piston 840 cycle, or the like. Additionally, the control system 92 may cause a piston cycle upon a manual command by the user.

The piston 840 is mechanically connected to an electromechanical apparatus to automatically translate the piston 840 between the normal and extraction positions. As shown in FIGS. 39 and 44, the piston 840 may be mechanically connected with a first linear actuator 880 to cause linear motion of the piston 840. The first linear actuator 880 includes a telescopic arm 880a that is selectively advanced outward or withdrawn into the body of the device. The end of the telescopic arm 880a is mechanically fixed to a piston follower 842 that is fixed to an end of the piston 840 opposite from the forward face 841. As shown in FIGS. 38-39 and 40-43, the debris extraction mechanism 830 may include two or more guide rails 844 that extend along the length of the mechanism to align and control the movement of many of the components of the mechanism 830. The piston follower 842 slides along the guide rails 844 to align the piston 840 (and follower 842) upon linear motion of the telescopic arm 880a. As shown in the figures, the piston 840 is disposed in the normal position when the telescopic arm 880a is extended from the body of the linear actuator 880, and urges the piston 840 toward the extraction position (i.e. into contact with the compressing face 854 of the end cup 850) when the telescopic arm 880a is pulled into the body. As can be understood in an alternate embodiment, the piston 840 and linear actuator 880 can be disposed in the opposite manner, with the piston 840 moving toward the extraction position when the telescopic arm 880a moves away from the body of the linear actuator 880. In other embodiments, the piston 840 may be translated by a motor with or without a transmission disposed therebetween, a moving or stationary electromagnet, a lead screw, or with other structures suitable for causing controlled linear motion of an object known in the art.

Figure 40:
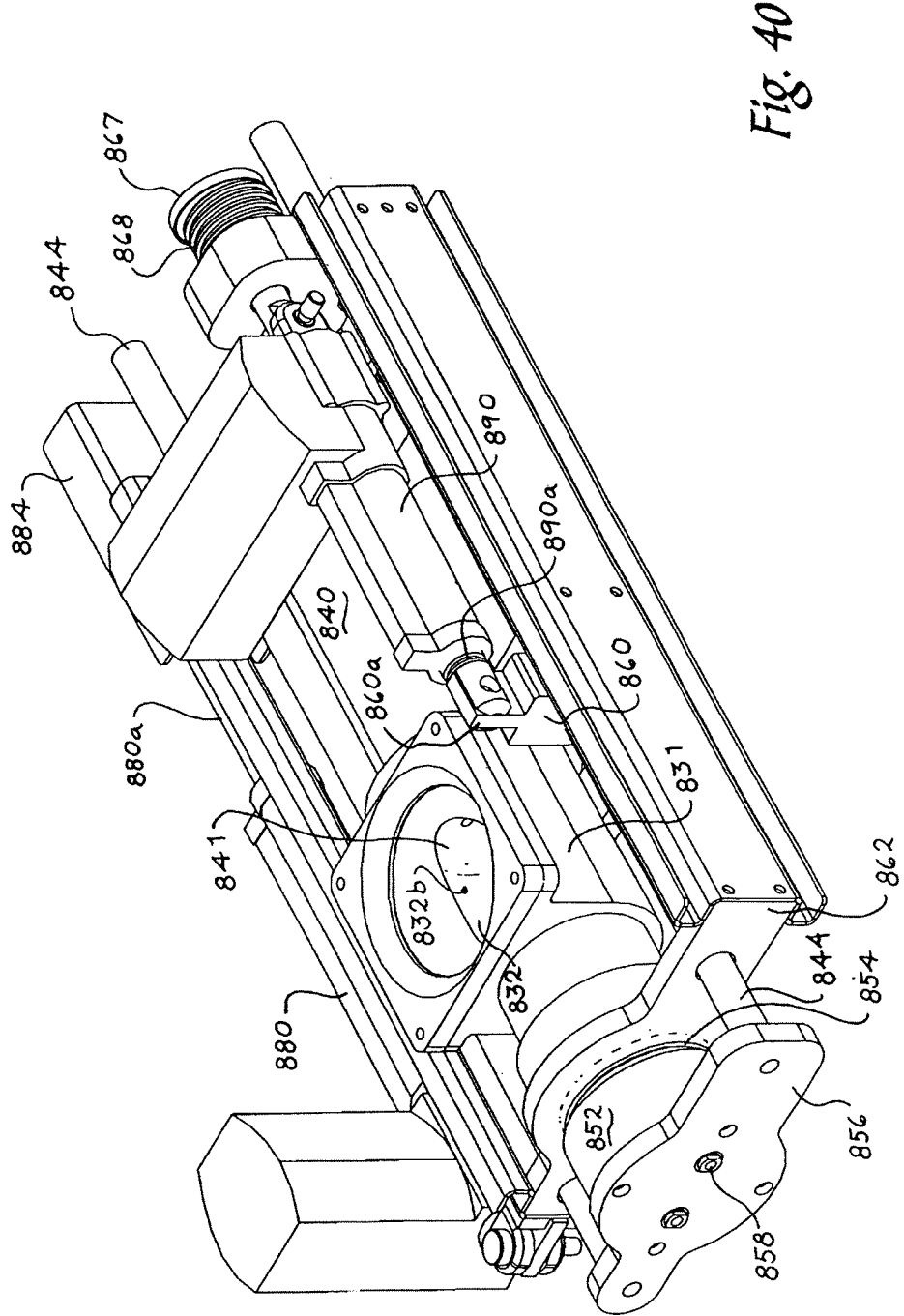
FIG. 40 is a perspective view of the debris extraction mechanism in a normal position of the filter mechanism of FIG. 38.
Figure 41:
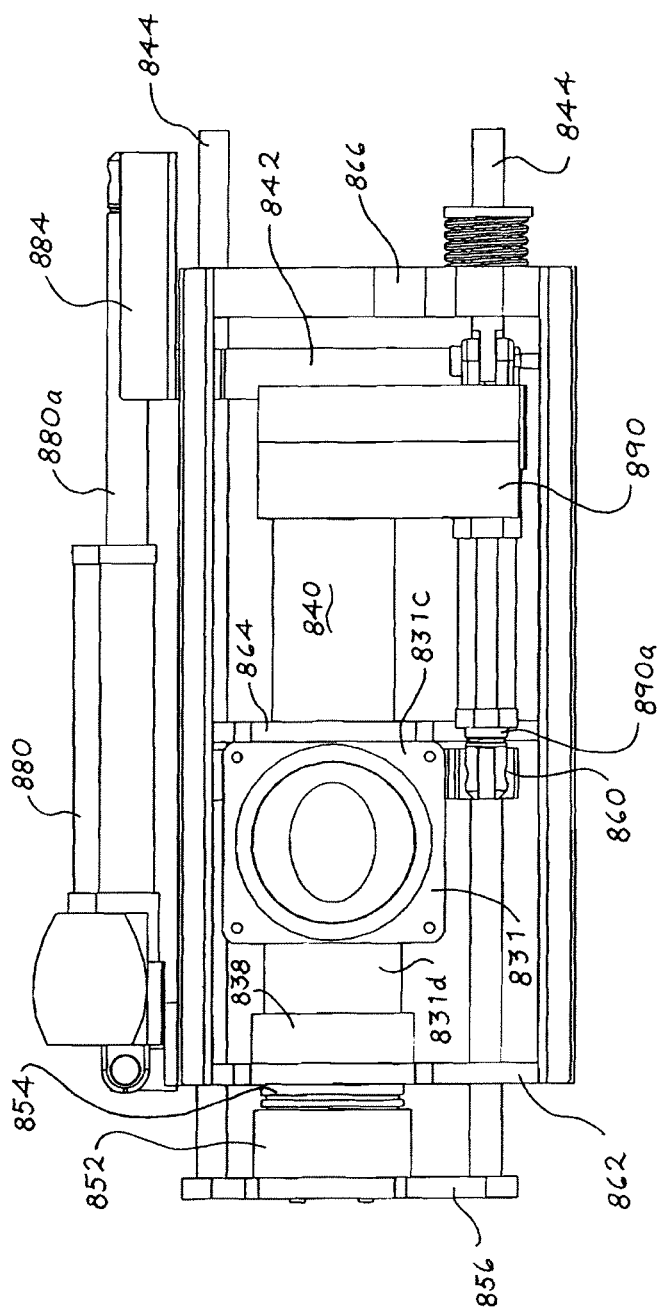
FIG. 41 is a top view of the debris extraction mechanism of FIG. 40.
Figure 43:
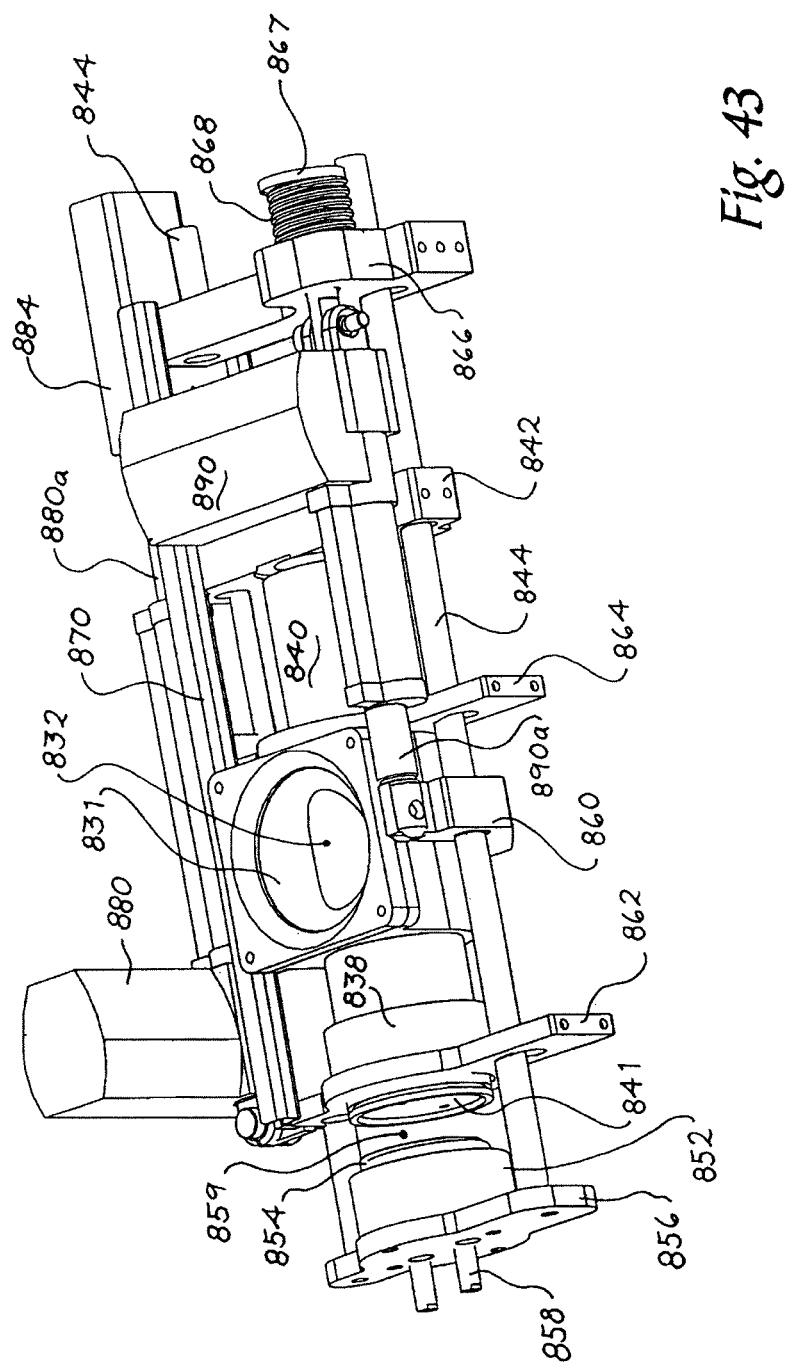
FIG. 43 is the debris extraction mechanism of FIG. 40 in an extraction position.
Figure 44:
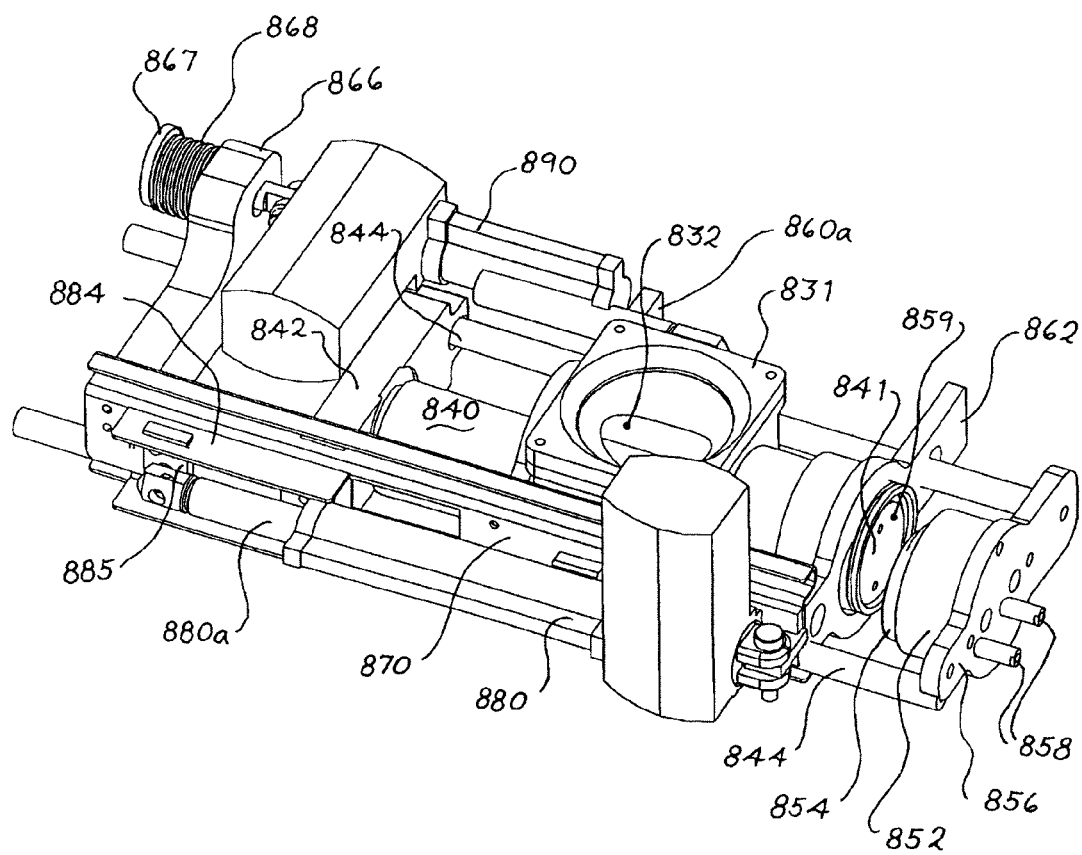
FIG. 44 is another perspective view of the debris extraction mechanism of FIG. 43.
Figure 45:
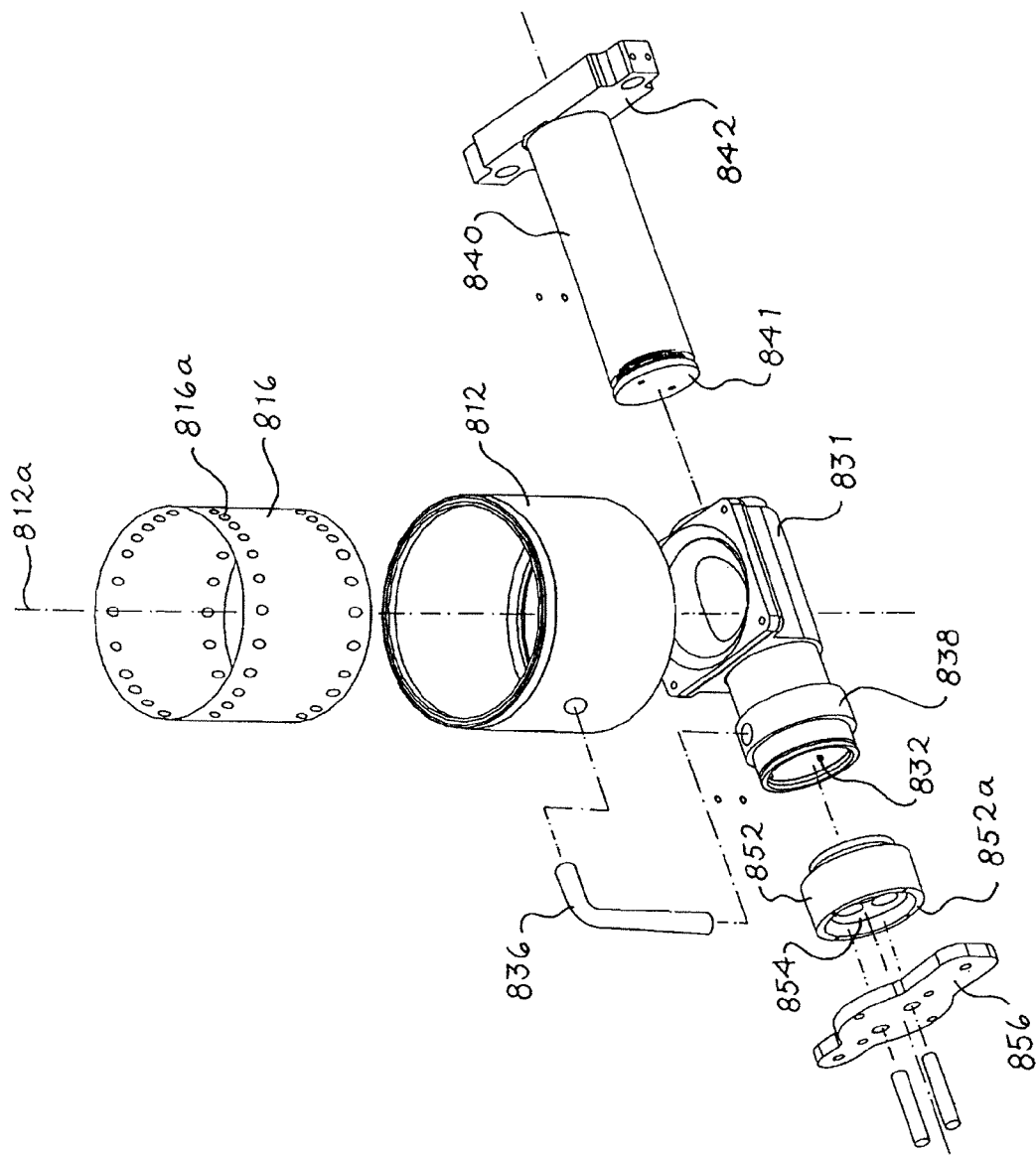
FIG. 45 is an exploded view of a portion of the filter mechanism of FIG. 38.

As best shown in FIGS. 40, 41, and 43, the end cup 850 is translatably mounted proximate and extending into a portion of the open end 831d of the lower housing 831. The end cup 850 includes a compressing face 854 that is translatably mounted within a hollow rear body 852. The body 852 includes a forward sealing face that is configured to normally provide surface-to-surface contact with the sealing end 838 of the lower housing 831 to prevent oil leakage from the open end 831d of the lower housing 831. The compressing face 854 includes a solid forward face portion that normally extends through the open end 831d and into the lower housing 831. The outer diameter of the face portion of the compressing face 854 is only slightly smaller than the inner diameter of the secondary screen 832 and a sealing end 838 of the lower housing 831, which additionally substantially prevents oil leakage from the lower housing 831 through the open end 831d.

The end cup 850 is biased into a position where the compressing face 854 at least partially extends within the open end 831d of the lower housing 831 (and the aperture 904a of the supporting member 904, where provided (FIGS. 50-52)) by a spring 868 that is disposed between the head of an actuator pin 867 and a guide flange 866. The actuator pin 867 is connected to a rear end (i.e. the end opposite from the telescopic arm 890a) of a second linear actuator 890 (discussed below). As discussed below the telescopic arm 890a is ultimately connected with the end cup 850 (by way of the end cup drive bar 860 and end cup cover 856 in some embodiments). The guide flange 866 is fixed to the side rails 870, which are additionally fixed to the front and rear cross bars 862, 864. Because the guide flange 866 is fixed with respect to side rails 870 and therefore the lower housing 831 (which are fixed by the front and rear cross bars 862, 864), the spring 867 normally urges the actuating pin 867 away from the lower housing 831 and second linear actuator 890, which in turn urges the compressing face 854 of the end cup 850 through the open end of the lower housing 831.

The compressing face 854 includes a rear portion with a larger diameter than a forward end of the rear body 852 (and the forward portion of the compressing face 854), which allows the compressing face 854 to move rearwardly (i.e. when urged rearwardly by the piston 840 moving toward the extraction position) with respect to the rear body 852, but any rearward motion of the rear body 852 ultimately causes similar rearward motion of the compressing face 854. The rear portion 852 of the end cup 850 is fixed to an end cup cover 856 which is fixed to an end of each of the plurality of guide rails 844 with bolts or other types of fasteners. In some embodiments the guide rails 844 may include threaded ends that are received within tapped holes in the end cup cover 856, or in other embodiments, the guide rails 844 may include taped holes that receive fasteners that extend through apertures in the end cup cover 856. One or more springs 853 may be disposed between the end cup cover 856 and the compressing face 854 to bias the compressing face 854 into its normal position extending within the lower housing 831.

The compressing face 854 may include one or more pins 858 that extend from the opposite side of the compressing face 854 from the front side facing the piston 840, and additionally extend through apertures defined in the end cup cover 856. The pins 858 extending from the compressing face 854 are configured to selectively contact a corresponding number of switches or other signaling mechanisms 858a when the compressing face 854 is translated rearwardly after engagement with the piston face 841 (and the biasing force of the spring 853 is overcome). In some embodiments, the pins 868 contact the switches 858a when the compressing face 854 is translated between about 1 and 1.125 inches by the piston 840. One of skill in the art will understand that this and other dimensions are variable and dependent on the dimensions of the other components in the debris extraction mechanism 830. When the pins 858 contact the switches 858a, a second linear actuator 890 (or other electromechanical translation mechanism, as discussed above with reference to first linear actuator 880) is enabled, which causes a telescopic arm 890a to translate. The telescopic arm 890a of the second linear actuator 890 is mechanically fixed to the end cup cover 856. The telescopic arm 890a translates toward the end cup 850, the end cup cover 856 translates in the same direction, which pulls the rear portion 852 (fixed to the end cup cover 856) and the compressing face 854 away from the front face 841 of the piston 840. The telescopic arm 890a may travel 4 inches, or other suitable travel distances based upon the size of the other components of the embodiment.

As the end cup 850 is pulled away from the piston 840, the compressing face 854 additionally is withdrawn from within the lower housing 831 (and aperture 904a of the supporting member 904, when provided) until compressing face 854 is translated to a position where a gap 859 (FIGS. 43-44) is formed between the compressing face 854 and the front face 841 of the piston 840 outside of the lower housing 831. As the end cup 850 is initially withdrawn from the piston 840 by the telescopic arm 890a, the compressing face 854 is initially urged again toward the piston 840 due to the biasing force of the spring 853. With additional movement of the end cup 850, the compressing face 854 is again withdrawn from the front face 841 of the piston 840, which provides space, or a gap 859, for any particulate matter or debris previously disposed therebetween to fall through the gap 859 and out of the debris extraction mechanism 830. The piston 840 forms a seal with sealing end 838 of the lower housing 831 to prevent oil leakage from the lower housing when the end cup 850 is withdrawn from the lower housing 831. In some embodiments, the gap 859 may be about 2.25 inches, while in other embodiments the gap 859 may be different lengths dependent on the dimensions of the components within the mechanism 830.

In some embodiments a tray, bucket, or similar structure (not shown) may be disposed below the sealing end 838 to catch any falling debris for ease of cleaning and ease of use. As discussed above, a significant portion of the oil previously disposed between the front face 841 of the piston 840 and the compressing face 854 was urged through the secondary screen 832 (and ultimately to the cavity 817 via the oil pipe 836) due to the large pressure exerted upon the oil when compressed between the compressing face 854 and the front face 841 of the piston 840 (and the differential pressure between the lower housing 831 and the cavity 817). Accordingly, when the compressing face 854 is translated out of the lower housing 831 and away from the piston 840, a minimal amount of oil is lost from the filter system 810 and the fryer.

Figure 42:
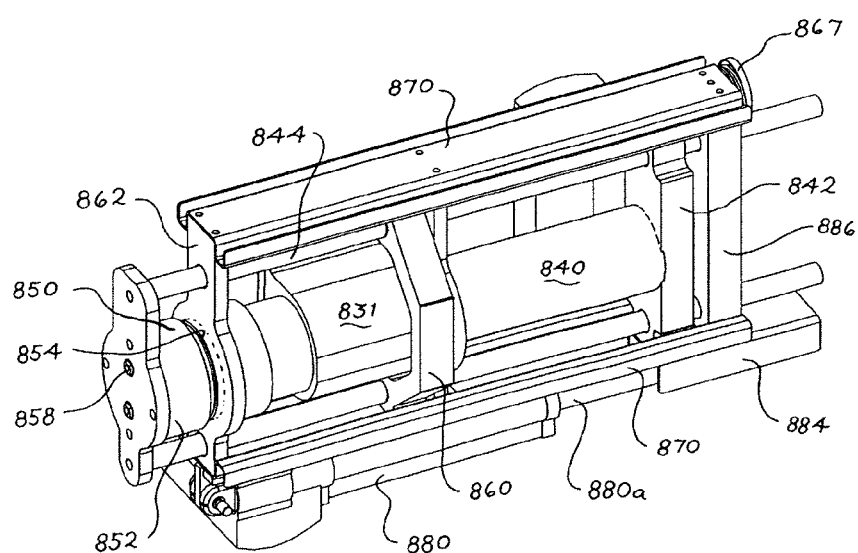
FIG. 42 is a bottom perspective view of the debris extraction mechanism of FIG. 40.

As best shown in FIGS. 39-42, the debris extraction mechanism 830 may additionally include an end cup drive bar 860, which is rigidly connected to the plurality of guide rails 844. The end cup drive bar 860 may be fixed to the guide rails 844 by a crank cotter pin or by other types of structures and fasteners as known in the art. The end cup drive bar 860 is directly connected with the telescopic arm 890a of the second linear actuator 890, such that the end cup drive bar 860 and the guide rails 844 are each translated in parallel to the telescopic arm 890a when the telescopic arm 890a is translated by the second linear actuator 890. In some embodiments, the end cup drive bar 860 may include a protrusion 860a that connects with the telescopic arm 890a with a pin, a fastener, or other known removable mounting structures. The end cup drive bar 860 may be provided in a substantially "U" shape, with two legs that include mounting structures to fix the end cup drive bar 860 to each of the plurality of guide rails 844, with a central section that connects the two legs. As shown in FIG. 42, the geometry of the end cap guide rail 860 may such that the central portion is disposed below the lower housing 831 to allow the end cap guide rail 860 to translate with respect to the lower housing 831 and to promote a compact overall design for the debris extraction mechanism 830.

In some embodiments a chopping mechanism may be provided to reciprocatingly move between the piston face 841 and the compressing face 854 of the end cup 850 when the end cub 850 is withdrawn from the lower housing 831 to create the gap 859 therebetween. The chopping mechanism contacts (or moves closely parallel to) one or both of the front face 841 of the piston 840 and the compressing face 854 of the end cup 850 to mechanically strip debris stuck to that structure and urge the debris out of the debris extraction mechanism 830 due to gravity. Particulate matter or debris that is urged from the gap 859 and scraped from one or both of the compressing face 854 and piston face 841 may fall to a collection structure (not shown) disposed below the debris extraction mechanism 830 due to gravity. In other embodiments, other removal structure (whether manually or automatically controlled) to transport removed particulate matter away from the extraction mechanism 830 may be provided.

Figure 50:
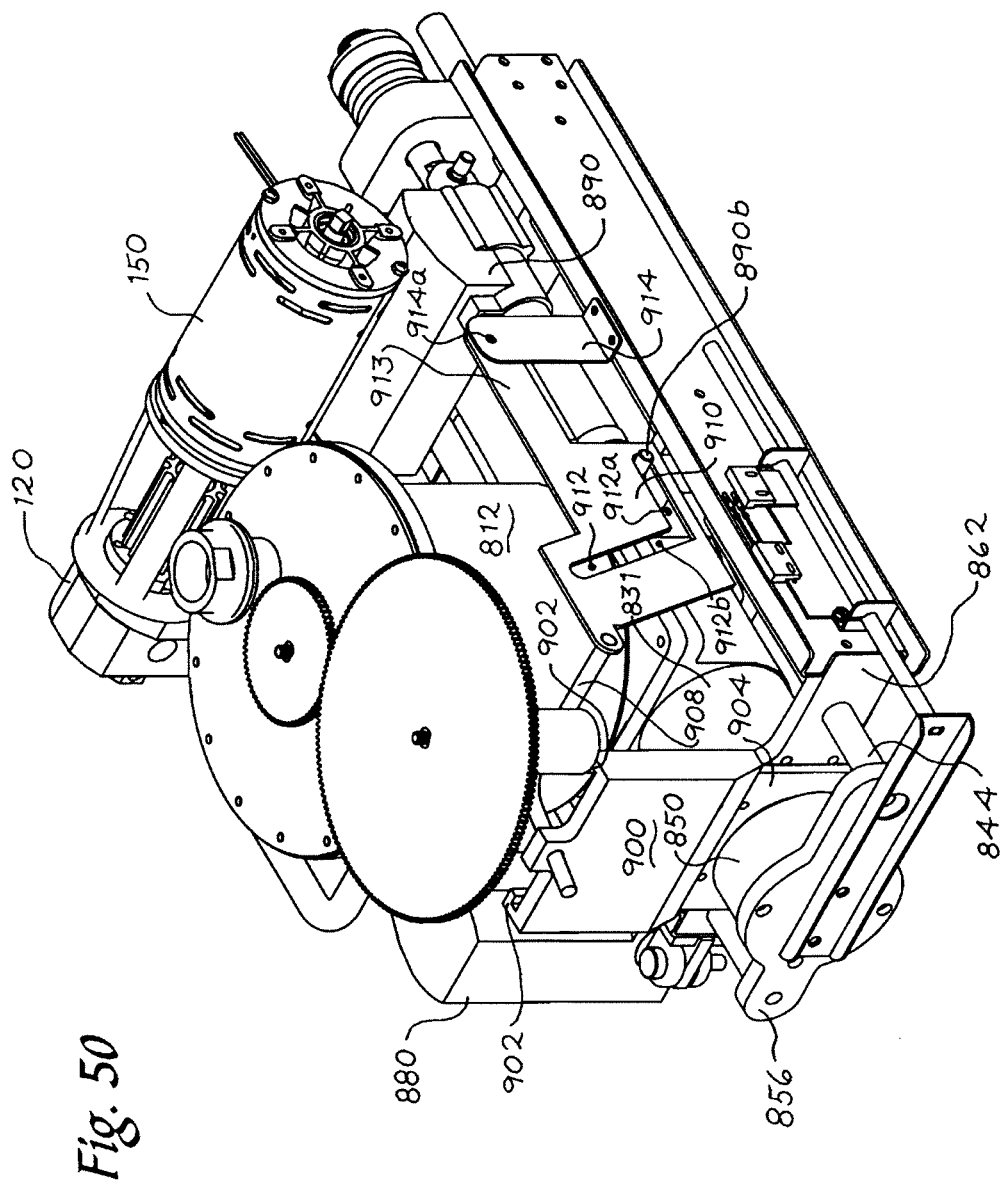
FIG. 50 is a perspective view of the filter mechanism of FIG. 38 with a chopping mechanism in the retracted position.
Figure 51:
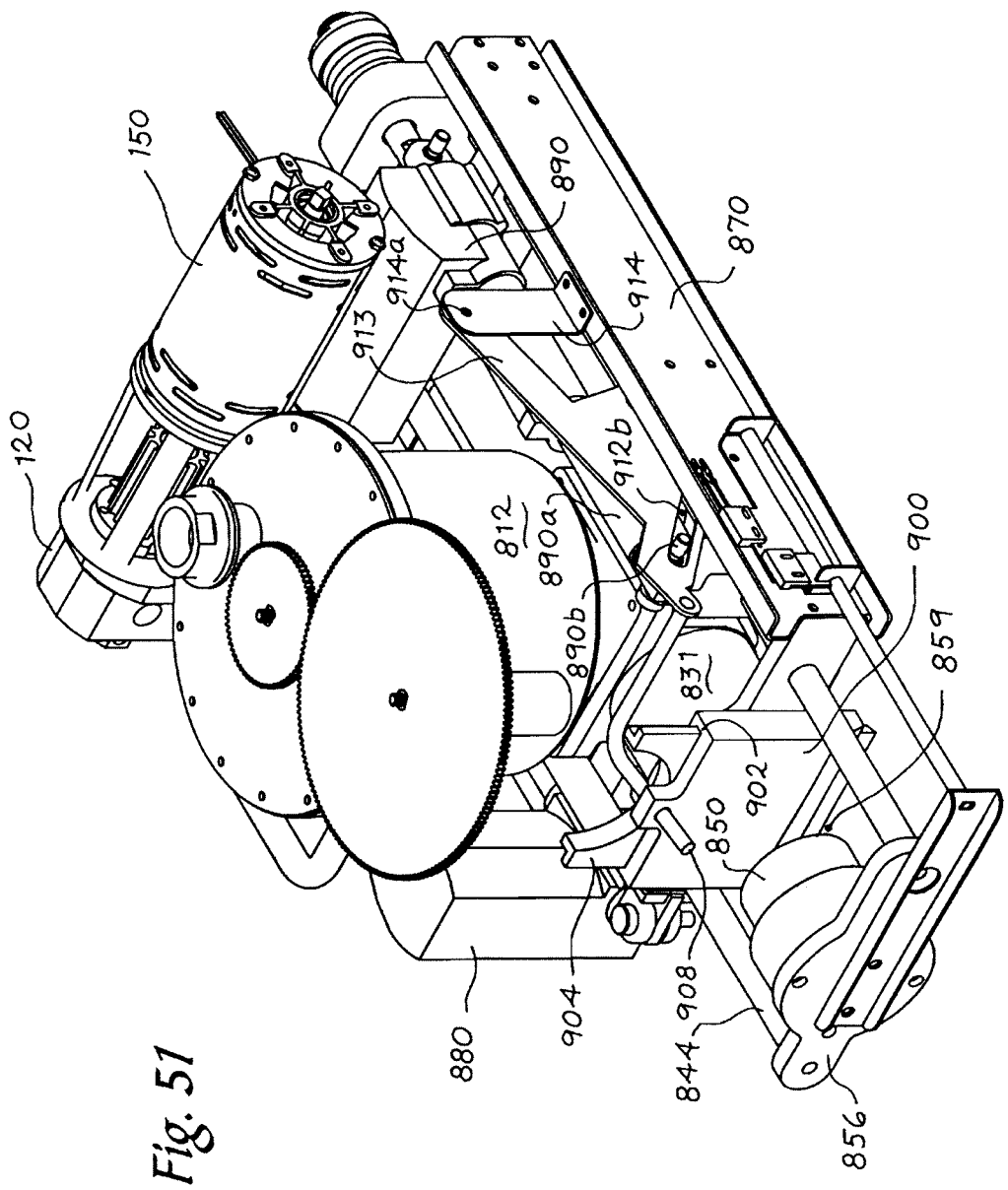
FIG. 51 is the view of FIG. 50 with the chopping mechanism in a lower position.
Figure 52:
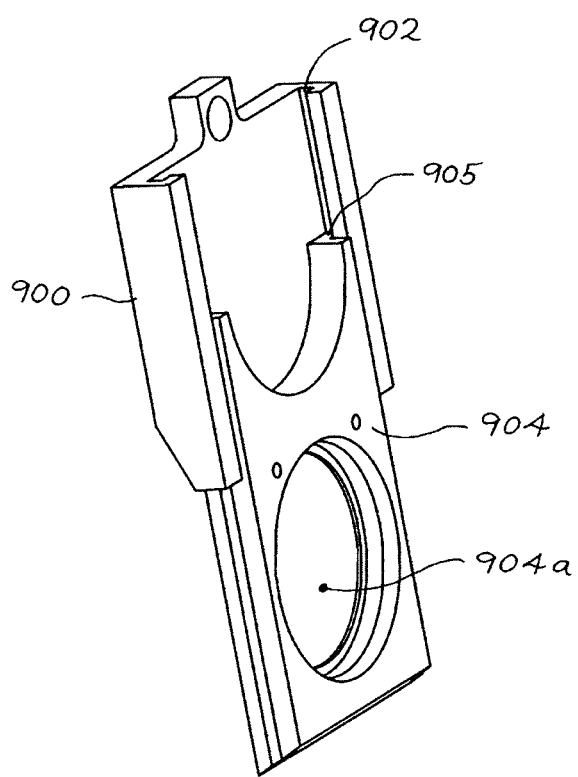
FIG. 52 is a perspective view of a portion of the chopping mechanism of FIG. 50.

In other embodiments shown in FIGS. 50-52, a chopping mechanism may be movably mounted to the debris extraction mechanism 830 to remove debris disposed between the front face 841 of the piston 840 and the compressing face 854 of the end cup 850. The chopping mechanism includes a guillotine 900 that is movable between a retracted position (FIG. 50) where the guillotine 900 is disposed above the end cup 850 and to a second, lower position (FIG. 51) where the guillotine 900 is disposed within the gap 859 between the piston 840 and the end cup 850. In some embodiments, as can be understood with reference to FIGS. 43, 50 and 51, as the guillotine 900 slides from the retracted position to the lower position, the inner surface of the guillotine makes sliding contact with, or translates in very close proximity with, the front face 841 of the piston 840.

In other embodiments, the guillotine 900 may move between the retracted and lower position while making sliding contact with, or translating in very close proximity to the compressing face 854 of the end cup 850. In still other embodiments, the guillotine 900 may make sliding contact with or translating in very close proximity to each of the front face 841 of the piston 840 and the compressing face 854 of the end cup 850.

The guillotine 900 is movably mounted to the debris extraction mechanism 830 with a linkage as aided by a supporting member 904. The linkage includes a pivotable frame 910 that is pivotably mounted to the telescoping arm 890a of the second linear actuator 890. Specifically, the frame 910 includes a slot 912 that receives a pin 890b that is fixed to the telescoping arm 890a, such that telescopic motion of the arm 890a causes the pin 890b to translate through the slot 912. The slot 912 includes a horizontal first portion 912a and an oblique second portion 912b that is disposed at an obtuse angle with respect to the first portion 912a. The frame 910 includes an extended portion 913 that is pivotably mounted with a pinned connection 914a with a bracket 914 that is fixed to the side rail 870 that supports the second linear actuator 890. The frame 910 receives a distal end of a member 908 that includes an opposite end that is fixed or connected with the guillotine 900. As shown in FIGS. 50 and 51, the member 908 may include two substantially perpendicular portions that connect to each of the frame 910 and the guillotine 900, respectively. In other embodiments, the member 908 may be of any size, shape, and orientation necessary to translate the guillotine 900 based on motion of the second linear actuator 890 or other convenient mechanism.

The guillotine 900 is translatably mounted upon a supporting member 904 that is fixed to the lower housing 831. As shown in FIG. 50, the supporting member 904 may be fixed to the front cross bar 862, which is in-turn fixed to the lower housing 831. FIG. 52 provides a detail view of the supporting member 904 that includes a central aperture 904a which provides a path for at least the compressing face 854 of the end cup 850 to extend therethrough into the lower housing 831 in a position to selectively receive the front face 841 of the piston 840. The supporting member 904 further includes two oppositely extending flanges 905 that rest within a portion of a track 902 defined on opposite ends of the guillotine 900. An inner surface of the guillotine 900 is slidable past an outer surface of the supporting member 904 as the guillotine 900 slides with respect to the supporting member 904.

As can be understood with comparative reference to FIGS. 50-51, as the arm 890a of the second linear actuator 890 telescopically translates outward to cause the end cup 850 to translate away from the lower housing 831 and the piston 840, the pin 890b slides within the horizontal first portion 912a of the slot 912. With sufficient motion of the leg 890a, the pin 890b enters the second portion 912b of the slot 912, which causes the frame 910 to pivot about the bracket 914 with the pinned connection 914a due to the obtuse second portion 912b of the slot 912. As the frame 910 pivots, the distal end of the member 908 is moved downward, which similarly causes the guillotine 900 to slide downward as constrained by the connection between the flanges 905 disposed upon the supporting member 904 and the track 902 of the guillotine 900. The length of the first portion 912a is such that the frame 910 does not pivot until the gap 859 is sufficient to receive the guillotine 900 therewithin.

As the guillotine 900 slides downward, the guillotine slides past the front face 841 of the piston 840 (whether in contact with or in close proximity, such as between about 0.01 and 0.03 inches from the front face 841) any particulate matter or debris retained between the piston 840 and the end cup 850 is urged from the respective component within the debris extraction mechanism 830, due to the mechanical force of the guillotine 900 and gravity. After a fixed dwell time, the second linear actuator 890 pulls the arm 890a telescopically toward the body of the linear actuator 890, which causes the pin 890b to side within the second portion 912b of the slot 912 toward the first portion 912a of the slot 912. As the pin 890b moves within the second portion 912b of the slot 912, the frame 910 is pivoted about the bracket 914 and the guillotine 900 is urged upward along the supporting member 904 due to the force provided thereto by the member 906 and the frame 910. The guillotine 900 is fully withdrawn from the gap 859 when the pin 890b is at the vertex of the first and second portions 912a, 912b of the slot 912. With continued inward movement of the arm 890a, the guillotine 900 is fixed above the end cup 850 (because the frame 910 no longer pivots upon the bracket 914) and the end cup 850 is urged toward its normal position with the compressing face 854 disposed within the open end 831d of the lower housing 831 and through the supporting member 904.

In other embodiments, the chopping mechanism may be disposed and operate similarly to the leg 1780 and associated components thereof, which are discussed above and shown in FIGS. 30-32 and 35-35a.

Figure 46:
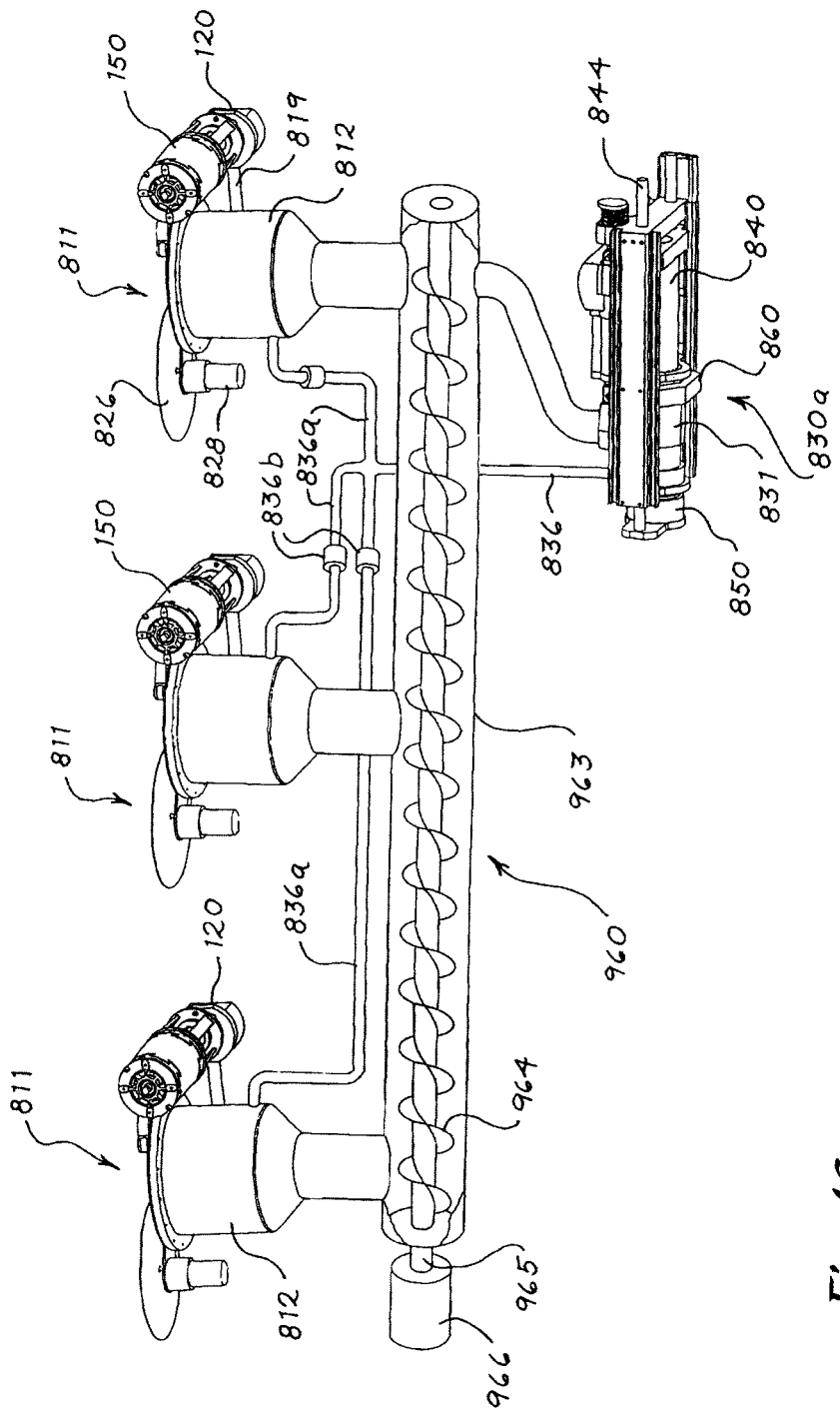
FIG. 46 is a perspective view of an assembly of the filter mechanism of FIG. 38 configured to connect with three cooking appliances in parallel.
Figure 47:
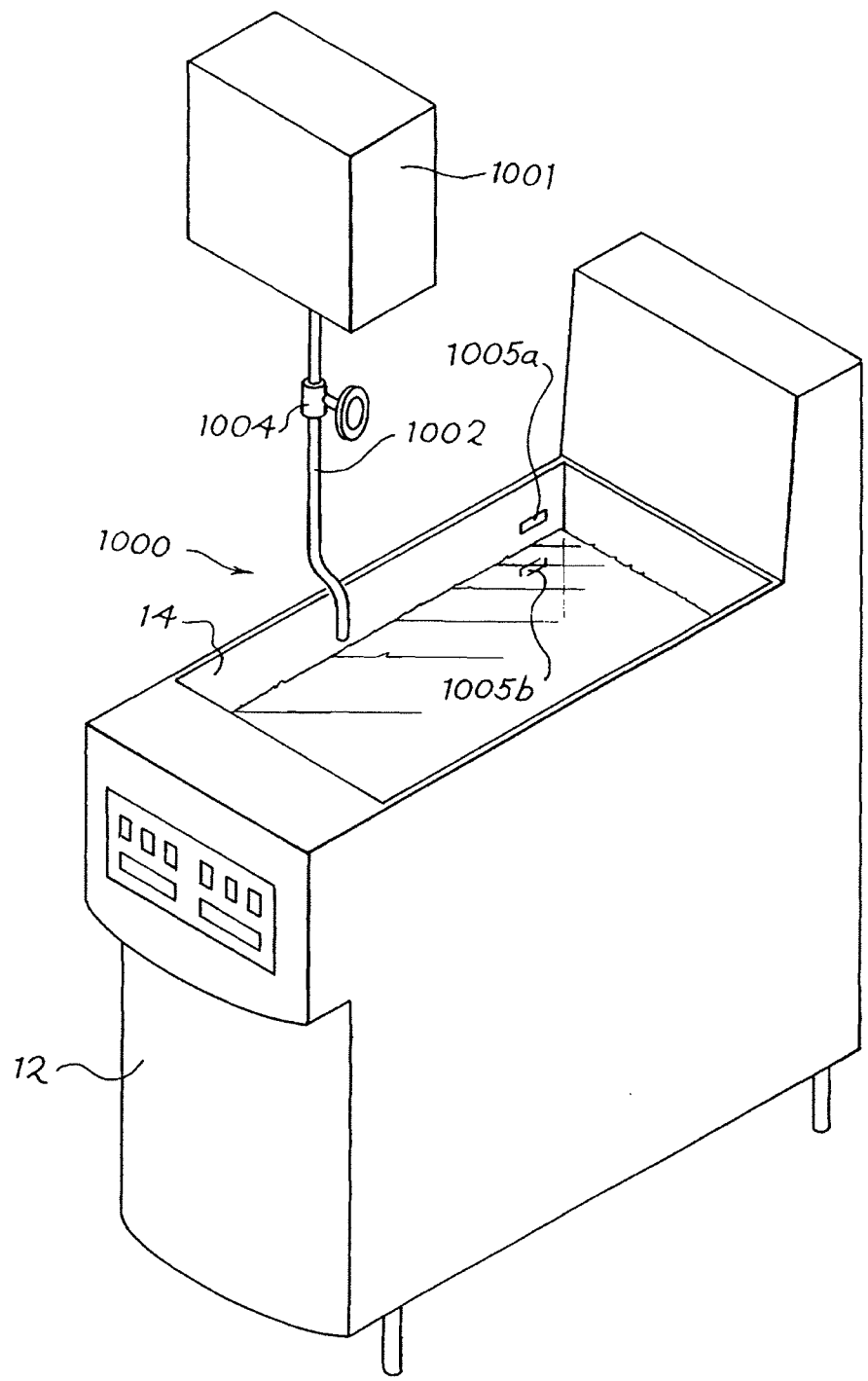
FIG. 47 is a perspective view of a fryer fluidly connected to a remote oil storage tank.
Figure 49:
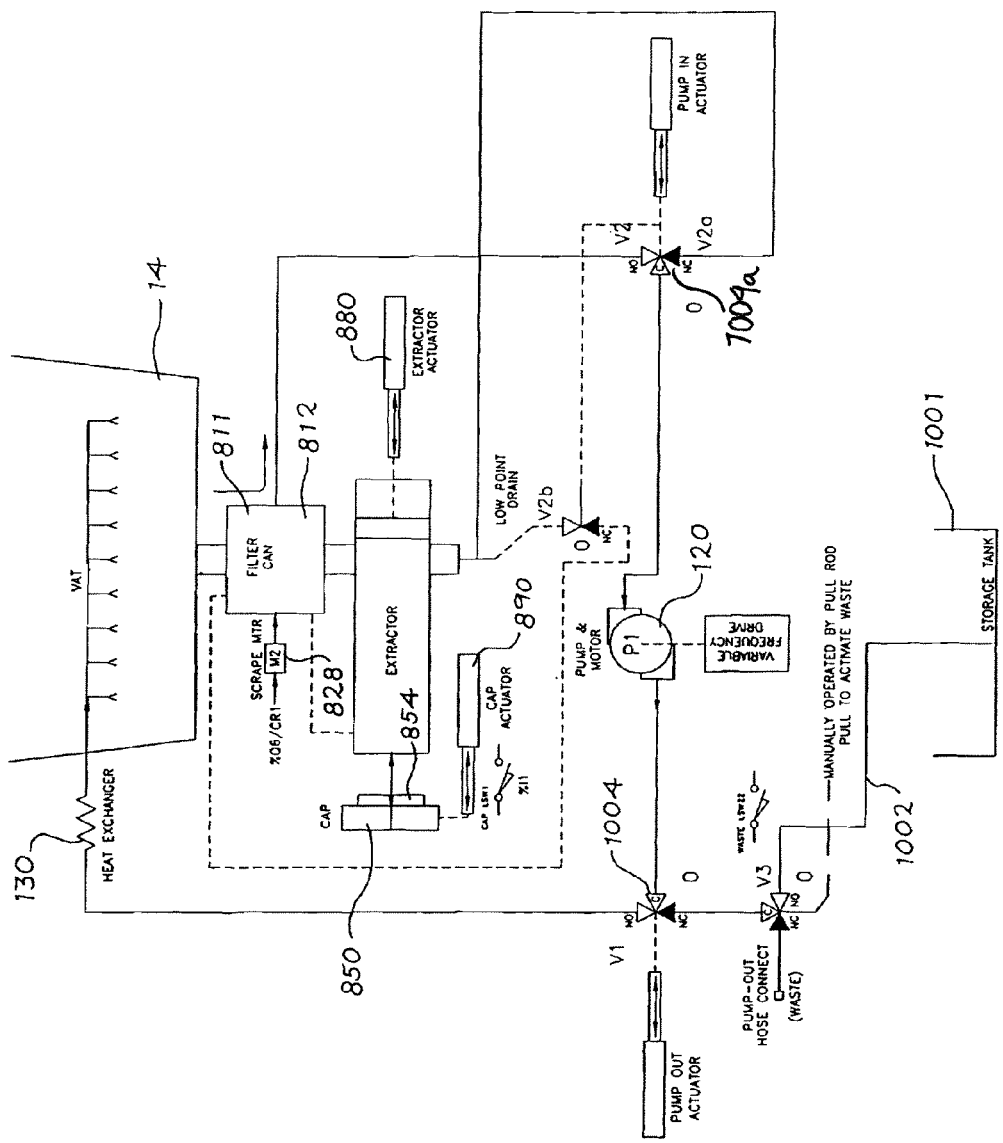
FIG. 49 is a schematic line drawing of the filter mechanism of FIG. 38.

In some embodiments shown in FIGS. 47 and 49, the control system 92 may additionally include a level control subsystem 1000 to control the level or volume of oil within the vat 14 within a predetermined normal operational range. While the level subsystem 1000 is discussed with respect to the embodiment shown generally in FIGS. 38-52 and controlled by the control system 92, the level subsystem 1000 could equally be installed in the other filter embodiments discussed above and operated by control systems 90 or 91 discussed above. The discussion of the control systems 90 and 91 including the level control subsystem 1000 is not repeated herein for the sake of brevity.

The fryer may be configured to selectively receive a flow of replacement oil from a storage volume 1001 through a pipe 1002 connected therebetween. The pipe 1002 may be configured to provide replacement oil from the storage volume 1001 directly into the vat 14, or in other embodiments, the replacement oil may enter the fryer upstream of the heat exchanger 130 or at another convenient location to at least partially heat the oil prior to entering the vat 14. As shown in FIG. 49, in some embodiments the storage volume 1001 may be selectively fluidly connected to the pump 120 so that the pump 120 provides the motive force to urge replacement oil into the system from the storage volume 1001. In some embodiments, the pump 120 may reversible such that the length of piping fluidly connected to the storage volume 1001 is at the pump suction 122, which vacuum drags oil from the storage volume 1001 through the pump 120 and ultimately to the vat 14. In embodiments where the pump is reversible for selective addition of oil through the pump 120, one or more isolation valves 1004 (such as three way valves shown on FIG. 49) may be provided so that the control system 92 may automatically reposition the appropriate valves for the correct flow path with the fryer for the specific desired evolution. In other embodiments shown in FIG. 47, the storage tank 1001 and vat 14 may be relatively configured to allow oil to gravity drain to the vat 14 when the isolation valve 1004 is opened (whether manually or automatically by the control system).

The vat 14 may include one or more level detectors or sensors that provide a signal to the control system 92 proportional to the oil level within the vat 14. In some embodiments, the vat 14 may include two fluid activated switches or sensors (which may be capacitive switches, sonoswitches, or similar switches that are configured to detect the presence or absence of fluid proximate thereto), a first sensor 1005a positioned at a high oil level mark and a second sensor 1005b positioned at a low oil level. When the second sensor 1005b no longer detects oil proximate thereto, the control system 92 causes a remotely operable isolation valve 1004 disposed within the pipe 1002 to open, allowing oil flow from the storage volume 1001 to the vat 14. The control system 92 ultimately receives a signal from the first sensor 1005a that oil is proximate thereto, and the control system 92 causes the valve 1004 to shut, stopping the flow of oil to the vat 14. In other embodiments, the control system 92 may receive a signal only from a low level sensor 1005b, and allow oil flow to the vat 14 from the storage volume 1001 for a predetermined period of time. The storage volume 1001 and the vat 14 may be configured such that oil flows to the vat 14 due to gravity, or in other embodiments, a pump may be provided to urge oil to the vat 14 when the isolation valve 1004 is opened by the control system 92.

Turning now to FIG. 46, a plurality of fryers 800 may be disposed in parallel for simultaneous cooking with a single debris extraction mechanism 830a fluidly connected thereto to receive particulate matter from each of the fryers 800. Specifically, each of the fryers 800 may include a primary filter assembly 811 disposed to receive cooking fluid (referred to as oil herein, but as one of skill in the art will understand the cooking fluid may alternatively be water or other fluids) from a vat 14 of the fryer. The primary filter assembly 811 for each fryer is constructed as discussed above and includes a main housing 812 with coaxial main screen 816 and a scraper assembly 820. The annulus 818 within the main housing 812 is fluidly connected to the suction of a pump 120, which urges the oil to return to the vat 14 then to a heat exchanger 130 disposed therebetween. The scraper assembly 820 is controlled by a control system 92 that selectively controls the scraper assembly 820 using one or more of the parameters discussed above.

Upon operation of the scraper assembly 820, particulate matter is removed from the inner surface of the main screen 816 and falls through an outlet aperture of the main housing 812. The particulate matter (and oil flowing therewith) is received within a debris transport mechanism 960 that is fluidly connected to the outlet of the main housing 812. The debris transport mechanism 960 is connected to two or more fryers mounted proximate to each other to remove particulate matter from the main housing 812 of each dedicated primary filter assembly 811.

The debris transport mechanism 960 is configured to transport the collective volume of particulate matter received from each primary filter assembly 811 to a single debris extraction mechanism 830a for ultimate removal of particulate matter from the system. The debris extraction mechanism 830a is constructed and operates similarly to the debris extraction mechanism 830 discussed above and shown in FIGS. 38-45. Any differences between debris extraction mechanisms 830a and 830 are discussed herein.

The debris extraction mechanism 830a receives particulate matter from the debris transport mechanism 960 within a lower housing 831. A piston 840 is configured to selectively translate through lower housing 831 to remove collected particulate matter therefrom and ultimately contact the compressing face 854 of an end cup 850. The piston 840 is urged within the lower housing 831 by a linear actuator 880 (or other electromechanical system) that may be automatically controlled by a control system 92 and/or manually controlled by the user. The control system 92 may be configured to direct operation of the linear actuator 880 (and therefore the piston 840 mechanically connected thereto, as discussed above) either due to a parameter monitored by the control system 92 reaching a predetermined setpoint, a monitored number of cycles of the scraping mechanisms 820 of each primary filter assembly 811 (either a total number of cycles of all of the scraping mechanisms 820, or a number of cycles of a single scraping mechanism 820), a total number of cooking cycles of the collective fryers or a single fryer, or an elapsed time between a previous cycle of the piston 840 within the debris extraction mechanism 830a. In situations where multiple fryers are fluidly connected to a single debris extraction mechanism 830a, and/or a single primary filter 811, each fryer may include a dedicated control system 92, with each control system 92 being capable of operating all associated components (i.e. the one or more primary filters 811 and the combined debris extraction mechanism 830a) and programmed for selective control using a master/slave relationship as known in the art.

Upon translation of the compressing face 854 by the piston 840, a linear actuator 890 (or other electromechanical mechanism) translates the end cup 850 away from the piston 840 to provide a gap 859 to allow foreign material disposed between to leave the gap, as aided by a chopping mechanism in some embodiments. Similar to the debris extraction mechanism 830 discussed above, the end cup 850 and chopping mechanism (if provided) of the debris extraction mechanism 830a are controlled by linear actuators based upon the position of the compressing face 854 and end cup 850 and are selectively operated by the control system 92.

The lower housing 831 of the debris extraction mechanism 830a includes a secondary screen 832 disposed coaxially therein that forms an annulus therebetween. The annulus may be fluidly connected to a cavity 817 in one or more primary filter assemblies 811 to allow oil from the debris extraction mechanism 830a to return to the system through an oil return pipe 836. In some embodiments, the oil return pipe 836 may include a plurality of branches 836a that allow oil flow to each of the primary filter assemblies 811 in parallel. Each branch 836a may include an isolation valve 836b that allows for control of which primary filter assembly is configured to receive oil flow from the debris extraction mechanism 830a. The isolation valves 836b may be automatically or remotely controllable valves, such as motorized valves, solenoid operated valves and the like, to allow for automatic control of which primary filter assemblies 811 are fluidly aligned with the lower housing 831. In some embodiments, the control system 92 may be configured to selectively operate each isolation valve 836b to maintain a monitored oil level in the vat 14 of each fryer in a proper band either independently or in parallel with the level control subsystem 1000. In some embodiments, the isolation valves 836b may alternatively or additionally manually controllable by the user.

The debris transport mechanism 960 is configured to directly receive a flow of particulate matter, debris, and oil from an outlet of the main housing 812 of a primary filter assembly 811 fluidly connected to the vat 14 of each fryer. The debris transport mechanism 960 either continuously or selectively urges the collected particulate matter and oil received from each primary filter assembly 811 to the inlet of the lower housing 831 of the debris extraction mechanism 830. As shown schematically in FIG. 46, the debris transport mechanism 960 may be a cylindrical tube 963 with an internal Archimedes type screw, or auger, 964. The Archimedes screw 964 is connected to a shaft 965 that may be rotated by an external motor 966, which causes similar rotation of the Archimedes screw 964.

As well known to those of skill in the art, rotation of the Archimedes screw 964 urges or pumps particulate matter and oil in a direction through the tube 964 based on the orientation of the screw threads and the rotation of the shaft 965. One of the ends of the tube 963 includes an aperture that is in fluid communication with the lower housing 831 to allow the particulate matter and oil that is pumped to the end of the tube 963 to fall into the lower housing due to gravity. In other embodiments, the debris transport mechanism 960 may alternatively include a conveyor (with or without a plurality of cups or buckets disposed thereon) to urge movement of particulate matter from each primary filter assembly toward the lower housing 831, or other mechanisms known in the art that are suitable for moving particulate matter.

The debris transport mechanism 960 may continuously operate to constantly urge particulate matter to the debris extraction mechanism 830a, or in other embodiments, the debris transport mechanism 960 may be operated by the control system 92 to cyclically operate based on one or more monitored parameters or events. For example, the control system 92 may be configured to operate the debris transport mechanism 960 whenever one of the scraper assemblies 820 operates in one of the primary filter assemblies 811 of the fryers that are connected to the debris transport mechanism 960. The control system may alternatively or also operate the debris transport mechanism 960 after a specified number of cycles of one or more fryers 800 connected therewith, based on a elapsed time since a previous operation, or manually by the user.

In other embodiments, a plurality of fryers 800 may be fluidly connected to a single primary filter assembly 811, which is connected to a single debris extraction mechanism 830. The vat 14 of each fryer may include a gravity drain line that is connected to a common header that is fluidly connected to the cavity 817 of the main housing 812. From entry into the main housing 812, the single primary filter assembly 811 and the debris extraction mechanism 830 operate in a similar fashion to those discussed above. The filtered oil flows through the outlet pipe 819 to the suction of the pump 120. The pump discharge 124 includes a single header with a plurality of branches that are fluidly connected to allow oil to flow to a heat exchanger 130 disposed within each of the plurality of fryers.

Turning now to FIGS. 12-16, a pump 120 for urging oil flow through the oil circulation system 110 is provided. The pump 120 may be a positive displacement pump that operates with two opposing gears 123a, 123b in mesh within a pump housing 121 or the pump 120 may be one of other suitable oil pumps known in the art. The pump 120 includes a suction port 122 and a discharge port 124, and the pressure of the oil moving through the pump 120 from the suction to the discharge is increased due to the energy imparted onto the oil by the pump gears 123a, 123b. The pump 120 is ultimately operated due from torque provided thereto through a motor 150 and its associated motor shaft 152. The motor 150 is connected to the pump 120 with an intermediate seal assembly 160.

The seal assembly 160 includes a seal housing 164 that rotatably supports and encloses a portion of an intermediate shaft 170. The intermediate shaft 170 includes a first end 171 that is mechanically coupled to the motor shaft 152 with a coupling 176, and a second end 172 that is mechanically coupled to the pump 120. The second end 172 of the intermediate shaft 170 may be coupled to the gears 123a, 123b of the pump 120 with a coupling (not shown) or may be received within an aperture of one of the two gears 123a, 123b to transfer torque thereto. In other embodiments, the intermediate shaft 170 may be directly connected to the motor shaft 152 with a tongue and groove, spline, or other direct attachment structures, which allows the coupling 176 to be eliminated. An external fan (not shown) may be fixed to one of the intermediate shaft 170 or the motor shaft 152 to provide the forced convection air flow over the pump and associated components.

A radial aperture 167 is defined within the seal housing 164 that receives a pin 167a therein. The intermediate shaft 170 may include a groove 173 that is defined proximate to an end of the intermediate shaft 170. The pin 167a extends through the radial aperture 167 and into the groove 173 to retain the intermediate shaft 170 aligned within the seal housing 164.

The shaft seal ring 174 provides a physical barrier between the intermediate shaft 170 and the seal housing 164 to substantially prevent oil leakage from the seal housing 164, and additionally to prevent air from entering the seal housing 164 from the atmosphere. The seal housing 164 may be rigidly mounted to the pump housing 121 such that the shaft seal ring 174 is supported at the distal end 164a of the seal housing 164, which is removed a significant linear distance from the pump housing 121. The distance between the shaft seal ring 174 and the pump housing 121 allows the shaft seal ring 174 to be maintained at a significantly lower temperature than the oil flowing through the pump 120 (and accordingly the temperature of the pump housing 121). The shaft seal ring 174 may be retained within a bore (not shown) in the seal housing 164 to provide for proper positioning of the shaft seal ring 174 with respect to the seal housing 164 and the intermediate shaft 170 for effective torque transfer between the motor shaft 152 and the pump 120.

Because the shaft seal ring 174 is disposed at a distance from the pump housing 121, heat must be conducted through the distance between pump housing 121 and the shaft seal ring 174 to reach the shaft seal ring 174 and increase its temperature. The distance between the two members provides resistance to conduction heat transfer due to the thermal conductivity of the materials defining the intermediate shaft assembly 160 (as well as a greater distance to reduce radiation heat transfer to the seal ring). Further, the increased distance to the shaft seal ring 174 provides greater opportunity for the heat to be transferred away from the conduction flow path due to the additional cooling components and structures discussed below.

It has been determined experimentally, that the service life of the shaft seal ring 174 is increased if the shaft seal ring 174 is operated at lower temperatures, specifically lower temperatures than the nominal oil temperature during fryer operation of approximately 350 degrees Fahrenheit. It has further been determined empirically that steady state operation of the shaft seal ring 174 at a nominal temperature of 250-300 degrees Fahrenheit significantly increases the useful life of the shaft seal ring 174, and therefore similarly increases the useful life of the intermediate seal assembly 160.

The intermediate seal assembly 160 may be a unified assembly that is mountable to and removable from the pump housing 120 with the use of a plurality of fasteners (not shown). The seal housing 164 may include a flange 165 with a plurality of apertures 165a that may be abutted against the pump housing 121 and receive the plurality of fasteners extending into the pump housing 121. With this structure, only simple tools such as a screwdriver or a wrench may be required to mount the intermediate seal assembly 160 to the pump housing 121. Further, with proper alignment of the apertures 165a with similar apertures (not shown) in the pump housing 121, the intermediate seal assembly 160 is easily aligned to operate the pump 120 with the first end 172 of the intermediate shaft engaging the gears 123a, 123b of the pump 120. Further, flush surface-to-surface engagement of the flange 165 with the pump housing 121 and the presence of a one or more face seals 168 substantially prevents oil leakage at the junction between the pump housing 121 and the seal housing 164.

The opposite end 171 of the intermediate shaft 170 may be rotationally aligned with the motor shaft 152 by a coupling 176 disposed between the motor 150 and the seal housing 164. The coupling 176 may include one or more vanes 177 that are formed to provide a flow of air over the seal housing 164 as the coupling 176 rotates. The air flow across the seal housing 164 removes heat from the surface of the seal housing 164, which limits the amount of heat ultimately transferred to the shaft seal ring 174. In some embodiments, the outer surface of the seal housing 164 includes a plurality of radially extending fins 164a, which increases the surface area of the seal housing 164, and accordingly increases the amount of heat transferred from the seal housing 164 to the air flowing over the external surface of the seal housing 164.

Figure 13:
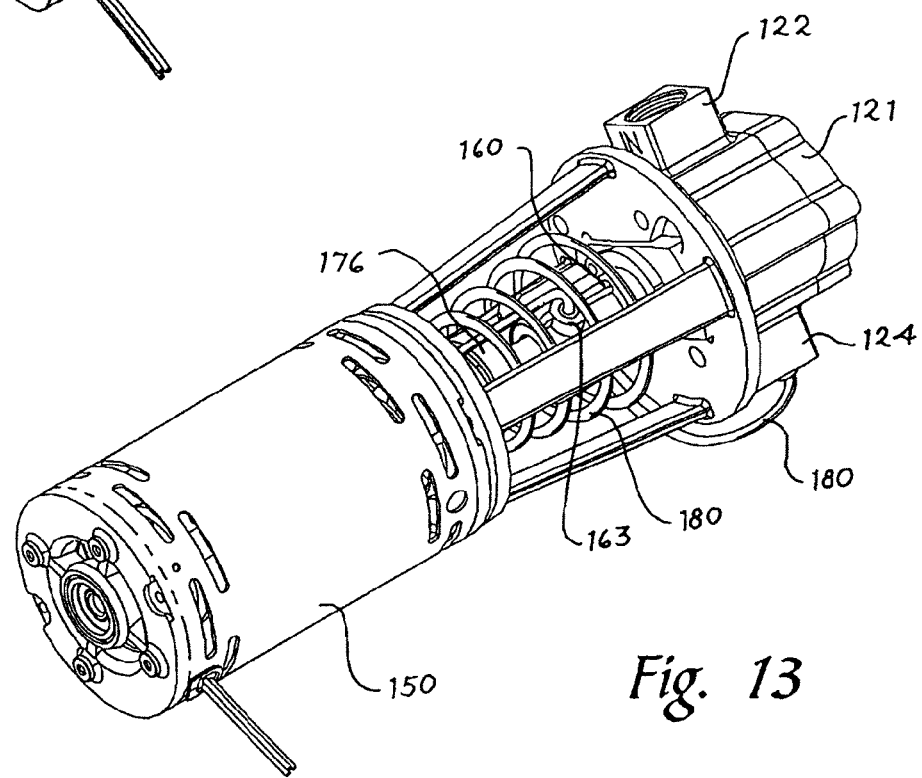
FIG. 13 is the view of FIG. 12 showing a recirculation line for the oil pump.

A recirculation flow path 180 may additionally be provided with the intermediate seal assembly 160, as shown schematically in FIG. 13. Specifically, the seal housing 164 may include an oil entry port 163 fluidly connected with an oil return groove 166. The oil return groove 166 may be defined along the length of the internal bore 164b of the seal housing 164. The groove 166 may be aligned in parallel to the intermediate shaft 170 that extends through the seal housing 164. The oil flowing through the groove 166 contacts the rotating intermediate shaft 170, which provides lubrication to the rotating intermediate shaft 170 and additionally provides cooled oil to the seal housing 164 and the intermediate shaft 170. The addition of the relatively cooled oil removes heat from the system, which if not removed would be ultimately transferred to the shaft seal ring 174.

The recirculation flow path 180 extends between the discharge 124 of the pump 120 and the oil entry port 163, which provides the driving force for oil flow through the recirculation flow path 180. The groove 166 within the seal housing 164 is ultimately fluidly connected to the suction 122 of the pump 120, such that the differential pressure across the pump 120 drives flow through the recirculation flow path 180. The recirculation flow path 180 is formed with an extended length of tubing that may be disposed around the motor and/or the seal housing 164 with multiple helical rotations of tubing, or other beneficial configurations extending into the fryer cabinet or other portions of the fryer. As oil flows through the recirculation flow path 180, heat from the oil is transferred through the tube walls to the atmosphere due to the differential temperature between the oil and the atmosphere. As heat is transferred from the oil to the atmosphere, the oil temperature entering the entry port 163 decreases, which increases the amount of heat transfer from the seal housing 164 and intermediate shaft 170 to the oil flowing through the groove 166.

The motor 150 may be controlled with a variable frequency drive, which allows the rotational speed of the motor shaft 152 to be variably set by altering the frequency of the current applied to the motor. As is known in the art, a variable frequency drive operates with solid state controls that can adjust the frequency and voltage of current applied to the motor from that received by the input current. In some embodiments, a more powerful motor than would be needed to drive the pump 120 and produce the desired flow rate through the heat exchanger 130 is provided and driven at a lower than rated speed. Accordingly, the torque produced by the larger motor is sufficient to drive the pump 120 as required regardless of shaft speed, which allows the shaft speed to be reduced. The reduced shaft speed creates less friction at the bearings (not shown) and the shaft seal ring 174, which decreases the heat produced by friction. The lower amount of heat produced from friction reduces the heat input to the shaft seal ring 174 and allows the shaft seal ring 174 to be operated at lower temperatures for longer useful life. In other embodiments, a constant speed motor may be used, with a reduction gear train (not shown) disposed between the motor shaft 152 and the intermediate shaft 170 to reduce the intermediate shaft 170 speed.

In some embodiments, the variable frequency drive motor 150 is operated by the control system 92 (FIG. 20b), discussed above. Similarly, the motor 150 may be operated by the control systems 90 and 91 (FIGS. 20, 20a) for the other embodiments discussed above. For the sake of brevity, the operation of the motor 150 with the control system 92 will be discussed in detail here, but the operation of control systems 90 and 91 are representative. Specifically, the control system 92 obtains operational signals from the fryer 10 that relate to the usage of the fryer 10. In low use or idle situations, the amount of heat required to be added to the oil by the heat exchanger 130 (or electric heater assembly 144) to maintain the oil in the vat 14 at the nominal temperature is reduced. Additionally, in low use or idle situations the amount of crumbs and other foreign material that is added to the oil is reduced, so the need to operate the filter 20 is reduced. Accordingly, the control system 92 receives operational parameters that relate the performance and use of the fryer 10 and operates the pump 120 (through modifying the motor operation) to reduce flow through the heat exchanger 130 and the filter 20 in extended low use or idle situations.

The control system 92 may receive data that is proportional to the temperature of the oil within the vat 14 from one or more thermocouples or other temperature monitoring instruments known in the art. The control system may also monitor data that relates to the performance of the filter 20, as discussed above, as the amount of foreign material obstructing flow through the screen 40 is at least partially proportional to the volume and type of food product cooked by the fryer 10.

If the control system 92 senses that the fryer 10 has been idling or low use for a predetermined delay time, the control system 92 secures the pump 120 my removing current flow to the motor 150. In other embodiments the control system may alternatively reduce the rotational speed of the pump motor shaft 152 by lowering the frequency of the input current to the motor 150. The lower oil flow through the pump 120 decreases the aeration of the oil, to maximize the useful life of the oil. Additionally, the lower speed of the motor 150 decreases the power consumption of the motor 150, which increases the efficiency of the fryer 10. Upon oil temperatures decreasing below a predetermined threshold or upon the operator manipulating a specific input to the control system, the control system 92 restores the normal speed of the motor shaft 152 by increasing the frequency of the input current to the motor 150, which increases pump 120 speed and flow through the heat exchanger 130 and the filter 20. In some embodiments, heavier cooking loads may trigger a higher energy input rate and commensurately higher pump 120 flow rate.

Figure 3:
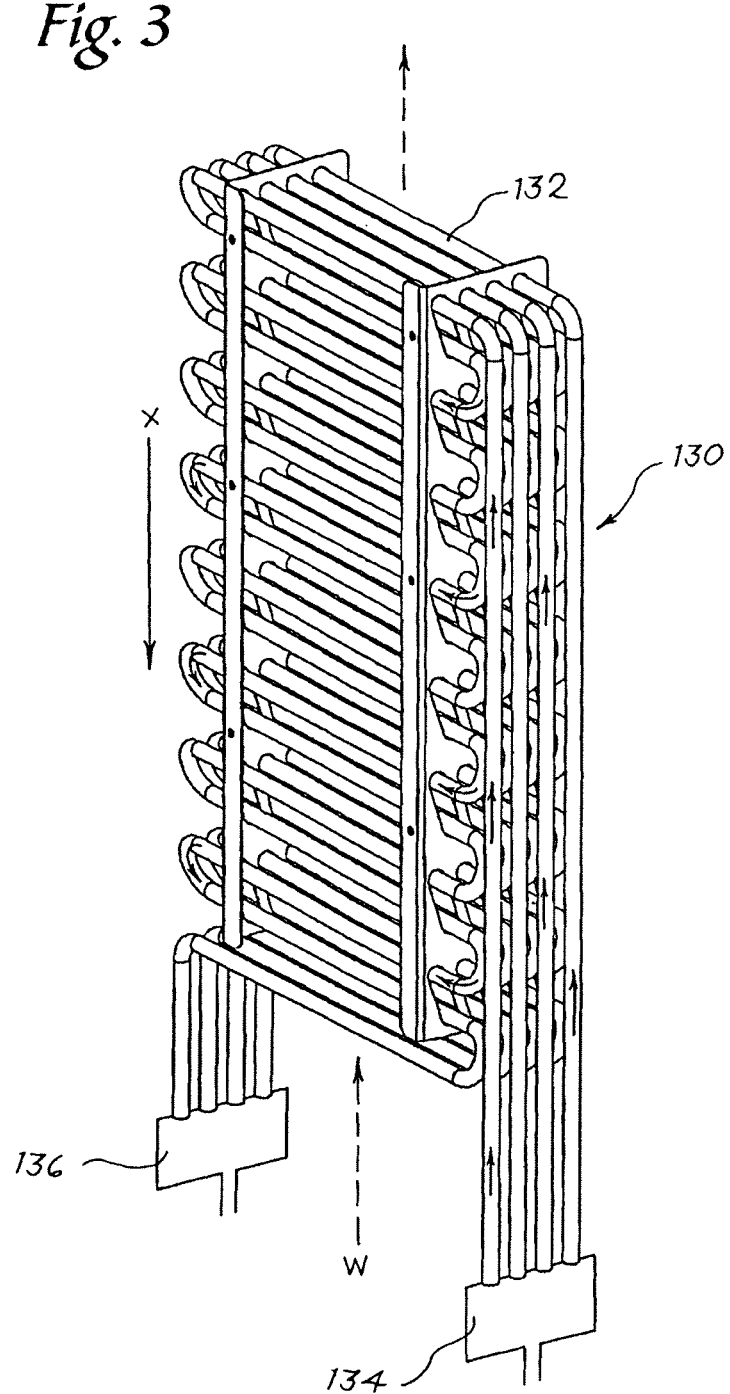
FIG. 3 is a perspective view of the heat exchanger of FIG. 1.
Figure 6A:
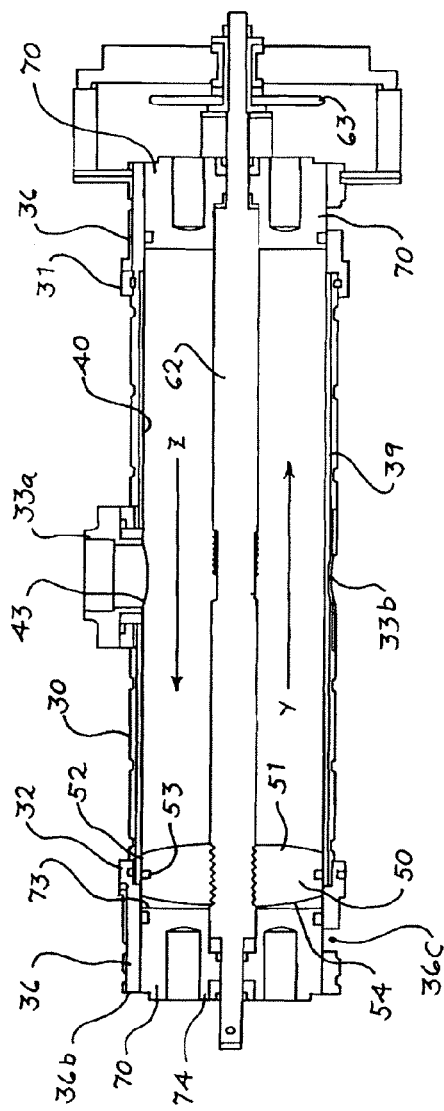
FIG. 6a is a cross-sectional view of the filter of FIG. 4 with the piston in a first operation position.
Figure 7A:
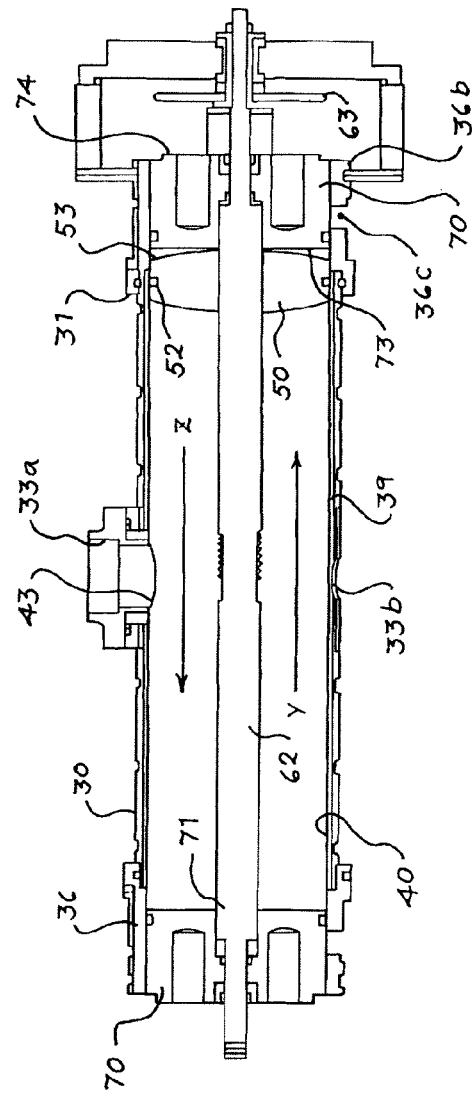
FIG. 7a is the view of the FIG. 6a with the piston in a second operational position.
Figure 12:
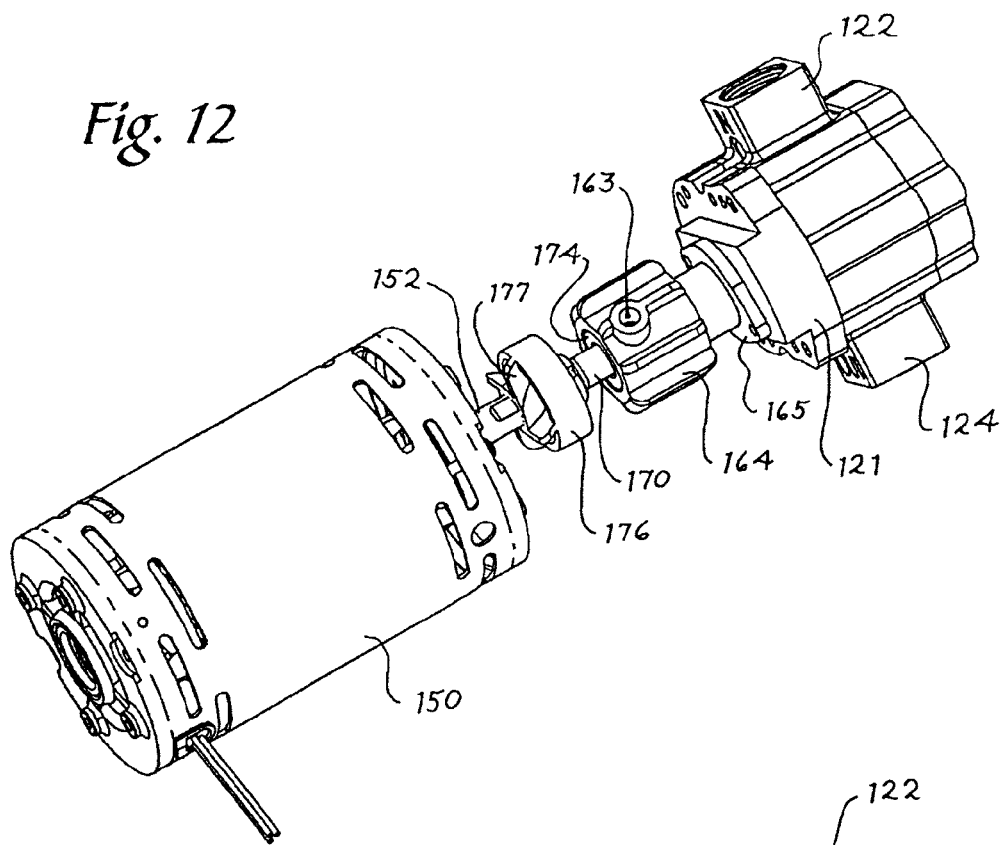
FIG. 12 is a perspective view of the motor and oil pump of the fryer of FIG. 1.

Turning now to FIGS. 1-3, a heat exchanger 130 for the fryer 10 is provided. The heat exchanger 130 includes one or a plurality of pipes 132 that receive oil flow for the discharge 124 of the pump 120 and return oil to the vat 14. The heat exchanger 130 may be disposed in the flue 18 of the fryer 10. In some embodiments, heated air flows past the pipes 132 in the heat exchanger 130 such that heat from the air is transferred to the oil flowing through the heat exchanger pipes 132 with convection heat transfer. In embodiments with air flow over the heat exchanger pipes 132, the air within the fryer 10 is heated due to a combustion process with a plurality of burners 15 aligned to receive ambient air, and send the heated combustion air toward the flue 18. In some embodiments, the burners 15 may be atmospheric style burners, and in other embodiments, the burners may be enclosed power burners (not shown). The design and operation of both atmospheric and power burners is known in the art.

As best understood with reference to FIGS. 2 and 3, the air heated by the burners 15 flows through a plenum 17 under the oil vat 14, which allows some heat from the air to transfer to the vat 14 by convection heat transfer. After passing through the plenum 17, the heated air enters the flue 18 and transfers heat to the oil flowing through the heat exchanger pipes 132. In some embodiments, the heat exchanger 130 may include a plurality of parallel pipes 132 that direct oil from the pump 120 to the vat 14. The parallel pipes each receive oil flow from a common header 134 that is fluidly connected to the pump discharge 124. The parallel pipes 132 allow for a significant amount of heat transfer area to be disposed within the heat exchanger 130, while minimizing the amount of head loss within the heat exchanger 130 due to frictional losses between the oil and the pipe 132 walls, minimizing the size of the pump 120 and the power to operate the pump 150. Further, in some embodiments the pipes 132 of the heat exchanger 130 form a serpentine pattern to increase the length of the heat exchanger 130 piping disposed within the flue 18, which increases the amount of heat transferred to the oil from the air due to increases surface area of the heat exchanger piping 132. The increase in total heat transfer area allows the surface temperatures of the heat exchanger piping 132 to be lower than would be required with less heat transfer area.

In some embodiments, the heat exchanger 130 is configured to maximize heat transfer efficiency, while preventing turbulent flow conditions within the vat 14 as oil enters from the heat exchanger 130. For example, it has been experimentally determined that flow rates of about 4.5 to 5.0 g.p.m. of oil entering the vat 14 from the heat exchanger often yield unsatisfactory turbulent oil flows 14 within a normal 14×14 inch vat 14 found on many conventional fryers. While it is disadvantageous to provide inlet oil flows at or above about 4.5 g.p.m., some continuous oil flow through the vat 14 is beneficial for increased cooking efficiency as the food product is continuously presented with relatively hot cooking oil, which pushes away the cooler cooking oil that has already lost heat to the food product. While the flow rate should be below 4.5 g.p.m., the flow should rate should be high enough to allow for sufficient flow rate through the relatively long heat exchanger 130 for sufficient oil flow through the filter (discussed above), as well as for controlled and precise heating of the oil flowing therethrough and for sufficient oil filtering.

In a preferred embodiment, the heat exchanger 130 is configured with four parallel legs, which combine for approximately 19 feet of length and approximately 1100 square inches of heat transfer area. When the pump 120 operates at a total flow rate of about 4.25 g.p.m. through the heat exchanger 130 (and therefore the continuous filter), the oil travels through the heat exchanger 130 for about 5 seconds, which allows for the oil to be heated to about 350 degrees with heat exchanger 130 tube wall temperatures of between about 385-400 degrees Fahrenheit. As may be appreciated by those of ordinary skill in the art, changes in sizes and geometry of the vat 14 and heat exchanger 130 may necessitate similar changes to the operation of the pump 120 and other components of the system. By way of example, typical donut fryers include relatively large oil vats, often about 24×24 inches. Because of the larger oil volume included in this larger vat, higher pump speeds, potentially around 8 g.p.m. should be used to provide for efficient heat transfer, sufficient, but not turbulent, oil flow within the vat, among other design parameters.

In some embodiments, the heat exchanger 130 piping may have a plurality of fins 133 (shown schematically in FIG. 3) to increase the effective surface area for heat transfer from the combustion gasses flowing past the heat exchanger 130 piping.

The heated air flows through the flue 18 in an upward direction W, while the oil flows through the serpentine pattern of the heat exchanger 130 in the opposite generally downward direction X. This "cross flow" orientation maximizes the efficiency of the heat flow from the heated air to the oil, because the differential temperature between the air and the oil is maximized along the length of the flue 18. In other embodiments, a plurality of electric heaters 144a may be provided within a housing or plenum 144 disposed downstream of and in fluid communication with the oil pump 120 through which the oil flows. The electric heaters 144a may be electric resistance elements as known on the art and are continuously or cyclically operated to provide heat to the oil flowing through the internal volume 146 of the plenum 144 to maintain the oil in the vat at nominal operation temperatures.

A common discharge header 136 is connected to each of the parallel pipes of the heat exchanger 130 and allows for oil flow to a ring 140. The ring 140 includes a plurality of apertures 142 that allow oil to exit the ring 140. The plurality of apertures 142 may be arranged to provide a sweeping action across the bottom of the vat to assist in directing crumbs into the filter 20, as well as providing convection currents to improve heat transfer to the cooking food. In some embodiments, the ring 140 is disposed within the vat 14 such that oil flowing from the ring 140 immediately enters the vat 14. The ring 140 may be disposed below the top surface of oil during use to minimize the aeration of the oil as it enters the vat 14. In other embodiments, the ring 140 may be disposed outside and surrounding the perimeter of the vat 14, and a plurality of apertures are defined on the peripheral surfaces of the vat 14 to allow oil leaving the ring 140 to ultimately enter the vat 14. The design with the ring 140 disposed outside and surrounding the vat 14 provides less crevices and low flow areas within the vat, which can be difficult to clean.

Figure 2A:
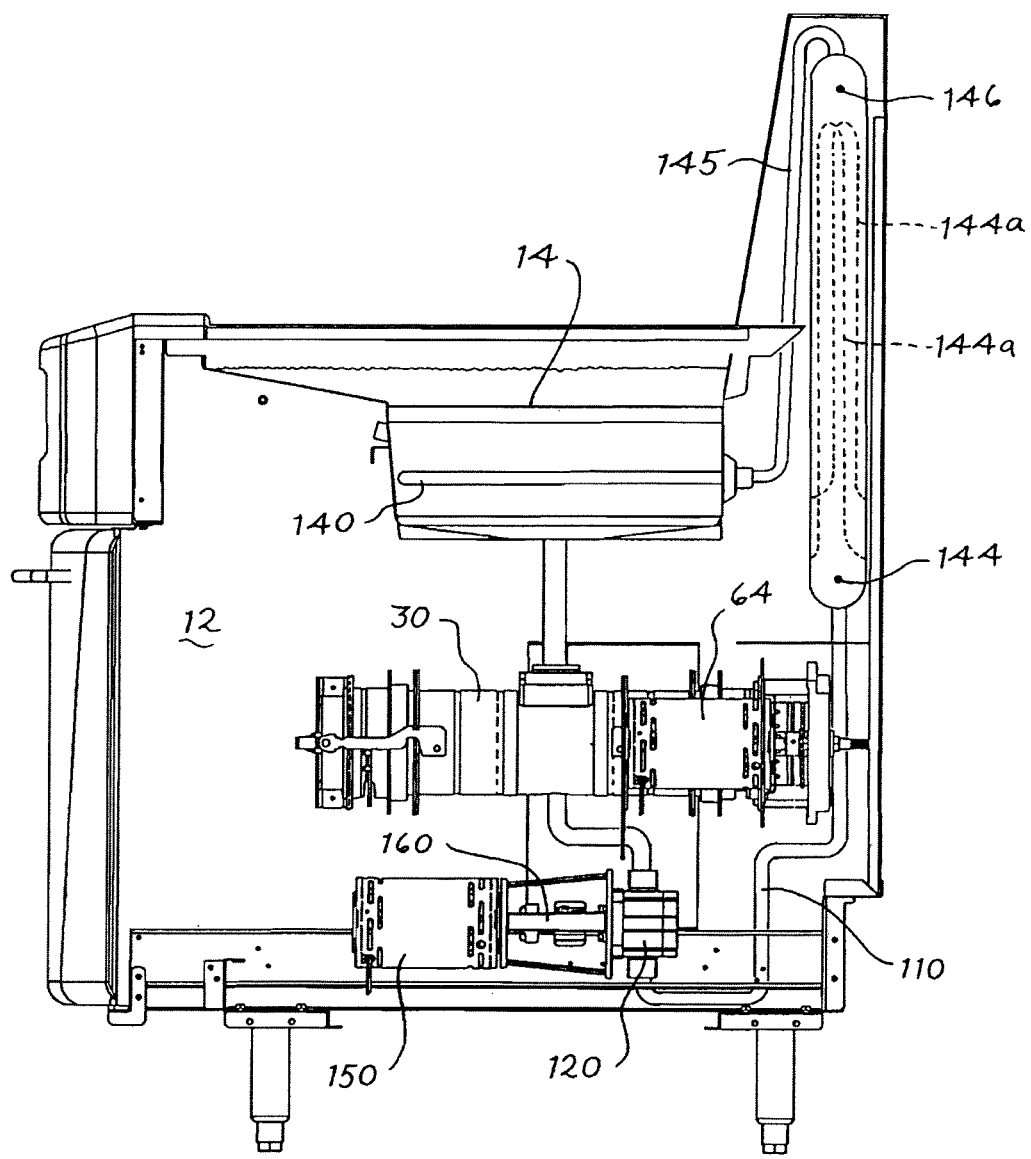
FIG. 2a is the side view of the fryer of FIG. 1, with a plurality of electrical resistance heaters provided therein.

Turning now to FIG. 2a, a fryer with a continuous electric heating system to heat oil received from the discharge 124 of the pump 120 may be provided. The system includes a heater assembly 144 that receives oil at an inlet and includes one or more electric heaters 144a disposed within the heater assembly 144 that provide heat to the oil flowing therethrough within the internal volume 146 of the heater assembly 144. The output of the heater assembly is fluidly connected to the vat 14 with a conduit 145 disposed therebetween. In some embodiments, the heater assembly 144 may include three electric heaters 144a, each powered by one of the three different phases of a typical three phase current source. In other embodiments, the heater assembly 144 may include one or more heaters 144a that are each powered from a single phase of current, or alternatively two of the three phases of current.

In still other embodiments, two heaters 144a may be disposed within the heater assembly 144 and receive current from two of the three typical phases of AC current (either delta or wye connected), while the heater assembly 144 itself acts as an electric heater and receives current from the remaining phase of current. This embodiment increases the surface area of the electric heaters 144*a* available to heat the oil flowing through the heater assembly 144.

While the preferred embodiments have been described, it should be understood that the disclosure is not so limited and modifications may be made without departing from the scope of the disclosure. The scope of the invention is defined by the appended claims, and all devices that come within the meaning of the claims, either literally or by equivalence, are intended to be embraced therein.

The invention claimed is:

1. A continuous filter system for a deep fat fryer, comprising:
   a cylindrical hollow housing with a first end and a second end;
   a hollow cylindrical screen with a longitudinal axis and first and second ends, the hollow cylindrical screen disposed coaxially within the cylindrical hollow housing to define an annulus therebetween; and
   a piston positioned within a passage defined by the hollow cylindrical screen and movable along the longitudinal axis between the first and second ends of the hollow cylindrical screen, wherein
   further comprising a liquid storage receptacle configured to receive a quantity of oil, a housing inlet aperture upon the cylindrical hollow housing configured to continuously receive oil from the liquid storage receptacle, and
   a pump in fluid communication with an outlet aperture of the housing, the pump configured to continuously urge oil flow through the hollow cylindrical screen and out of the outlet aperture of the housing,
   further comprising a first end cup translatably mounted within the cylindrical hollow housing and a portion of the first end of the hollow cylindrical screen wherein the first end cup is biased inward toward the second end of the hollow cylindrical screen, and a first collar fixed to the first end of the housing, the first end cup being movable within the first collar.

2. The continuous filter of claim 1, further comprising a heat exchanger fluidly connected to both a discharge of the pump and the liquid storage receptacle.

3. The filter of claim 1, wherein the hollow cylindrical screen comprises a plurality of holes configured to allow oil from within the cylindrical screen to flow therethrough, but substantially prevent particulate matter entrained with the oil to flow therethrough.

4. The filter of claim 3, wherein the pump includes a suction fluidly connected to the annulus to continuously urge oil from within the hollow cylindrical screen to flow through the plurality holes in the screen and into the annulus.

5. The filter of claim 1, further comprising a threaded rod extending along the longitudinal axis of the screen and a threaded aperture in the piston and an alignment rod extending through a second aperture in the piston, wherein the alignment rod is configured to cause the piston to longitudinally translate within the cylindrical passage when the threaded rod rotates.

6. The filter of claim 1, wherein the first collar comprises a slot to allow gravity draining of particulate matter from between the piston and the first end cup.

7. The filter of claim 6, wherein the first end cup normally blocks the slot on the collar, and the contact with the piston urges the end cup to translate the end cup longitudinally to expose the slot.

8. The filter claim 6, wherein the second end of the cylindrical hollow housing comprises a second collar fixed thereto with a second slot defined thereon, and a second end cup is translatably received therein and biased toward the first end cup, wherein the second end cup is configured to be movable within the second collar and urged away from the cylindrical hollow housing by the piston to expose the second slot.

9. The filter of claim 1, wherein the piston movably contacts substantially an entire surface of the screen and collects particulate matter therefrom.

10. The filter of claim 1, further comprising a control system that automatically controls the movement of the piston within the hollow cylindrical screen and the cylindrical hollow housing based on one or more monitored parameters of a deep fat fryer.

11. The filter of claim 10, wherein the control system controls the movement of the piston based on at least one of a monitored differential pressure across the housing, an outlet pressure of the housing, a passage of time, or a number of operational cycles of the cooking appliance attached thereto.

12. The filter of claim 4, further comprising a heat exchanger fluidly connected to both a discharge of the pump and a liquid receptacle within a deep fat fryer.

13. The filter of claim 1, wherein the first end cup comprises an inner member biased toward the first end of the cylindrical hollow housing and an outer member movably fixed with respect to the first end of the cylindrical hollow housing.

14. The filter of claim 13, further comprising a translation device in communication with the outer member to selectively translate the outer and inner members away from the piston.

15. The filter of claim 13, wherein the piston cyclically contacts the inner member to translate the inner member toward the outer member.

16. The filter of claim 14, wherein the translation device is one of a linear actuator, a motor, or an electromagnet.

17. The filter of claim 14, further comprising an arm mounted to the housing, the arm comprising an extended portion that cyclically translates between the piston and the inner member when the inner member is translated away from the piston.

18. The filter of claim 17, further comprising a controller that selectively causes automatic operation of the translation device and automatic motion of the arm based on one or more operational parameters of the cooking appliance.

* * * * *

UNITED STATES PATENT AND TRADEMARK OFFICE
CERTIFICATE OF CORRECTION

| | |
|---|---|
| PATENT NO. | : 9,532,681 B2 |
| APPLICATION NO. | : 14/480160 |
| DATED | : January 3, 2017 |
| INVENTOR(S) | : Steven J. Savage et al. |

Page 1 of 1

It is certified that error appears in the above-identified patent and that said Letters Patent is hereby corrected as shown below:

In the Claims

In Column 46, Claim 8, Line 8, after "The filter" insert --of--.

Signed and Sealed this
Fourth Day of April, 2017

Michelle K. Lee
*Director of the United States Patent and Trademark Office*